United States Patent [19]

Nakayama et al.

[11] Patent Number: 5,557,522

[45] Date of Patent: Sep. 17, 1996

[54] APPARATUS AND METHOD FOR GUIDING VEHICLE OCCUPANT TO TRAVEL FROM PRESENT POSITION OF VEHICLE TO SET DESTINATION THROUGH DISPLAY UNIT

[75] Inventors: Okihiko Nakayama, Yokohama, Japan; Brian R. Grom, Lancaster, N.Y.; Masayasu Iwasaki, Sagamihara; Hiroshi Tsuda, Yokohama, both of Japan

[73] Assignee: Nissan Motor Co., Ltd., Yokohama, Japan

[21] Appl. No.: 302,028

[22] Filed: Sep. 9, 1994

[30] Foreign Application Priority Data

Sep. 10, 1993 [JP] Japan ................................ 5-225947
Sep. 10, 1993 [JP] Japan ................................ 5-225948
Feb. 10, 1994 [JP] Japan ................................ 6-016371

[51] Int. Cl.⁶ ............................................... G05D 1/00
[52] U.S. Cl. .................................. 364/424.02; 364/449
[58] Field of Search ........................... 364/424.02, 449, 364/424.01, 436, 443, 444

[56] References Cited

U.S. PATENT DOCUMENTS

| | | | |
|---|---|---|---|
| 4,179,876 | 12/1979 | Moriyama | 58/50 R |
| 4,743,913 | 5/1988 | Takai | 342/457 |
| 4,763,270 | 8/1988 | Itoh et al. | 364/449 |
| 4,774,671 | 9/1988 | Itoh et al. | 364/449 |
| 4,774,672 | 9/1988 | Tsunoda et al. | 364/449 |
| 4,782,447 | 11/1988 | Ueno et al. | 364/449 |
| 4,812,845 | 3/1989 | Yamada et al. | 340/995 |
| 4,849,827 | 7/1989 | Hashimoto et al. | 358/342 |
| 4,857,455 | 8/1989 | Khanna et al. | 435/7 |
| 4,899,285 | 2/1990 | Nakayama et al. | 364/453 |
| 4,937,753 | 6/1990 | Yamada | 364/449 |
| 5,311,173 | 5/1994 | Komura et al. | 340/995 |
| 5,377,113 | 12/1994 | Shibazaki et al. | 364/449 |
| 5,396,431 | 3/1995 | Shimizu et al. | 364/449 |
| 5,398,188 | 3/1995 | Maruyama | 364/449 |
| 5,410,486 | 4/1995 | Kishi et al. | 364/449 |
| 5,442,557 | 8/1995 | Kaneko | 364/449 |
| 5,452,212 | 9/1995 | Yokoyama et al. | 364/449 |

FOREIGN PATENT DOCUMENTS

| | | |
|---|---|---|
| 62-86499 | 4/1987 | Japan . |
| 2-184998 | 1/1990 | Japan . |
| 2-56591 | 2/1990 | Japan . |
| 2-306400 | 12/1990 | Japan . |

Primary Examiner—Kevin J. Teska
Assistant Examiner—Stephen J. Walder, Jr.
Attorney, Agent, or Firm—Lowe, Price, LeBlanc & Becker

[57] ABSTRACT

In an apparatus and method for guiding a vehicle occupant from a present position of the vehicle to a destination to which the vehicle occupant desires to reach, optimum routes of travel from the present position to respective intersections surrounding the present position of the vehicle are already searched and stored when the vehicle stops at the present position of the vehicle with a vehicular ignition switch turned off. Then, when the ignition switch is turned on and the vehicle occupant sets the destination, the optimum routes from the set destination toward the present position are searched on the basis of the road map data and result of search of the optimum routes of the respective intersections surrounding the present position of the vehicle. When the optimum route from the set destination to the present position of the vehicle is searched, the display unit superimposes and displays the present position of the vehicle and the optimum route to the destination on the road map so as to quickly start the guidance of the route from the present position to the destination. In the embodiment, if the set destination corresponds to one of registered points of locations, the present position and the optimum route to the destination are immediately displayed on the road map after the destination is set.

30 Claims, 48 Drawing Sheets

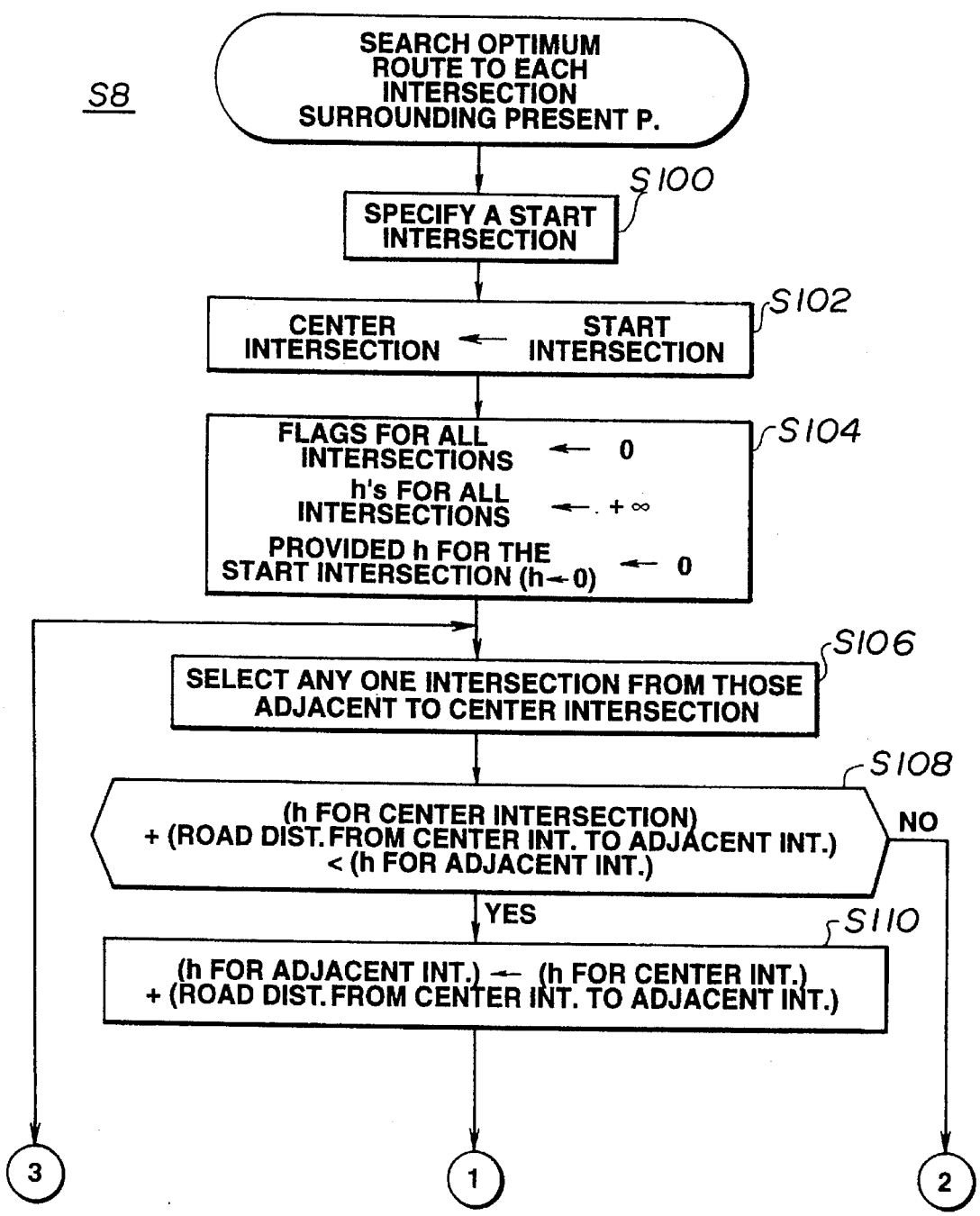

FIG.12A

LIST A

| INT.No. | h | FLAG | PRECEDING INT.A | g | PRECEDING INT.B |
|---|---|---|---|---|---|
| 1 | 0 | 0→1 | | | |
| 2 | ∞→3 | 0 | 1 | | |
| 3 | ∞→5 | 0 | 1 | | |
| 4 | ∞→4 | 0 | 1 | | |
| 5 | ∞→6 | 0 | 1 | | |
| 6 | ∞ | 0 | | | |
| 7 | ∞ | 0 | | | |
| 8 | ∞ | 0 | | | |
| 9 | ∞ | 0 | | | |
| 10 | ∞ | 0 | | | |
| 11 | ∞ | 0 | | | |
| 12 | ∞ | 0 | | | |
| 13 | ∞ | 0 | | | |
| 14 | ∞ | 0 | | | |
| 15 | ∞ | 0 | | | |

FIG.12B

LIST B

| INT.No. |
|---|
| 2 |
| 3 |
| 4 |
| 5 |

FIG.13A

LIST A

| INT.No. | h | FLAG | PRECEDING INT.A | g | PRECEDING INT.B |
|---|---|---|---|---|---|
| 1 | 0 | 1 | | | |
| 2 | 3 | 0→1 | 1 | | |
| 3 | 5 | 0 | 1 | | |
| 4 | 4 | 0 | 1 | | |
| 5 | 6 | 0 | 1 | | |
| 6 | ∞ | 0 | | | |
| 7 | ∞ | 0 | | | |
| 8 | ∞ | 0 | | | |
| 9 | ∞ | 0 | | | |
| 10 | ∞ | 0 | | | |
| 11 | ∞ | 0 | | | |
| 12 | ∞ | 0 | | | |
| 13 | ∞ | 0 | | | |
| 14 | ∞ | 0 | | | |
| 15 | ∞ | 0 | | | |

FIG.13B

LIST B

| INT.No. |
|---|
| 3 |
| 4 |
| 5 |

FIG.14A

LIST A

| INT.No. | h | FLAG | PRECEDING INT.A | g | PRECEDING INT.B |
|---|---|---|---|---|---|
| 1 | 0 | | | | |
| 2 | 3 | | 1 | | |
| 3 | 5 | | 1 | | |
| 4 | 4 | | 1 | | |
| 5 | 6→5 | 0 | 1→4 | | |
| 6 | ∞→9 | 0 | 4 | | |
| 7 | ∞ | 0 | | | |
| 8 | ∞ | 0 | | | |
| 9 | ∞ | 0 | | | |
| 10 | ∞ | 0 | | | |
| 11 | ∞ | 0 | | | |
| 12 | ∞ | 0 | | | |
| 13 | ∞ | 0 | | | |
| 14 | ∞ | 0 | | | |
| 15 | ∞ | 0 | | | |

FIG.14B

LIST B

| INT.No. |
|---|
| 3 |
| 5 |
| 6 |

FIG.15A

LIST A

| INT.No. | h | FLAG | PRECEDING INT.A | g | PRECEDING INT.B |
|---|---|---|---|---|---|
| 1 | 0 | 1 | | | |
| 2 | 3 | 1 | 1 | | |
| 3 | 5 | 1 | 1 | | |
| 4 | 4 | 1 | 1 | | |
| 5 | 5 | 1 | 4 | | |
| 6 | 9 | 1 | 4 | | |
| 7 | 10 | 1 | 5 | | |
| 8 | 11 | 0 | 6 | | |
| 9 | 14 | 0 | 7 | | |
| 10 | ∞ | 0 | | | |
| 11 | ∞ | 0 | | | |
| 12 | ∞ | 0 | | | |
| 13 | ∞ | 0 | | | |
| 14 | ∞ | 0 | | | |
| 15 | ∞ | 0 | | | |

FIG.15B

LIST B

| INT.No. |
|---|
| 8 |
| 9 |

FIG.16A

LIST A

| INT.No. | h | FLAG | PRECEDING INT.A | g | PRECEDING INT.B |
|---|---|---|---|---|---|
| 1 | 0 | 1 | | ∞ | |
| 2 | 3 | 1 | 1 | ∞ | |
| 3 | 5 | 1 | 1 | ∞ | |
| 4 | 4 | 1 | 1 | ∞ | |
| 5 | 5 | 1 | 4 | ∞ | |
| 6 | 9 | 1 | 4 | ∞ | |
| 7 | 10 | 1 | 5 | ∞ | |
| 8 | 11 | 0 | 6 | ∞→4 | 10 |
| 9 | 14 | 0 | 7 | ∞→2 | 10 |
| 10 | ∞ | 0 | | 0 | |
| 11 | ∞ | 0 | | ∞→5 | 10 |
| 12 | ∞ | 0 | | ∞→3 | 10 |
| 13 | ∞ | 0 | | ∞ | |
| 14 | ∞ | 0 | | ∞ | |
| 15 | ∞ | 0 | | ∞ | |

FIG.16B

LIST B

| INT.No. |
|---|
| 8 |
| 9 |

FIG.16C

LIST C

| INT.No. | h' | g | g + h' |
|---|---|---|---|
| 8 | 9 | 4 | 13 |
| 9 | 10 | 2 | 12 |
| 11 | 12 | 5 | 17 |
| 12 | 11 | 3 | 14 |

FIG. 17A

LIST A

| INT.No. | h | FLAG | PRECEDING INT.A | g | PRECEDING INT.B |
|---|---|---|---|---|---|
| 1 | 0 | 1 |  | ∞→16 |  |
| 2 | 3 | 1 | 1 | ∞ |  |
| 3 | 5 | 1 | 1 | ∞ |  |
| 4 | 4 | 1 | 1 | ∞ |  |
| 5 | 5 | 1 | 4 | ∞ |  |
| 6 | 9 | 1 | 4 | ∞ |  |
| 7 | 10 | 1 | 5 | ∞→6 |  |
| 8 | 11 | 0 | 6 | 4 | 9 |
| 9 | 14 | 0 | 7 | 2 | 10 |
| 10 | ∞ | 0 |  | 0 | 10 |
| 11 | ∞ | 0 |  | 5 |  |
| 12 | ∞ | 0 |  | 3 | 10 |
| 13 | ∞ | 0 |  | ∞ | 10 |
| 14 | ∞ | 0 |  | ∞ |  |
| 15 | ∞ | 0 |  | ∞ |  |

FIG. 17B

LIST B

| INT.No. |
|---|
| 8 |
| 9 |

FIG. 17C

LIST C

| INT.No. | h' | g | g + h' |
|---|---|---|---|
| 8 | 9 | 4 | 13 |
| 11 | 12 | 5 | 17 |
| 12 | 11 | 3 | 14 |
| 1 | 0 | 16 | 16 |

FIG.18A

LIST A

| INT.No. | h | FLAG | PRECEDING INT.A | g | PRECEDING INT.B |
|---|---|---|---|---|---|
| 1 | 0 | 1 | | 16→15 | 7→6 |
| 2 | 3 | 1 | 1 | ∞ | |
| 3 | 5 | 1 | 1 | ∞ | |
| 4 | 4 | 1 | 1 | ∞ | |
| 5 | 5 | 1 | 4 | ∞ | |
| 6 | 9 | 1 | 4 | ∞→6 | 8 |
| 7 | 10 | 1 | 5 | 6 | 9 |
| 8 | 11 | 0 | 6 | 4 | 10 |
| 9 | 14 | 0 | 7 | 2 | 10 |
| 10 | ∞ | 0 | | 0 | |
| 11 | ∞ | 0 | | 5 | 10 |
| 12 | ∞ | 0 | | 3 | 10 |
| 13 | ∞ | 0 | | ∞ | |
| 14 | ∞ | 0 | | ∞ | |
| 15 | ∞ | 0 | | ∞ | |

FIG.18B

LIST B

| INT.No. |
|---|
| 8 |
| 9 |

FIG.18C

LIST C

| INT.No. | h' | g | g + h' |
|---|---|---|---|
| 11 | 12 | 5 | 17 |
| 12 | 11 | 3 | 14 |
| 1 | 0 | 15 | 15 |

FIG.19A

LIST A

| INT.No. | h | FLAG | PRECEDING INT.A | g | PRECEDING INT.B |
|---|---|---|---|---|---|
| 1 | 0 | 1 |   | 15 | 6 |
| 2 | 3 | 1 | 1 | ∞ |   |
| 3 | 5 | 1 | 1 | ∞ |   |
| 4 | 4 | 1 | 1 | ∞ |   |
| 5 | 5 | 1 | 4 | ∞ |   |
| 6 | 9 | 1 | 4 | 6 | 8 |
| 7 | 10 | 1 | 5 | 6 | 9 |
| 8 | 11 | 0 | 6 | 4 | 10 |
| 9 | 14 | 0 | 7 | 2 | 10 |
| 10 | ∞ | 0 |   | 0 |   |
| 11 | ∞ | 0 |   | 5 | 10 |
| 12 | ∞ | 0 |   | 3 | 10 |
| 13 | ∞ | 0 |   | ∞→7 | 12 |
| 14 | ∞ | 0 |   | ∞ |   |
| 15 | ∞ | 0 |   | ∞ |   |

FIG.19B

LIST B

| INT.No. |
|---|
| 8 |
| 9 |

FIG.19C

LIST C

| INT.No. | h' | g | g + h' |
|---|---|---|---|
| 11 | 12 | 5 | 17 |
| 1 | 0 | 15 | 15 |
| 3 | 12 | 7 | 19 |

FIG.23A

LIST A

| INT.No. | h | FLAG | PRECEDING INT.A | g | PRECEDING INT.B |
|---|---|---|---|---|---|
| 1 | 0 | 1 | | ∞ | |
| 2 | 3 | 1 | 1 | ∞ | |
| 3 | 5 | 1 | 1 | ∞ | |
| 4 | 4 | 1 | 1 | ∞ | |
| 5 | 5 | 1 | 4 | ∞ | |
| 6 | 9 | 1 | 4 | ∞ | |
| 7 | 10 | 1 | 5 | ∞ | |
| 8 | 11 | 0 | 6 | ∞→4 | 10 |
| 9 | 14 | 0 | 7 | ∞→2 | 10 |
| 10 | ∞ | 0 | | 0 | |
| 11 | ∞ | 0 | | ∞→5 | 10 |
| 12 | ∞ | 0 | | ∞→3 | 10 |
| 13 | ∞ | 0 | | ∞ | |
| 14 | ∞ | 0 | | ∞ | |
| 15 | ∞ | 0 | | ∞ | |

FIG.23B

LIST B

| INT.No. |
|---|
| 8 |
| 9 |

FIG.23C

LIST C

| INT.No. | h' | g | g + h' |
|---|---|---|---|
| 8 | 9 | 4 | 13 |
| 9 | 10 | 2 | 12 |
| 11 | 12 | 5 | 17 |
| 12 | 11 | 3 | 14 |

FIG.24A

LIST A

| INT.No. | h | FLAG | PRECEDING INT.A | g | PRECEDING INT.B |
|---|---|---|---|---|---|
| 1 | 0 | 1 |  | ∞ |  |
| 2 | 3 | 1 | 1 | ∞ |  |
| 3 | 5 | 1 | 1 | ∞ |  |
| 4 | 4 | 1 | 1 | ∞ |  |
| 5 | 5 | 1 | 4 | ∞ |  |
| 6 | 9 | 1 | 4 | ∞ |  |
| 7 | 10 | 1 | 5 | ∞→6 | 9 |
| 8 | 11 | 0 | 6 | 4 | 10 |
| 9 | 14 | 0 | 7 | 2 | 10 |
| 10 | ∞ | 0 |  | 0 |  |
| 11 | ∞ | 0 |  | 5 | 10 |
| 12 | ∞ | 0 |  | 3 | 10 |
| 13 | ∞ | 0 |  | ∞ |  |
| 14 | ∞ | 0 |  | ∞ |  |
| 15 | ∞ | 0 |  | ∞ |  |

FIG.24B

LIST B

| INT.No. |
|---|
| 8 |
| 9 |

FIG.24C

LIST C

| INT.No. | h' | g | g + h' |
|---|---|---|---|
| 8 | 9 | 4 | 13 |
| 11 | 12 | 5 | 17 |
| 12 | 11 | 3 | 14 |
| 7 | 8 | 6 | 14 |

FIG.25A

LIST A

| INT.No. | h | FLAG | PRECEDING INT.A | g | PRECEDING INT.B |
|---|---|---|---|---|---|
| 1 | 0 | 1 |  | ∞ |  |
| 2 | 3 | 1 | 1 | ∞ |  |
| 3 | 5 | 1 | 1 | ∞ |  |
| 4 | 4 | 1 | 1 | ∞ |  |
| 5 | 5 | 1 | 4 | ∞ |  |
| 6 | 9 | 1 | 4 | ∞→6 | 8 |
| 7 | 10 | 1 | 5 | 6 | 9 |
| 8 | 11 | 0 | 6 | 4 | 10 |
| 9 | 14 | 0 | 7 | 2 | 10 |
| 10 | ∞ | 0 |  | 0 |  |
| 11 | ∞ | 0 |  | 5 | 10 |
| 12 | ∞ | 0 |  | 3 | 10 |
| 13 | ∞ | 0 |  | ∞ |  |
| 14 | ∞ | 0 |  | ∞ |  |
| 15 | ∞ | 0 |  | ∞ |  |

FIG.25B

LIST B

| INT.No. |
|---|
| 8 |
| 9 |

FIG.25C

LIST C

| INT.No. | h' | g | g + h' |
|---|---|---|---|
| 11 | 12 | 5 | 17 |
| 12 | 11 | 3 | 14 |
| 7 | 8 | 6 | 14 |
| 6 | 9 | 6 | 15 |

FIG.26A

LIST A

| INT.No. | h | FLAG | PRECEDING INT.A | g | PRECEDING INT.B |
|---|---|---|---|---|---|
| 1 | 0 | 1 | | $\infty$ | |
| 2 | 3 | 1 | 1 | $\infty$ | |
| 3 | 5 | 1 | 1 | $\infty$ | |
| 4 | 4 | 1 | 1 | $\infty$ | |
| 5 | 5 | 1 | 4 | $\infty$ | |
| 6 | 9 | 1 | 4 | 6 | 8 |
| 7 | 10 | 1 | 5 | 6 | 9 |
| 8 | 11 | 0 | 6 | 4 | 10 |
| 9 | 14 | 0 | 7 | 2 | 10 |
| 10 | $\infty$ | 0 | | 0 | |
| 11 | $\infty$ | 0 | | 5 | 10 |
| 12 | $\infty$ | 0 | | 3 | 10 |
| 13 | $\infty$ | 0 | | $\infty \rightarrow 8$ | 12 |
| 14 | $\infty$ | 0 | | $\infty$ | |
| 15 | $\infty$ | 0 | | $\infty$ | |

FIG.26B

LIST B

| INT.No. |
|---|
| 8 |
| 9 |

FIG.26C

LIST C

| INT.No. | h' | g | g + h' |
|---|---|---|---|
| 11 | 12 | 5 | 17 |
| 7 | 8 | 6 | 14 |
| 6 | 9 | 6 | 15 |
| 13 | 12 | 7 | 19 |

FIG.40

| INT.No. | h | PARENT INT. |
|---|---|---|
| 1 | 0 | 1 |
| 2 | ∞ | 0 |
| 3 | ∞ | 0 |
| 4 | ∞ | 0 |
| 5 | ∞ | 0 |
| 6 | ∞ | 0 |
| 7 | ∞ | 0 |
| 8 | ∞ | 0 |
| 9 | ∞ | 0 |
| 10 | ∞ | 0 |
| 11 | ∞ | 0 |
| 12 | ∞ | 0 |
| 13 | ∞ | 0 |
| 14 | ∞ | 0 |
| 15 | ∞ | 0 |
| 16 | ∞ | 0 |
| 17 | ∞ | 0 |
| 18 | ∞ | 0 |
| 19 | ∞ | 0 |
| 20 | ∞ | 0 |
| 21 | ∞ | 0 |
| 22 | ∞ | 0 |
| 23 | ∞ | 0 |
| 24 | ∞ | 0 |
| 25 | ∞ | 0 |
| 26 | ∞ | 0 |
| 27 | ∞ | 0 |
| 28 | ∞ | 0 |
| 29 | ∞ | 0 |
| 30 | ∞ | 0 |
| 31 | ∞ | 0 |
| 32 | ∞ | 0 |
| 33 | ∞ | 0 |
| 34 | ∞ | 0 |
| 35 | ∞ | 0 |
| 36 | ∞ | 0 |
| 37 | ∞ | 0 |
| 38 | ∞ | 0 |
| 39 | ∞ | 0 |
| 40 | ∞ | 0 |
| 41 | ∞ | 0 |
| 42 | ∞ | 0 |
| 43 | ∞ | 0 |
| 44 | ∞ | 0 |
| 45 | ∞ | 0 |
| 46 | ∞ | 0 |

CENTER INT. CANDIDATES LIST

PROVISIONAL CENTER INT. CANDIDATES LIST

FIG.41

| INT.No. | h | PARENT INT. |
|---|---|---|
| 1 | 0 | 1 |
| 2 | ∞ => 5 | 0 => 1 |
| 3 | ∞ => 7 | 0 => 1 |
| 4 | ∞ => 9 | 0 => 1 |
| 5 | ∞ => 12 | 0 => 1 |
| 6 | ∞ => 7 | 0 => 1 |
| 7 | ∞ | 0 |
| 8 | ∞ | 0 |
| 9 | ∞ | 0 |
| 10 | ∞ | 0 |
| 11 | ∞ | 0 |
| 12 | ∞ | 0 |
| 13 | ∞ | 0 |
| 14 | ∞ | 0 |
| 15 | ∞ | 0 |
| 16 | ∞ | 0 |
| 17 | ∞ | 0 |
| 18 | ∞ | 0 |
| 19 | ∞ | 0 |
| 20 | ∞ | 0 |
| 21 | ∞ | 0 |
| 22 | ∞ | 0 |
| 23 | ∞ | 0 |
| 24 | ∞ | 0 |
| 25 | ∞ | 0 |
| 26 | ∞ | 0 |
| 27 | ∞ | 0 |
| 28 | ∞ | 0 |
| 29 | ∞ | 0 |
| 30 | ∞ | 0 |
| 31 | ∞ | 0 |
| 32 | ∞ | 0 |
| 33 | ∞ | 0 |
| 34 | ∞ | 0 |
| 35 | ∞ | 0 |
| 36 | ∞ | 0 |
| 37 | ∞ | 0 |
| 38 | ∞ | 0 |
| 39 | ∞ | 0 |
| 40 | ∞ | 0 |
| 41 | ∞ | 0 |
| 42 | ∞ | 0 |
| 43 | ∞ | 0 |
| 44 | ∞ | 0 |
| 45 | ∞ | 0 |
| 46 | ∞ | 0 |

| CENTER INT. CANDIDATES LIST |
|---|
| 2 |
| 3 |
| 4 |
| 5 |
| 6 |

PROVISIONAL CENTER INT. CANDIDATES LIST

FIG.42

| INT.No. | h | PARENT INT. |
|---|---|---|
| 1 | 0 | 1 |
| 2 | 5 | 1 |
| 3 | 7 | 1 |
| 4 | 9 | 1 |
| 5 | 12 => 9 | 1 => 1 |
| 6 | 7 | 1 |
| 7 | ∞ => 10 | 0 => 1 |
| 8 | ∞ | 0 |
| 9 | ∞ | 0 |
| 10 | ∞ | 0 |
| 11 | ∞ => 9 | 0 => 1 |
| 12 | ∞ | 0 |
| 13 | ∞ | 0 |
| 14 | ∞ | 0 |
| 15 | ∞ | 0 |
| 16 | ∞ | 0 |
| 17 | ∞ | 0 |
| 18 | ∞ | 0 |
| 19 | ∞ | 0 |
| 20 | ∞ | 0 |
| 21 | ∞ | 0 |
| 22 | ∞ | 0 |
| 23 | ∞ | 0 |
| 24 | ∞ | 0 |
| 25 | ∞ | 0 |
| 26 | ∞ | 0 |
| 27 | ∞ | 0 |
| 28 | ∞ | 0 |
| 29 | ∞ | 0 |
| 30 | ∞ | 0 |
| 31 | ∞ | 0 |
| 32 | ∞ | 0 |
| 33 | ∞ | 0 |
| 34 | ∞ | 0 |
| 35 | ∞ | 0 |
| 36 | ∞ | 0 |
| 37 | ∞ | 0 |
| 38 | ∞ | 0 |
| 39 | ∞ | 0 |
| 40 | ∞ | 0 |
| 41 | ∞ | 0 |
| 42 | ∞ | 0 |
| 43 | ∞ | 0 |
| 44 | ∞ | 0 |
| 45 | ∞ | 0 |
| 46 | ∞ | 0 |

| CENTER INT. CANDIDATES LIST |
|---|
| 3 |
| 4 |
| 5 |
| 6 |
| 7 |
| 11 |

PROVISIONAL CENTER INT. CANDIDATES LIST

FIG.43

| INT.No. | h | PARENT INT. |
|---|---|---|
| 1 | 0 | 1 |
| 2 | 5 | 1 |
| 3 | 7 | 1 |
| 4 | 9 | 1 |
| 5 | 9 | 1 |
| 6 | 7 | 1 |
| 7 | 9 | 1 |
| 8 | 10 | 1 |
| 9 | ∞ | 0 |
| 10 | ∞ | 0 |
| 11 | 9 | 1 |
| 12 | 11 | 1 |
| 13 | 11 | 1 |
| 14 | 15 | 1 |
| 15 | ∞ | 0 |
| 16 | ∞ | 0 |
| 17 | ∞ | 0 |
| 18 | 10 | 1 |
| 19 | ∞ => 14 | 0 => 18 |
| 20 | ∞ => 14 | 0 => 18 |
| 21 | 13 | 1 |
| 22 | 12 | 1 |
| 23 | ∞ | 0 |
| 24 | ∞ | 0 |
| 25 | ∞ | 0 |
| 26 | ∞ | 0 |
| 27 | ∞ | 0 |
| 28 | ∞ | 0 |
| 29 | ∞ | 0 |
| 30 | ∞ | 0 |
| 31 | ∞ | 0 |
| 32 | ∞ | 0 |
| 33 | ∞ | 0 |
| 34 | ∞ | 0 |
| 35 | ∞ | 0 |
| 36 | ∞ | 0 |
| 37 | ∞ | 0 |
| 38 | ∞ | 0 |
| 39 | ∞ | 0 |
| 40 | ∞ | 0 |
| 41 | ∞ | 0 |
| 42 | ∞ | 0 |
| 43 | ∞ | 0 |
| 44 | ∞ | 0 |
| 45 | ∞ | 0 |
| 46 | ∞ | 0 |

| CENTER INT. CANDIDATES LIST |
|---|
| 21 |
| 22 |
| 14 |
| 8 |
| 12 |
| 13 |

| PROVISIONAL CENTER INT. CANDIDATES LIST |
|---|
| 19 |
| 20 |

FIG.44

| INT.No. | h | PARENT INT. |
|---|---|---|
| 1 | 0 | 1 |
| 2 | 5 | 1 |
| 3 | 7 | 1 |
| 4 | 9 | 1 |
| 5 | 9 | 1 |
| 6 | 7 | 1 |
| 7 | 9 | 1 |
| 8 | 10 | 1 |
| 9 | 12 | 8 |
| 10 | 15 | 8 |
| 11 | 9 | 1 |
| 12 | 11 | 1 |
| 13 | 11 | 1 |
| 14 | 15 | 1 |
| 15 | ∞ => 18 | 14 |
| 16 | ∞ => 19 | 14 |
| 17 | ∞ => 20 | 14 |
| 18 | 10 | 1 |
| 19 | 14 | 18 |
| 20 | 14 | 18 |
| 21 | 13 | 1 |
| 22 | 12 | 1 |
| 23 | 17 | 21 |
| 24 | ∞ | 0 |
| 25 | ∞ | 0 |
| 26 | ∞ | 0 |
| 27 | ∞ | 0 |
| 28 | ∞ | 0 |
| 29 | 14 | 12 |
| 30 | 16 | 12 |
| 31 | 15 | 13 |
| 32 | 15 | 13 |
| 33 | 15 | 22 |
| 34 | 17 | 22 |
| 35 | 18 | 22 |
| 36 | ∞ | 0 |
| 37 | ∞ | 0 |
| 38 | ∞ | 0 |
| 39 | ∞ | 0 |
| 40 | ∞ | 0 |
| 41 | ∞ | 0 |
| 42 | ∞ | 0 |
| 43 | ∞ | 0 |
| 44 | ∞ | 0 |
| 45 | ∞ | 0 |
| 46 | ∞ | 0 |

CENTER INT. CANDIDATES LIST

| PROVISIONAL CENTER INT. CANDIDATES LIST |
|---|
| 19 |
| 20 |
| 9 |
| 10 |
| 29 |
| 30 |
| 31 |
| 32 |
| 33 |
| 34 |
| 35 |
| 15 |
| 16 |
| 17 |

FIG.45

| INT.No. | h | PARENT INT. |
|---|---|---|
| 1 | 0 | 1 |
| 2 | 5 | 1 |
| 3 | 7 | 1 |
| 4 | 9 | 1 |
| 5 | 9 | 1 |
| 6 | 7 | 1 |
| 7 | 9 | 1 |
| 8 | 10 | 1 |
| 9 | 12 | 8 |
| 10 | 15 | 8 |
| 11 | 9 | 1 |
| 12 | 11 | 1 |
| 13 | 11 | 1 |
| 14 | 15 | 1 |
| 15 | 18 | 14 |
| 16 | 19 | 14 |
| 17 | 20 | 14 |
| 18 | 10 | 1 |
| 19 | 14 | 18 |
| 20 | 14 | 18 |
| 21 | 13 | 1 |
| 22 | 12 | 1 |
| 23 | 17 | 21 |
| 24 | ∞ | 0 |
| 25 | ∞ => 15 | 0 => 8 |
| 26 | ∞ | 0 |
| 27 | ∞ | 0 |
| 28 | ∞ | 0 |
| 29 | 14 | 12 |
| 30 | 16 | 12 |
| 31 | 15 | 13 |
| 32 | 15 | 13 |
| 33 | 15 | 22 |
| 34 | 17 | 22 |
| 35 | 18 | 22 |
| 36 | ∞ | 0 |
| 37 | ∞ | 0 |
| 38 | ∞ | 0 |
| 39 | ∞ | 0 |
| 40 | ∞ | 0 |
| 41 | ∞ | 0 |
| 42 | ∞ | 0 |
| 43 | ∞ | 0 |
| 44 | ∞ | 0 |
| 45 | ∞ | 0 |
| 46 | ∞ | 0 |

| CENTER INT. CANDIDATES LIST |
|---|
| 19 |
| 20 |
| 10 |
| 29 |
| 30 |
| 31 |
| 32 |
| 33 |
| 34 |
| 35 |
| 15 |
| 16 |
| 17 |
| 25 |

PROVISIONAL CENTER INT. CANDIDATES LIST

FIG.46

| INT.No. | g | PRECEDING INT. | OUTEST FLAG |
|---|---|---|---|
| 1 | 0 | | |
| 2 | ∞ | | |
| 3 | ∞ | | |
| 4 | ∞ | | |
| 5 | ∞ | | |
| 6 | ∞ | | |
| 7 | ∞ | | |
| 8 | ∞ | | |
| 9 | ∞ | | |
| 10 | ∞ | | |
| 11 | ∞ | | |
| 12 | ∞ | | |
| 13 | ∞ | | |
| 14 | ∞ | | |
| 15 | ∞ | | |
| 16 | ∞ | | |
| 17 | ∞ | | |
| 18 | ∞ | | |
| 19 | ∞ | | |
| 20 | ∞ | | |
| 21 | ∞ | | |
| 22 | ∞ | | |
| 23 | ∞ | | |
| 24 | ∞ | | |
| 25 | ∞ | | |
| 26 | ∞ | | |
| 27 | ∞ | | |
| 28 | ∞ | | |
| 29 | ∞ | | |
| 30 | ∞ | | |
| 31 | ∞ | | |
| 32 | ∞ | | |
| 33 | ∞ | | |
| 34 | ∞ | | |
| 35 | ∞ | | |
| 36 | ∞ | | |
| 37 | ∞ | | |
| 38 | ∞ | | |
| 39 | ∞ | | |
| 40 | ∞ | | |
| 41 | ∞ | | |
| 42 | ∞ | | |
| 43 | ∞ | | |
| 44 | ∞ | | |
| 45 | ∞ | | |
| 46 | ∞ | | |

CENTER INT. CANDIDATES LIST

APPARATUS AND METHOD FOR GUIDING VEHICLE OCCUPANT TO TRAVEL FROM PRESENT POSITION OF VEHICLE TO SET DESTINATION THROUGH DISPLAY UNIT

BACKGROUND OF THE INVENTION:

(1) Field of the Invention

The present invention relates to an apparatus and method for guiding a vehicle occupant to travel from a present position to a set destination to which the vehicle occupant desires to reach using a display unit.

(2) Description of the Background Art

Various types of vehicular route guidance apparatuses have been proposed in which an optimum route from a present position of the vehicle to a destination is searched and the optimum route is displayed together with the present position of the vehicle on a road map image of a display unit screen so as to conveniently guide the vehicle occupant toward the destination.

The optimum route to the destination is searched from an infinite number of routes to the destination formed by retrieving tremendous amounts off intersection network data so that the optimum route is selected as, for example, a running distance of travel is shortest or a required running time of travel is shortest.

Since, however, in the various types of the guidance apparatuses described above, the search of the optimum route is started upon the setting of the destination, the vehicle driver or vehicle occupant needs to wait for the end of the search in order to receive the result of vehicle route guidance to the destination.

To solve such disadvantages as described above, a Japanese Patent Application First Publication No. Heisei 2-184998 exemplifies an improvement in a special search algorithm to shorten a time it takes to search for the optimum route. A Japanese Patent Application First Publication No. Heisei 2-306400 exemplifies a limitation on an area in a road map to be searched to similarly shorten the optimum route search time. In addition, a Japanese Patent Application First Publication No. Heisei 2-56591 exemplifies a hierarchy structure in the intersection network data to similarly shorten the optimum route search time. However, it requires much time for the search for the optimum route for several minutes upon the setting of the destination even when either of the above-described route search techniques disclosed in the above-identified Japanese Patent Application First Publications is used.

SUMMARY OF THE INVENTION:

It is a principle object of the present invention to provide an apparatus and method for guiding a vehicle occupant to travel from a present position of a vehicle to a set destination through a display unit image screen in which immediately after the destination to which the vehicle occupant desires to finally reach is set, the optimum route from the present position of the vehicle to the set destination is quickly searched in a short period of time and the guidance for the vehicle occupant along the displayed optimum route is quickly started.

The above-described object can be achieved by providing an apparatus for guiding a vehicle occupant toward a destination at which the vehicle occupant desires to arrive through a display unit, comprising: a) road map storing means for storing a road map therein; b) setting means through which the vehicle occupant sets the destination; c) first detecting means for detecting a present position of the vehicle and outputting a signal indicative of the present position of the vehicle; d) display control means for reading the road map from said road map storing means, displaying the read road map on the display unit, and displaying the detected present position of the vehicle and an optimum route of travel of the vehicle to the set destination from the present position of the vehicle; e) second detecting means for detecting whether a vehicular ignition key switch is placed at an OFF position or at an ON position; f) first route searching means for previously searching the optimum routes of travel of the vehicle to respective intersections from the detected present position of the vehicle when the vehicular ignition key switch is placed at the OFF position, said respective intersections falling in a region surrounding the present position of the vehicle; and g) second route searching means for immediately displaying the optimum route from the present position of the vehicle to the set destination if the set destination corresponds to one of the respective intersections falling in the region through the display control means when the ignition key switch is placed at the ON position and the vehicle occupant sets the destination, otherwise, retrieving the result of search by the first route search means and the read road map data so as to derive the optimum route from the set destination toward the present position of the vehicle when the ignition key switch is placed at the ON position when the destination is set, and immediately displaying the derived optimum route from the set destination toward the present position of the vehicle on the display unit through the display control means.

The above-described object can also be achieved by providing a method for guiding a vehicle occupant toward a destination at which the vehicle occupant is desired to arrive via a display unit, comprising the steps of: a) storing a road map at least including a present; position of the vehicle on the road map; b) setting the destination; c) detecting the present position of the vehicle and outputting a signal indicative of the present position of the vehicle; d) reading the road map, displaying the read road map on the display unit, and displaying the detected present position of the vehicle and an optimum route of travel of the vehicle to reach to the set destination from the present position of the vehicle; e) detecting whether a vehicular ignition key switch is placed at an ON position; f) previously searching the optimum routes of travel of the vehicle to respective intersections from the detected present position of the vehicle when the vehicular ignition key switch is placed at an OFF position, said respective intersections falling in a region surrounding the present position of the vehicle; and g) immediately displaying the optimum route from the present position of the vehicle to the set destination if the set destination corresponds to one of the respective intersections falling in the region when the ignition key switch is placed at the ON position and the vehicle occupant sets the destination, otherwise, retrieving the result of search at said step f) and the read road map data so as to derive the optimum route from the set destination toward the present position of the vehicle when the ignition key switch is placed at the ON position when the destination is set, and immediately displaying the derived optimum route toward 20 the present position of the vehicle on the display unit.

The above-described object can also be achieved by providing a system for a vehicular travel route guidance to a destination to which the vehicle occupant desires to reach from a present position of the vehicle, comprising: a) road map storing means for storing a road map data therein; b) first detecting means for detecting the present position of the vehicle using a vehicle forward direction sensor and GPS satellites wave receiver; c) second detecting means for detecting whether a key switch of an ignition key is closed or open; d) setting means through which the vehicle occupant sets the destination when the key switch is closed; e) display means for reading and displaying the road map data from the road map storing means on a display unit image screen and and For superimposing the detected present position of the vehicle and an optimum route from the detected present position of the vehicle to the set destination on the displayed road map after the destination is set with the key switch closed; f) first route searching means for previously searching for one of the routes along which the vehicle is to travel at optimum, said optimum route being present in a road segment from the detected present position of the vehicle to each of a plurality of intersections failing in a first region surrounding the detected present position of the vehicle, when the key switch is open so that the vehicle stops; g) second route searching means for searching for one of the routes along which the vehicle is to travel at optimum on the basis of the result of route search by said first route searching means and read road map data, said optimum route being present in a road segment from the set destination to each of a plurality of intersections falling in a second region surrounding the set destination, when the key switch is closed and the destination is set; and h) display control means, responsive to the set of the destination with the key switch closed, for combining the optimum route searched by the first route searching means and that searched by the second route searching means so as to derive and display the optimum route from the present position to the set destination on the road map of the display unit image screen.

BRIEF DESCRIPTION OF THE DRAWINGS

FIG. 6 is an operational flowchart indicating a program subroutine of an optimum route searching procedure at a step S8 of FIG. 5B for each intersection surrounding a present position of a vehicle in which the route guidance apparatus in the first embodiment is mounted.

FIGS. 12A and 12B are explanatory views of a result of searching a route from the present position stored in an S-RAM shown in FIG. 2.

FIGS. 13A and 13B are explanatory views of a result of searching a route from the present position stored in the S-RAM.

FIGS. 14A and 14B are explanatory views of a result of searching a route from the present position stored in the S-RAM.

FIGS. 15A and 15B are explanatory views of a result of searching a route from the present position stored in the S-RAM.

FIGS. 16A, 16B, and 16C are explanatory views of a result of searching a route from the destination stored in a D-RAM.

FIGS. 17A, 17B, and 17C are explanatory views of a result of searching a route from the destination stored in the D-RAM.

FIGS. 18A, 18B, and 18C are explanatory views of a result of searching a route from the destination stored in the D-RAM.

FIGS. 19A, 19B, and 19C are explanatory views of a result of searching a route from the destination stored in the D-RAM.

FIGS. 23A, 23B, and 23C are explanatory views of a result of searching a route from the destination stored in the D-RAM in the case of the second embodiment.

FIGS. 24A, 24B, and 24C are explanatory views of a result of searching a route from the destination stored in the D-RAM in the case of the second embodiment.

FIGS. 25A, 25B, and 25C are explanatory views of a result of searching a route from the destination stored in the D-RAM in the case of the second embodiment.

FIGS. 26A, 26B, and 26C are explanatory views of a result of searching a route from the destination stored in the D-RAM in the case of the second embodiment.

FIG. 40 is an explanatory view indicating the result of each of the route surrounding the present position of the vehicle stored in the D-RAM in the case of the third embodiment.

FIG. 41 is an explanatory view indicating the result of each of the route surrounding the present position of the vehicle stored in the D-RAM in the case of the third embodiment.

FIG. 42 is an explanatory view indicating the result of each of the route surrounding the present position of the vehicle stored in the D-RAM in the case of the third embodiment.

FIG. 43 is an explanatory view indicating the result of each of the route surrounding the present position of the vehicle stored in the D-RAM in the case of the third embodiment.

FIG. 44 is an explanatory view indicating the result of each of the route surrounding the present position of the vehicle stored in the D-RAM in the case of the third embodiment.

FIG. 45 is an explanatory view indicating the result of each of the route surrounding the present position of the vehicle stored in the D-RAM in the case of the third embodiment.

FIG. 46 is an explanatory view indicating the result of each of the route surrounding the present position of the vehicle stored in the D-RAM in the case of the third embodiment.

DETAILED DESCRIPTION OF THE PREFERRED EMBODIMENTS

Reference will hereinafter be made to the drawings in order to facilitate a better understanding of the present invention.

(First Embodiment)

Figure 1:
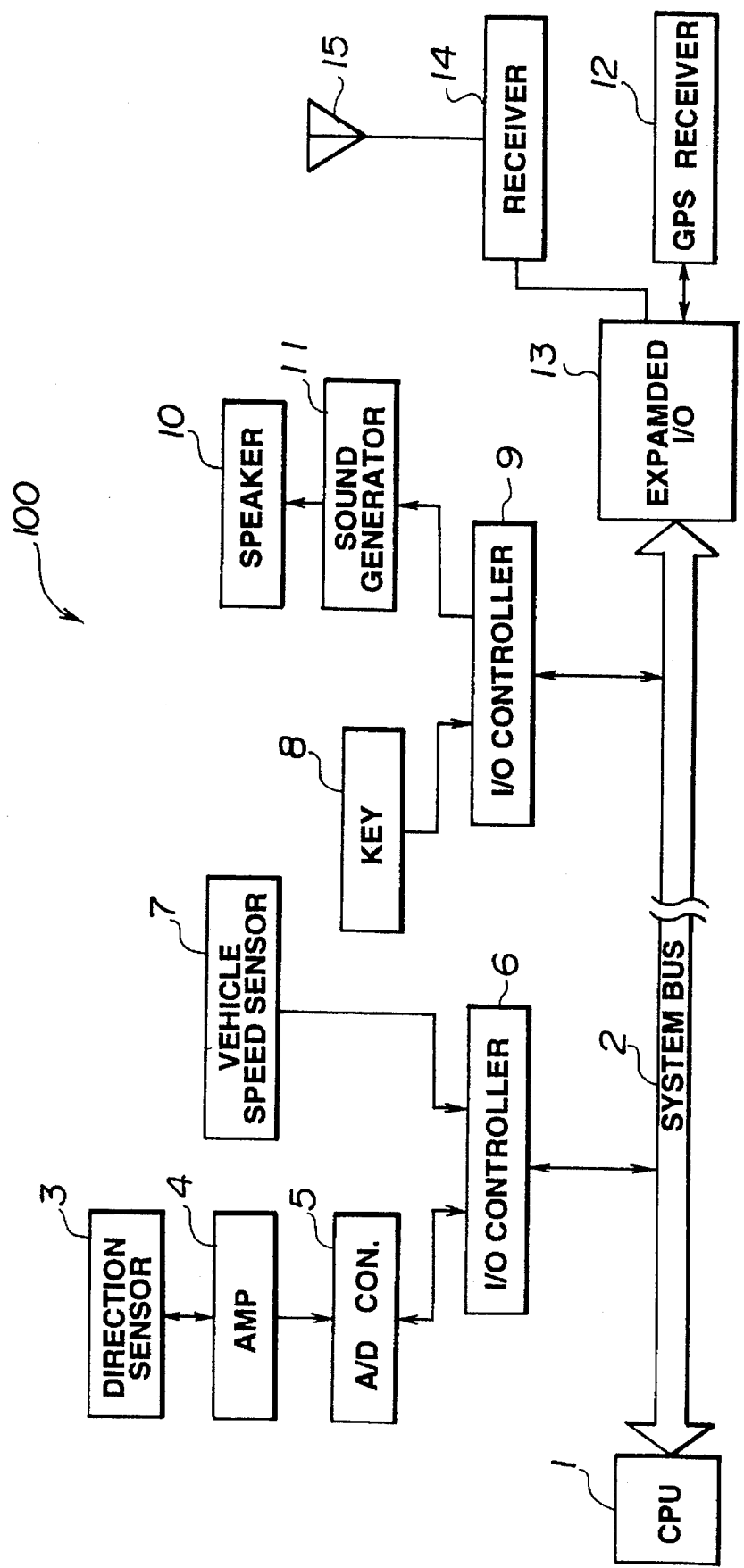
FIG. 1 is a circuit block diagram of an apparatus for guiding a vehicle occupant to travel from a present position to a destination to which the vehicle occupant desires to finally reach via a searched optimum route using a display unit in a first preferred embodiment according to the present invention.
Figure 2:
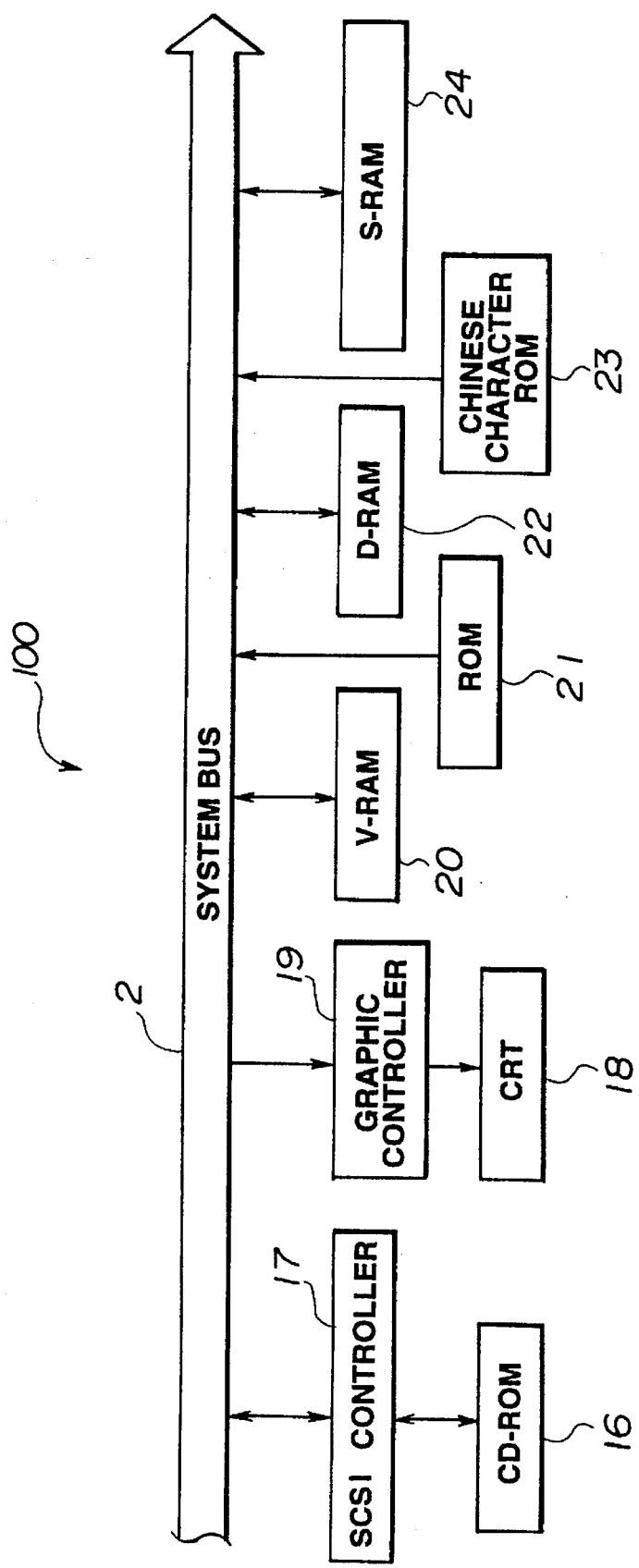
FIG. 2 is another circuit block diagram of the route guidance apparatus in the first preferred embodiment according to the present invention which is integrated with the circuit shown in FIG. 1.

FIGS. 1 and 2 integrally show a circuit block diagram of an apparatus for guiding a vehicle occupant to travel from a present position of a vehicle to a set destination via an optimum route using a display unit in a first preferred embodiment according to the present invention.

Referring to FIG. 1, a vehicular route guidance system 100 includes a microcomputer having CPU (Central Processing Unit) 1 and peripheral units.

The CPU 1 receives and transmits from and to various sensors (controllers) or various peripheral units via a system bus 2 and executes preset control program routines as will be described later. Thus, the CPU 1 calculates the present position of the vehicle continuously and searches for an optimum route from the present position at which the vehicle stands to the destination to which the vehicle occupant desires to reach.

A direction sensor 3 is connected to the system bus 2 via an amplifier 4, A/D converter 5, and I/O controller 6 to detect a forward direction of the vehicle. A vehicle speed sensor 7 is, for example, attached around an output axle of a vehicular power transmission and generates a pulse train signal having a predetermined number of pulses per rotation of a speedometer pinion. The vehicle speed sensor 7 is connected to the system bus 2 via the I/O controller 6. The CPU 1 detects a pulse period or pulse number per unit off time from the pulse train signal derived by the vehicle speed sensor 7 so as to determine a running speed of the vehicle and detects the pulse repetition rate so as to determine the running (or traveling) distance of the vehicle.

A key 8 serves as an operating member to input data on such as various commands to the various peripheral units, destination to which the vehicle occupant has desired to finally reach, and so forth and is connected to the system bus 2 via the I/O controller 9.

A vocal (acoustic) output speaker 10 is connected to the system bus 2 via a sound generator 11 and I/O controller 9. A GPS (Global Positioning System) receiver 12 serves to receive GPS signals from a plurality of GPS satellites and calculates the GPS position measurement to determine an absolute position of the vehicle on the earth and the vehicle forwarding direction of the vehicle.

For the GPS navigation and vehicular forward direction sensor, U.S. Pat. Nos. 4,899,285, 4,743,913, 4,782,447, 4,857,455, 4,774,672, 4,774,671, 4,763,270, and 4,782,447 are exemplified. The disclosures of the above-listed United States Patents are herein incorporated by reference.

Referring to FIG. 2, a CD-ROM (Compact Disc-Read Only Memory) 16 serves to store road map data including intersection network data and is connected to the system bus 2 via an interface SCSI (Small Computer System Interface) controller 17. A CRT (Cathode Ray Tube) 18 serves as a VDT (Visual Display Terminal) and is connected to the system bus 2 via a graphic controller 19. A road map surrounding the present position of the vehicle is displayed on the CRT 18. The CRT 18 also displays and superimposes the present position of the vehicle and optimum route to the destination on the displayed road map. The system bus 2 is connected with an image storing V-RAM (Video-Random Access Memory) 20, a ROM 21 which stores the series off control program as will be described later, a Chinese Character D-RAM (Dynamic-Random Access Memory) which stores a result of route searching from the destination to the present position of the vehicle, and S (Static)-RAM 24 which stores a result of route searching from the present position and its surrounding intersections during an ignition key switch off state as will be described later. In FIG. 1, reference numeral 13 denotes an expanded I/O.

Figure 3:
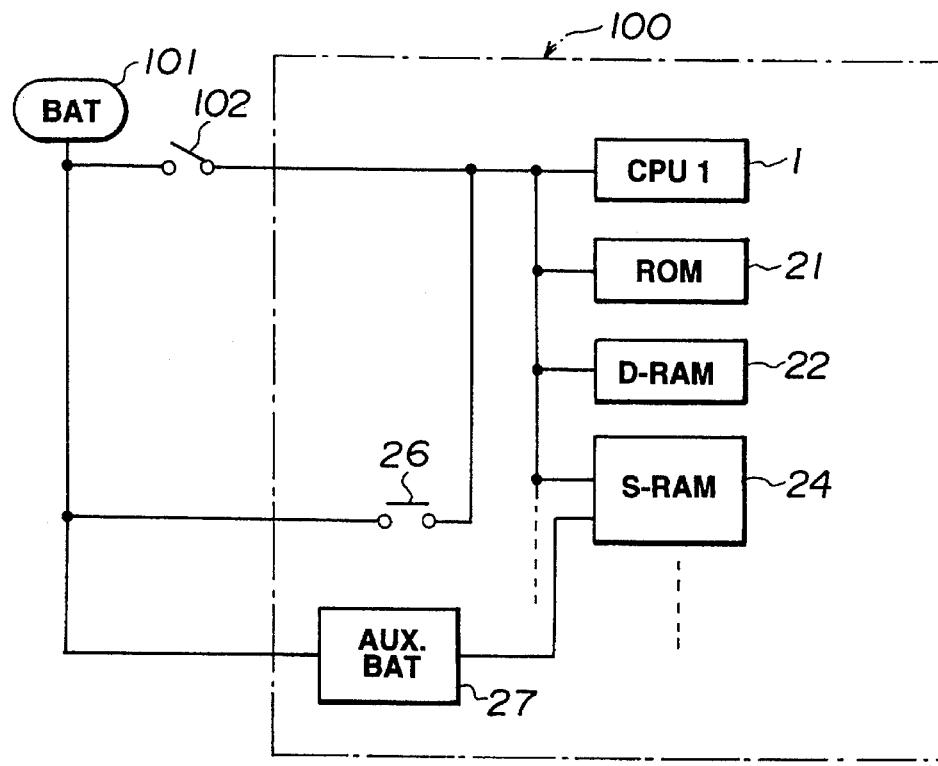
FIG. 3 is a circuit block diagram of a power supply system to the route guidance apparatus in the case of the first embodiment shown in FIGS. 1 and 2.

FIG. 3 shows a power supply system of the route guidance system 100 shown in FIGS. 1 and 2.

It is noted that any electronic systems, for example, a vehicular ignition system, is connected to the vehicular battery 101 via the ignition key switch 102 shown in FIG. 3.

The route guidance system 100 shown in FIGS. 1 and 2 in the first embodiment receives the power supply from a vehicular battery 101 via a key switch 102. The key switch 102 is closed when an ignition key (not shown) is placed in any one of the positions of ACC, ON, and START and is open when the ignition key is placed in OFF position. Hence, unless the ignition key is set in the OFF position, the power from the vehicular battery 101 is continuously supplied to the vehicular route guidance system 100. It is noted that S-RAM 24 receives two parallel power supply systems; normally, the power supply from the battery 101 is carried out as in the same way as CPU 1, ROM 21, and D-RAM 22, but, even when the normal power supply system from the battery 101 is interrupted, the power supply to the S-RAM is backed up by means of an auxiliary battery cell 27 which is a separate DC power supply from the vehicle battery 101 so that the content of the S-RAM 24 is held. It is also noted that the auxiliary battery cell 27 is always chargeable from the connected vehicular battery 101.

A timer 26 is provided whose contacts are closed when the key switch 102 is operated to supply the power to the route guidance system 100 and are open after the power supply to the system 100 is stopped and, thereafter, the contacts hold their closed state for a predetermined period of time. Hence, even if the key switch 102 is turned to off, the DC power from the vehicle battery 101 is continued to be supplied to the route guidance system 100 for the predetermined period of time. When the predetermined period of time has elapsed, the contacts of the timer 26 are open so that the power supply to the route guidance system 100 is stopped. The predetermined time period set by the timer 26 is defined as a time duration sufficient for the system 100 to carry out the optimum route searching for adjacent intersections surrounding the present position of the vehicle. In other words, even if the vehicle occupant renders the vehicle park and the ignition key is switched to the OFF position, the power is supplied to the vehicular route guidance system 100 for the predetermined period of time so that the route guidance system 100 can search for the optimum route to each intersection surrounding the present position of the vehicle. The intersection means an area of potential collision between vehicles traveling on different roadways that cross.

Figure 4:
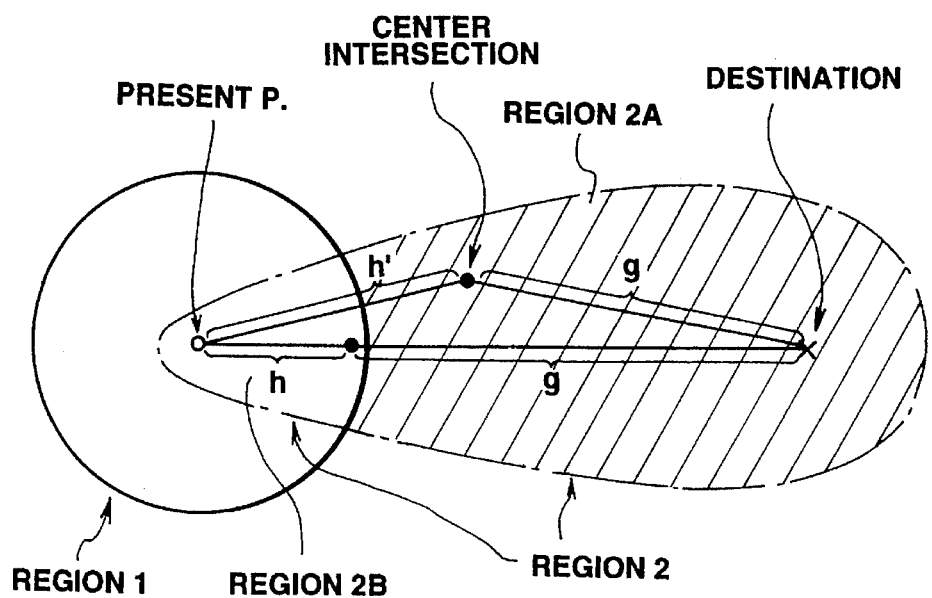
FIG. 4 is an explanatory view for explaining a searching method of the optimum route in the first embodiment shown in FIGS. 1 through 3.

FIG. 4 shows an explanatory view for explaining a method of searching an optimum route in the case of the first embodiment.

In the first embodiment, while the timer 26 is operated to supply the battery power to the route guidance system 100 during the turn off of the ignition key switch 102, the CPU 1 calculates the present position of the vehicle and searches for one route having a magnitude of road distance h from a start intersection to each one of a plurality of intersections, the road distance h providing so least or minimum value, from among the plurality of routes from the present position to any one of the intersections.

The road distance value may be changed to a time duration it takes For the vehicle to travel to the corresponding one of the intersection. The road distance is defined as a distance along a road segment present between the mutually adjacent intersections.

Such an optimum route searching of the route surrounding the present position as described above is exemplified by a Japanese Patent Application First Publication No. Showa 62-86499.

A general concept of the optimum route searching method disclosed in the above-identified Japanese Patent Application First Publication will briefly be described below.

That is to say, the road map data base including the intersection network data and a memory to store the result of optimum route searching are prepared. The memory stores the road distance h from a start intersection to each selected intersection and a preceding intersection A which is placed before each selected intersection on the optimum route from the start intersection to each selected intersection. It is noted that the start intersection means an intersection from among the intersections near to the present position of the vehicle and is specified as the start intersection which satisfies a predetermined condition. Hereinafter, the intersection to be searched to calculate the route is called a center intersection and the intersections which are adjacent to the center intersection are called adjacent intersections.

First, the road distance of the start intersection is denoted by h as h=0 and those h of the other intersections surrounding the start intersection are initially set to constants corresponding to an infinity (+∞). Then, the route search is started with the start intersection as the first selected center intersection. The road distances h1 which denote the road distances from the first selected center intersection to its corresponding adjacent intersections are derived by adding the road distance h0 stored as the road distance from the first selected center intersection to the respective road distances h1 from the center intersection to the adjacent intersections and are compared with the road distances h2 which are already stored as the road distances of the adjacent intersections to the start intersection. If the currently calculated road distance h1 is less than h2, the road distance h2 of the corresponding one of the adjacent intersections is changed to h1 and one of the intersections preceding the corresponding one of the adjacent intersections (hereinafter, referred to as a preceding intersection A) is set as the center intersection. If the above-described series of processing are executed for all adjacent intersections adjacent to the first selected center intersection, the next new center intersection is set from one of all of the adjacent intersections, except the intersection which has already been selected as the center intersection, the new center intersection having the minimum value of road distance h1 from the start intersection thereto. Hereinafter, the above-described series of processing are carried out for the new center intersection.

In this way, the new center intersections in the order of smaller road distances h from the start intersection thereto are successively set so as to continue the route search operation.

When one of the intersections at which the route search is ended has been reached, the preceding intersections A are traced back sequentially so as to return to the start intersection. The traced route is the optimum route saving a minimum road distance from the start intersection to the above-described finally reached intersection.

After the ignition key switch 102 is turned on and the vehicle occupant sets the destination through the key 8, the route guidance system 100 carries out the search of the optimum route from the set destination. It is noted that the optimum route from the present position to the set destination is defined as the route having the least value of road distance between the present position and set destination. The search for the optimum route from the set destination to the present position is carried out in such a way that one of the intersections from among those near to the set destination is specified as a target intersection which satisfies the predetermined condition as will be described later and the search of the optimum route is started from the intersections surrounding the target intersection. In addition, the road distances g from the respective intersections to the target intersection, the preceding intersections B before the respective intersections on the optimum route from the target intersection to the respective intersections, and estimated road distances h's from the respective intersections to the start intersection are stored in the memory to store them as the result of route search. It is noted that, in the first embodiment, a straight (line) distance from each of the respective intersections to the present position is calculated on the basis of the road map data and this straight distance is assumed to be the estimated road distance h'.

That is to say, at first, 0 is set to the road distance on the target intersection as g=0 and constants corresponding to the infinity +∞ are set to those g of the other intersections. Then, with the target intersection first set as the center intersection, the route search from the set destination toward the start intersection is started.

After adding the road distance g=0 stored in the road distance of the center intersection to the road distances g1 from the center intersection to each of the adjacent intersections, the added road distances are sequentially compared with the road distances g2 from the target intersection to the respective adjacent intersections already stored in memory areas of the road distances of the adjacent intersections of the memory.

If the presently calculated road distance g1 is less (smaller) than the corresponding g2, the road distance g2 of the corresponding one of the adjacent intersections to g1 and the center intersection is updated to the preceding intersection B of the corresponding one of the adjacent intersections. Furthermore, the estimated road distance h' from the corresponding one of the adjacent intersections to the start intersection is calculated and stored in the memory.

When the above-described series of processing are ended for all adjacent intersections to the center intersection, the next center intersection having a minimum sum (g+h') between the road distance g from the target intersection to the corresponding one of the adjacent intersections and estimated road distance h' from the start intersection to the corresponding one of the adjacent intersection is, in turn, set. Thereafter, the same series of processing are executed for the adjacent intersections to the newly set center intersection.

In this way, when the new center intersections are successively set in such an order as the sum (g+h') between the road distance g to the target intersection and the estimated road distance h' to the start intersection becomes smaller, the route searching from the set destination is carried out.

In a case where, during this route search, one of the intersections at which the route search for the intersections from the present position of the vehicle is already ended, namely, the intersection via which the optimum route having the road distances h from the start intersection has been ended, a sum (g+h) between the road distance g from the target intersection to the corresponding one of the adjacent intersections and the road distance h from the start intersection to the same adjacent intersection, namely, the road distance (g+h) from the start intersection to the target intersection via the same adjacent intersection is derived and compared with g3 stored as the road distance of the start intersection.

The road distance g3 of the start intersection is a magnitude of road distance from the start intersection to the target intersection. As the result of comparison, the road distance (g+h) of the same adjacent intersection is smaller than g3, the road distance g3 of the start intersection is changed to (g+h) and the same adjacent intersection is set to the preceding intersection B before the start intersection. It is noted that the preceding intersection B before the start intersection is an intersection within a region 1 in which the route search is First to arrive during the route search from the destination, as shown in FIG. 4. Hereinafter, such an intersection as described above is called a contacting intersection since this intersection is placed on a point of location interfacing between the region 1 and region 2 of FIG. 4.

If the route search is started from the destination using the above-described method, the search region 2 shown in FIG. 4 becomes narrower as the searched intersection becomes nearer to the present position of the vehicle. If the route search is advanced from the destination with the center intersections being set in the descending order of the values of road distances (g+h'), the start intersection is finally set as the center intersection. At this time, the route search from the destination is ended. Finally, one of the routes via the contacting intersection stored in the preceding intersection B of the start intersection is the optimum route having the least road distance from the target intersection to the start intersection, this optimum route being represented by the final road distance g of the start intersection.

If the route search from the region 1 surrounding the present position of the vehicle is compared with that from the region 2 surrounding the set destination, the former is a kind of search having a non-directive (radiative) characteristic and the latter is a kind of search having a directive characteristic.

Although, in the former method of search, the intersections have been searched in the ascending order such that the road distances h from the start intersection to the respective intersections get smaller, in the latter search method the intersections are searched in the ascending order such that the sum (g+h') between those road distances g from the target intersection thereto and estimated road distances h' between these intersections and the start intersection get smaller. Hence, if times required to carry out the searching operations for the optimum route using both former method and latter method are compared with each other, the search in the latter case can be ended by about ⅕ the former search method under the same condition since, in the latter case in which the directive characteristic route search is carried out, the numbers of times the optimum routes from the set destination to the respective intersections are calculated are less.

Thus, during the battery power supply continued For the predetermined period of time after the ignition key switch 102 is turned off, the non-directional route search surrounding the present position of the vehicle is advanced as many as possible and the result of search is stored in the S (Static)-RAM 24. If the destination is set after the ignition key switch 102 is turned on, the results of route searches surrounding the present position of the vehicle are read from the S-RAM 24 so that the directional route search is carried out from the set destination toward the present position off the vehicle. Hence, when the latter route search reaches to the region 1 in which the former route search is ended, the optimum route is selected using the results of searches from the present position of the vehicle to the destination. As shown in FIG. 4, since the optimum route has been searched for the intersections within a region 2B within the latter search region 2, the calculation time for the region 2B is not necessary so that the whole time of route search can accordingly be shortened. In a case where the route search region 1 surrounding the present position is wide and the destination is to be set within the former search region 1, the route search from the present position to the destination can almost instantaneously be ended upon the setting of the destination after the ignition key switch 102 is turned on.

Figure 5B:
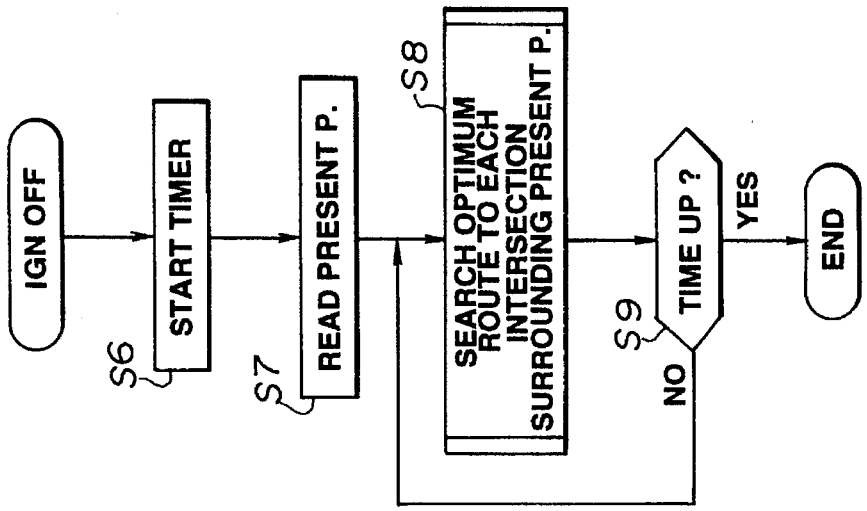
FIGS. 5A and 5B are operational flowcharts on respective main control program routines of a microcomputer in the first embodiment.
Figure 5A:
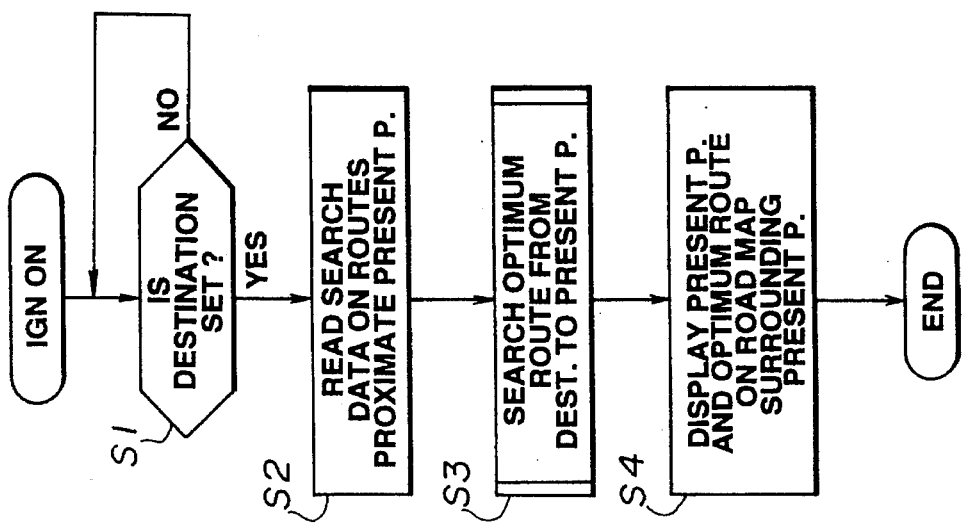

FIGS. 5A and 5B show program flowcharts indicating two separate main control program routines executed by the CPU 1.

Figure 7:
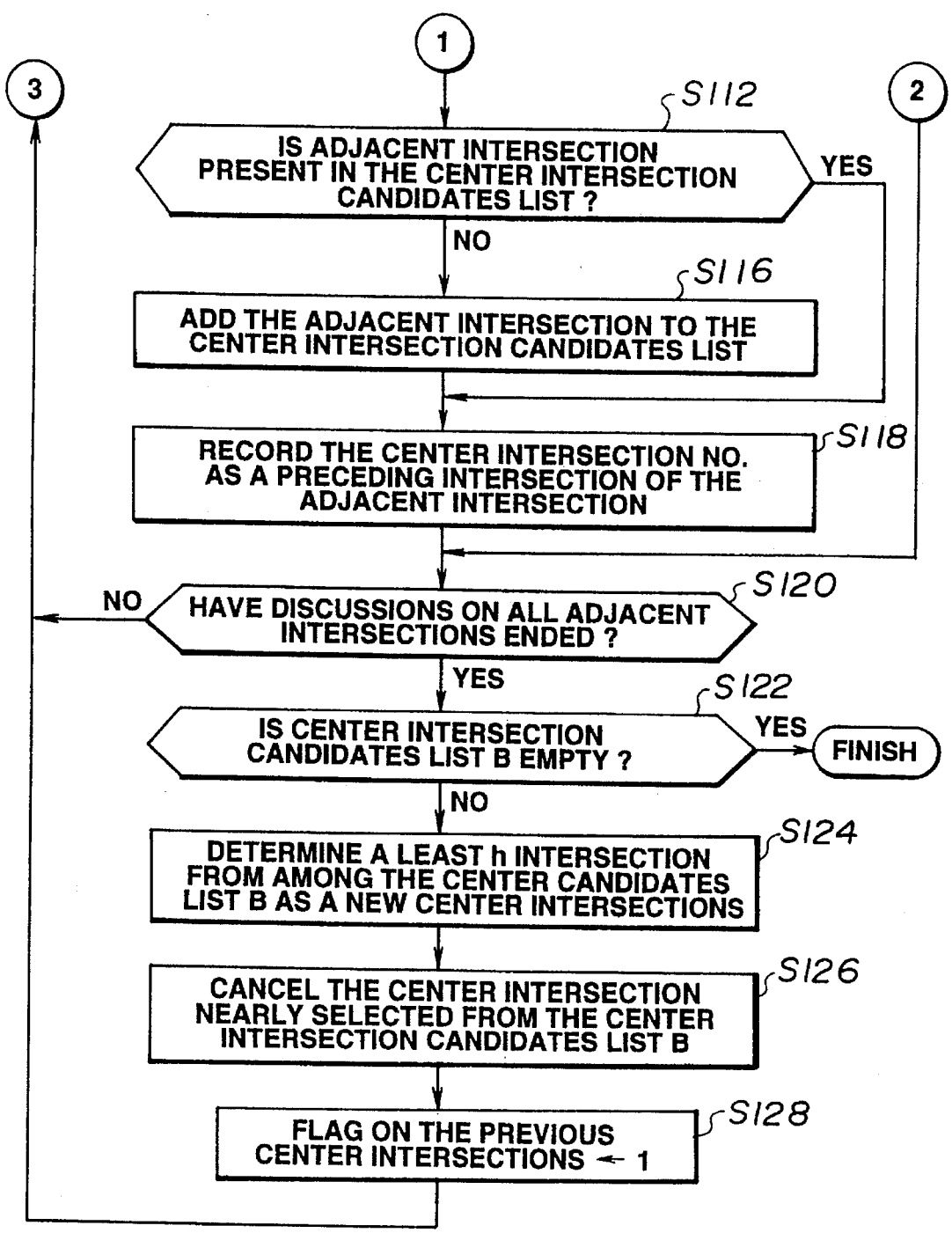
FIG. 7 is an operational flowchart indicating the program subroutine of the optimum route searching for each intersection surrounding the present position subsequent to the program subroutine shown in FIG. 6.

FIGS. 6 and 7 are integrally program flowchart representing the optimum route search on the respective intersections surrounding the present position of the vehicle.

Figure 8:
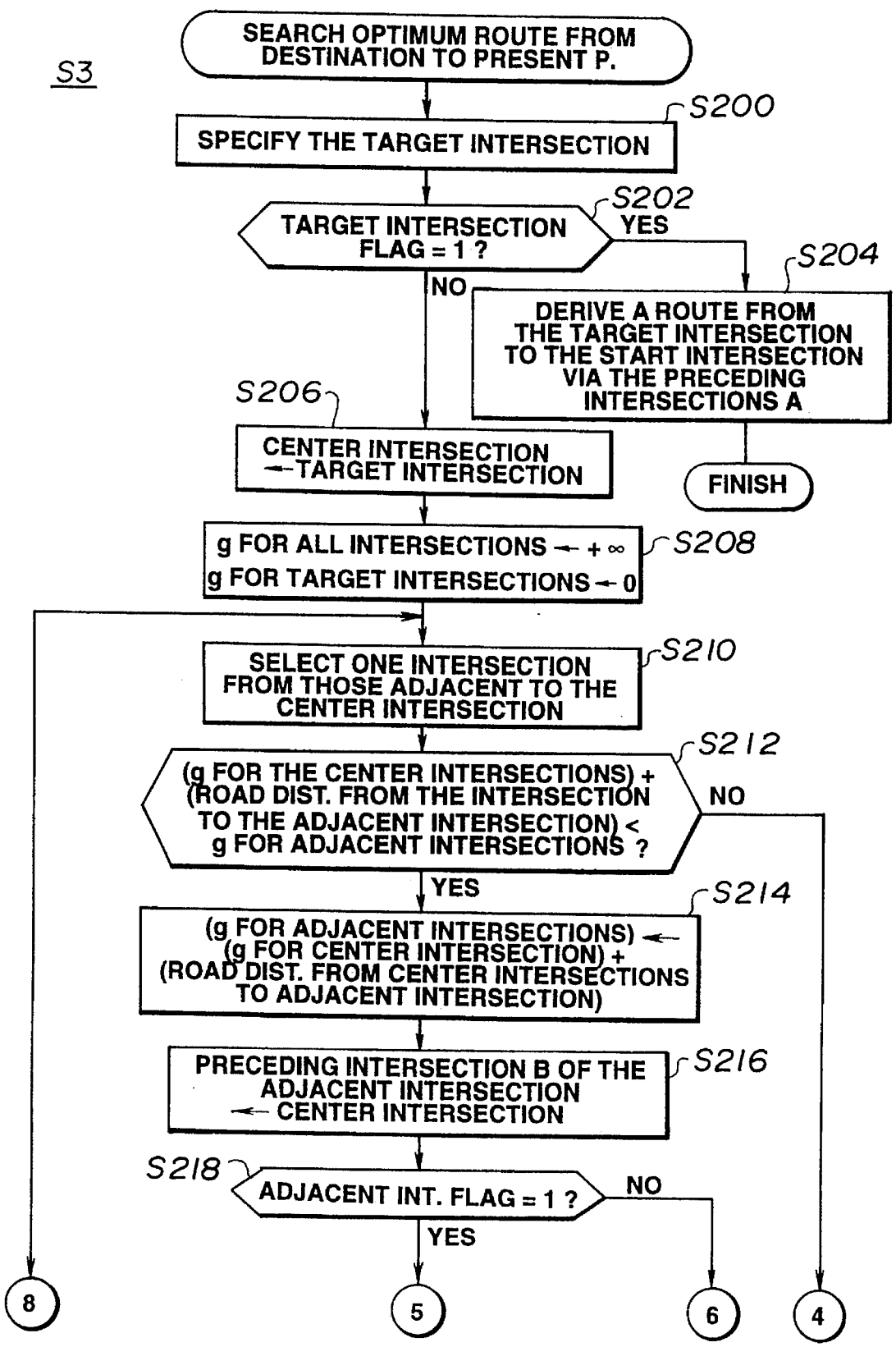
FIG. 8 is an operational flowchart indicating another search program subroutine of the optimum route from the destination to the present position of the vehicle at a step S3 of FIG. 5A.
Figure 9:
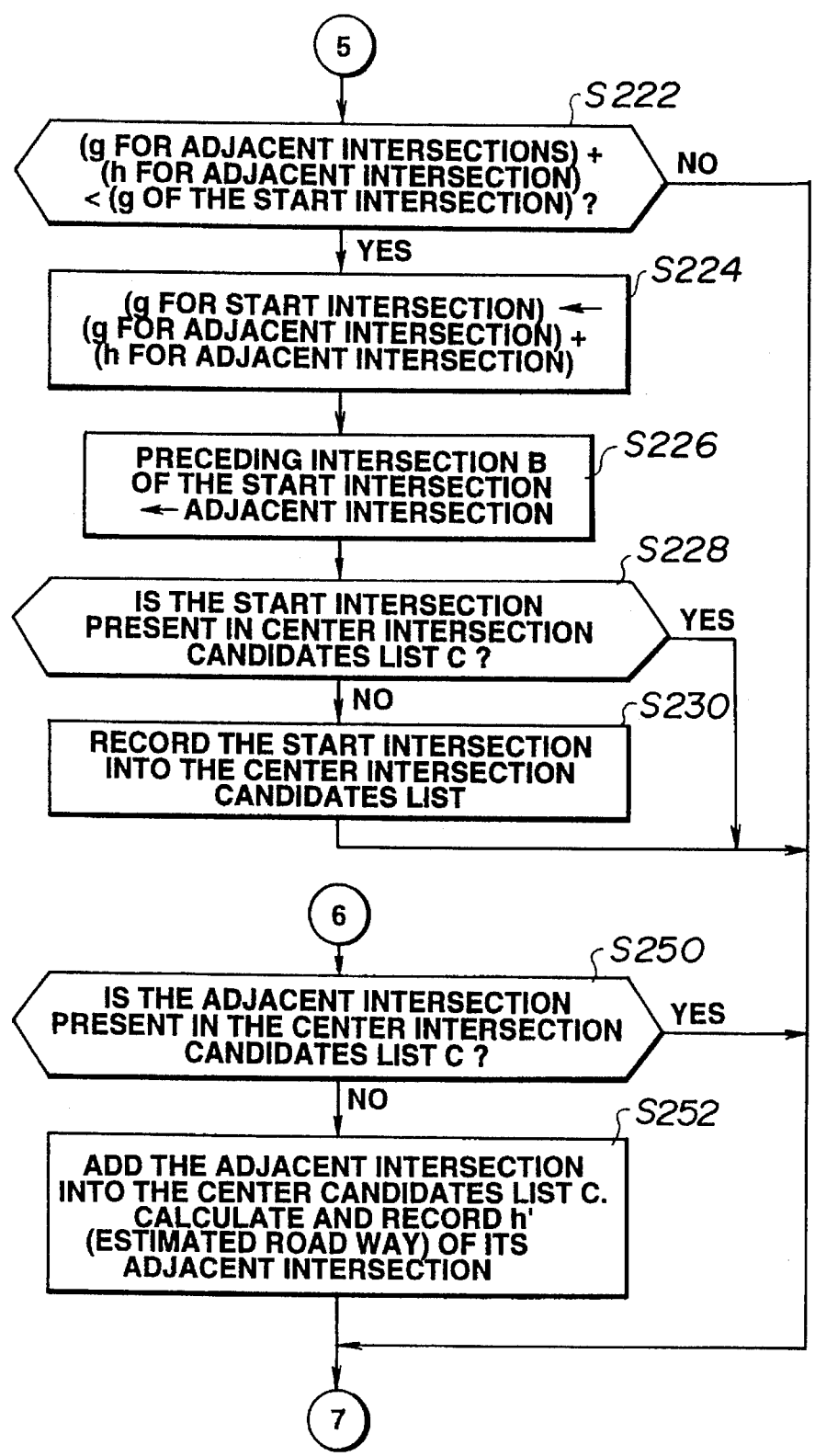
FIG. 9 is an operational flowchart indicating the search program subroutine of the optimum route from the destination to the present position of the vehicle subsequent to FIG. 8.
Figure 10:
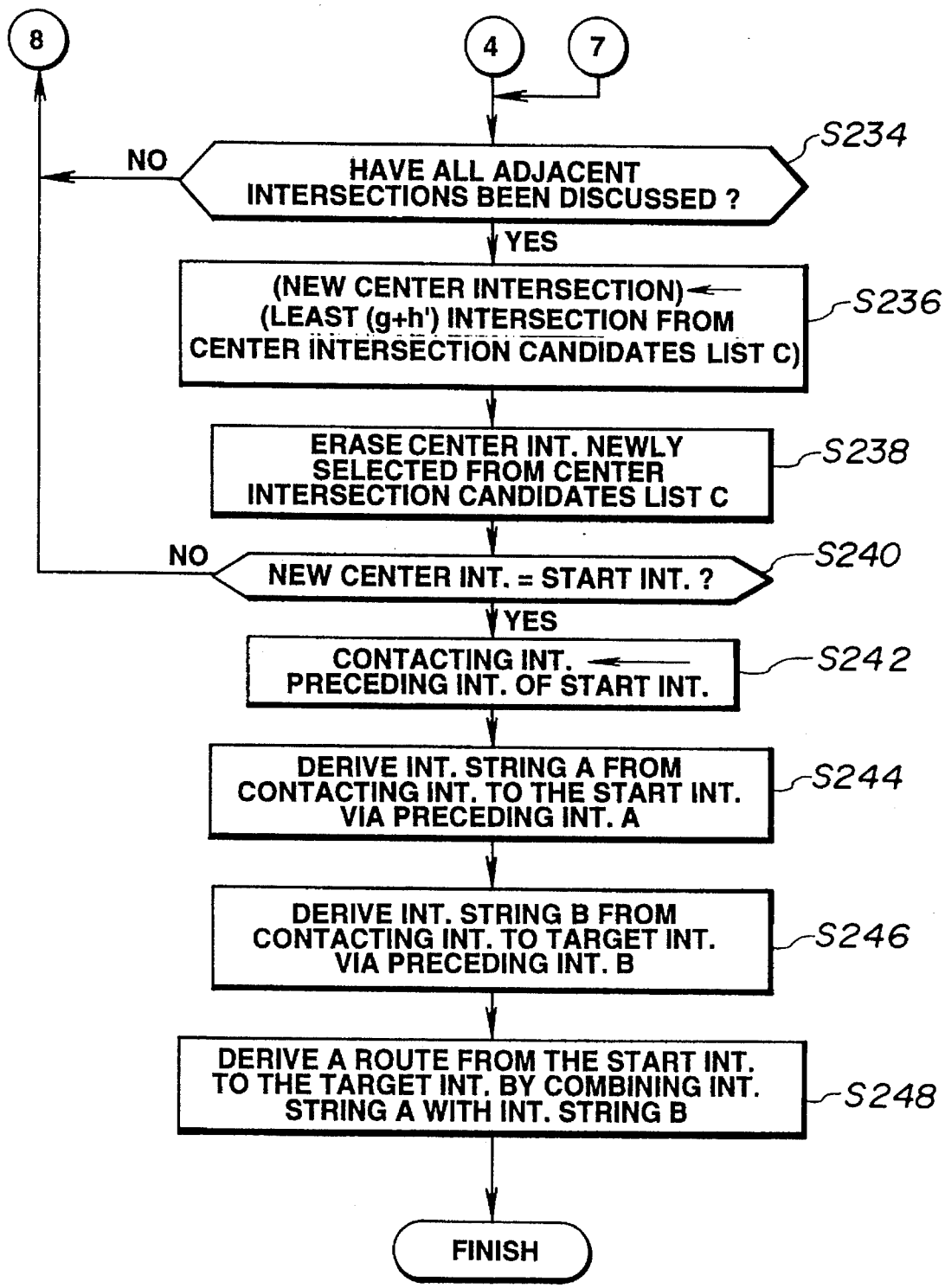
FIG. 10 is an operational flowchart indicating the program subroutine of the optimum route from the destination to the present position of the vehicle subsequent to FIG. 9.

FIGS. 8, 9, and 10 are integrally flowcharts indicating the optimum route search program from the destination toward the present position of the vehicle.

Figure 11:
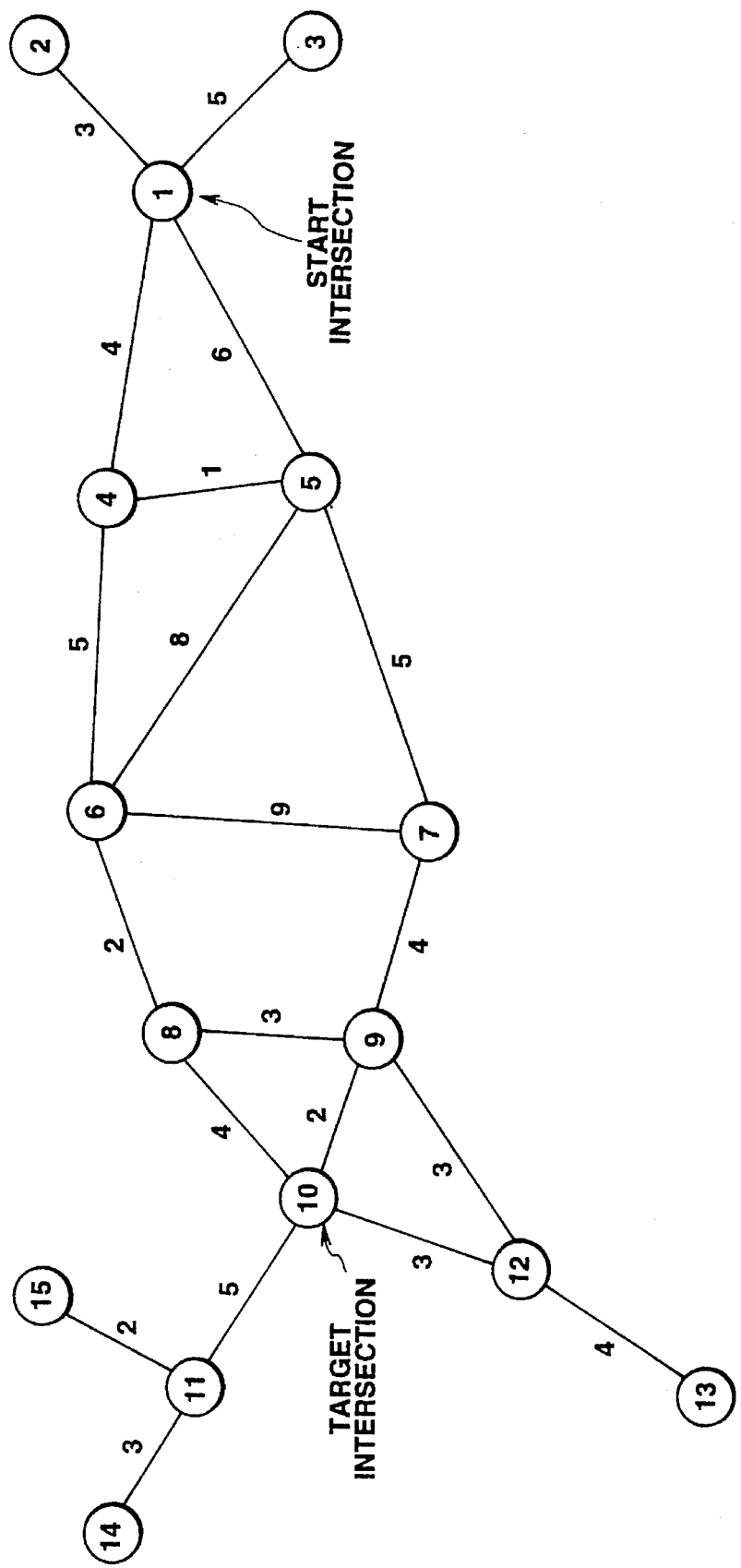
FIG. 11 is an explanatory view for explaining an intersection network so as to facilitate understanding of a method of searching the optimum route in the case of the first embodiment.

FIG. 11 shows an explanatory view of an example of intersection network for explaining the search method of the optimum route.

Hereinafter, the operation of the first embodiment will be explained with reference to FIGS. 5A through 11.

When the power to the route guidance system 100 is supplied upon the turn on of the ignition key switch 102, the CPU 1 executes an IGN ON program shown in FIG. 5A.

At a step S1, the CPU 1 determines whether the destination is set or not through the key 8. If YES at the step S1, the routine goes to a step S2. If NO at the step S1, the execution of the program shown in FIG. 5A is repeated at the step S1.

If the destination is set at the step S1, the routine goes to the step S2 in which the searched data on the optimum route to the respective intersections surrounding the present position are read. These data on the optimum route read in the CPU 1 are data calculated during the battery power continuously supplied to the route guidance system 100 by means of the timer 26 upon the turn off of the ignition key switch 102.

At a step S3, a subroutine shown in FIGS. 8 through 10 is executed as will be described later so that the optimum route from the set destination to the present position of the vehicle is searched using the route search data read from the S-RAM 24 and surrounding the present position of the vehicle. If the optimum route is selected from the set destination to the present position of the vehicle, the routine goes to a step S4 in which the road map surrounding the present position is displayed on the CRT 18 and the optimum route from the present position of the vehicle to the set destination is superimposed on the road map displayed on the CRT 18. In addition, together with the movement of the vehicle, the road map is scrolled and the present position is calculated and updated as the vehicle runs.

On the other hand, when the ignition key switch 102 is turned off, the CPU 1 starts the execution of the separate IGN OFF main program routine shown in FIG. 5B.

At a step S6, the timer 26 is started upon the turn off of the ignition switch 102. At a step S7, the CPU 1 reads the present position of the vehicle from the D-RAM 22. The CPU 1 always the calculation of the present position of the vehicle on the basis of the signals derived from the direction sensor 3, vehicle speed sensor 7, antenna 15, and GPS receiver 12 during the turn on of the ignition key switch 102.

That is to say, the vehicular running distance of the vehicle is detected by counting the number of pulses from the pulse train signal of the vehicle speed sensor 7 and the CPU 1 calculates a running locus on which the vehicle has traveled on the basis of the detected running distance and the vehicular running direction detected by the direction sensor 3. Furthermore, a map matching between the calculated running locus and road map stored in the CD-ROM 16 is carried out so that the present position of the vehicle is calculated and is stored in the D-RAM 22.

Hence, if the ignition key switch 102 is turned off, a stopped position of the vehicle, namely, the present position of the vehicle is stored in the D-RAM 22, the content of the stored position being read. At this time, if the accurate present position of the vehicle is detected through the GPS receiver 12, the present position of the vehicle is corrected using the present position derived from the GPS receiver 12.

At a step S8, the subroutine shown in FIGS. 6 and 7 is executed so as to start the optimum route search to the respective intersections surrounding the present position and is stored in the S-RAM 24 as the result of search.

At a step S9, the execution of the program is ended upon the passage of the predetermined time set by the timer 26 and the power supply to the route guidance system 100 is ended.

Hence, even if the ignition key switch 102 is turned off, the power to the route guidance system 100 is continued to be supplied and the optimum route to the respective intersections surrounding the present position is searched. Then, when the ignition key switch 102 is again turned on and the destination is set, the optimum route from the destination to the present position is searched by retrieving the optimum route to the respective intersections surrounding the present position and the optimum route from the present position to the destination is, thus, superimposed on the road map on the CRT 18 so as to help guiding the vehicle occupant to the set destination through the CRT 18.

FIGS. 12A through 15B show contents of the result of search stored in the S-RAM 24.

In FIGS. 12A, 13A, 14A, and 15A which show the optimum route pieces of information (List A). In these List A, the respective intersections surrounding the present position of the vehicle, road distances h to these intersections, flags indicating that these intersections are set as the center intersections, the preceding intersections A on the routes to the respective intersections surrounding the present position of the vehicle, the road distances g from the set destination to the respective intersections surrounding the set destination, and the preceding intersections B on the routes from the destination to the respective intersections surrounding the set destination are included therein.

On the other hand, in FIGS. 12B, 13B, 14B, and 15B (List B), the intersections which are candidates for the center intersections are included. It is noted that, at any one of the intersections which has been selected as the center intersection, the optimum route from the start intersection and the road distance h are calculated.

Next, the search of the optimum route to the respective intersections surrounding the present position of the vehicle will be explained with reference to FIGS. 6, 7, 12A through 15B, and by way of example shown in FIG. 11.

At a step S100 of FIG. 6, the start intersection is specified. This start intersection is specified in such a way that any one of the intersections which is present outside of a predetermined circle having a predetermined radius with the present position of the vehicle as a center of the circle and which is nearest to the present position is selected as the start intersection from among the respective intersection surrounding the present position of the vehicle. This definition of the start intersection is disclosed in the Japanese Patent Application First Publication No. Showa 62-86499.

Suppose now that one intersection denotes by 1 shown in FIG. 11 is selected as the start intersection. It is noted that the intersections are represented in circles and numerals within the circles denote the assigned numbers of intersections, lines connecting those intersections are denoted by roads (road segments), and numerical values on the respective lines denote the road distances from respective of the intersections to the connected intersections.

Next, the routine goes to a step S102 in which the start intersection is set as the center intersection.

In the example of FIG. 11, the start intersection 1 is set as the center intersection. At a step S104, various data on the List A of the S-RAM 24 are initially set (initialized). That is to say, as shown in FIG. 12A, the flags for all intersections are set to zeroes (0) and the road distance h (h=0) of the start intersection is set as zero. In addition, the road distances for all of the other intersections listed in the List A are set to +∞ (infinity).

At the step S106, any one of the intersections adjacent to the center intersection is selected.

At a step S108, if a value of the road distance h on the center intersection added to the road distance from the center intersection to the selected adjacent intersection is compared with the road distance h on the selected adjacent intersection, the routine goes to a step 2110 in a case where the former is smaller and the routine goes to a step S120 of FIG. 7 if NO (equal to or larger than the latter) at the step S108.

At a step Si10, the road distance h of the adjacent intersection is newly set as the value of the road distance h of the center intersection added to the road distance h of the selected adjacent intersection from the start intersection.

Referring to FIG. 11, in the series of processing at the steps S106 to S110, the center intersection 1 is connected to the adjacent intersections denoted by 2, 3, 4, and 5 and, from among those adjacent intersections, the adjacent intersection of 2 is selected.

Then, when the road distance h (h=0) on the center intersection 1 (refer to FIG. 12A) is added to the road distance value 3 from the center intersection 1 to the adjacent intersection 2 is compared with the road distance on the adjacent intersection h (=+∞) refer to FIG. 12A).

Since the former is naturally smaller than the latter, the value of h (=+∞) of the adjacent intersection 2 is changed to the calculated value 3 as shown in FIG. 12A.

Next, the routine goes to the step S112, the CPU 1 determines whether the presently selected adjacent intersection is present in the List B of FIG. 12A. If not present at the step S112, the routine goes to a step S116 If present at the step S116, the routine skips the step S116. At the step S116, the currently selected adjacent intersection is added into the center intersection candidates list B. Furthermore, at the step S118, the present center intersection is stored as the preceding intersection A of the presently selected adjacent intersection.

In the example of FIG. 11, since the presently selected adjacent intersection 2 is not yet present in the center candidate list B, No. of the presently selected adjacent intersection, i.e., 2 of FIG. 11 is registered in the list B of FIG. 12B and the center intersection 1 is registered in listings of the List A of FIG. 12A which represents the preceding intersection A of the presently selected adjacent intersection 2.

At a step S120, the CPU 1 determines whether the above discussion has been made on every intersection adjacent to the center intersection. If the above discussion is finished, the routine goes to a step S122. If not (NO) at the step S120, the routine returns to the step S106 of FIG. 6 to repeat the above series of processing.

FIGS. 12A and 12B show the contents of memory in the S-RAM 24 at the time when the above-described series of processing for the adjacent intersections 2, 3, 4, and 5 to the center intersection 1 are carried out. The list A sets the road distances h on the respective adjacent intersections 2, 3, 4, and 5 and preceding intersection 1 and the list B registers the intersections No. 2 through 5 as the center intersection candidates.

At a step S122, the CPU 1 determines whether the center intersection candidate list B is empty or not.

If any one of the intersections which is registered as the center intersection candidate is at least not registered in the list B, the CPU 1 determines that the route search is ended over a full range of the road map stored in the CD-ROM 16 and the execution of the program is ended. If not (NO) at the step S122, the routine advances to a step S124. It is noted that, usually, before the route search from the present position is ended for a full range of the road map prepared in the CD-ROM 16, the route search from the set destination is started as will be described later.

If the list B of the center intersection candidate list B is not empty at the step S122, the intersection having the least value of road distance h from among the intersect ions registered in the list B at the step S124 is determined to be the new center intersection and the routine goes to a step S126.

At the step S126, one of the intersections which is selected as the new center intersection is determined From among those registered in the list B at the step S124 and the routine goes to the step S126. At the step S126, the new center intersection is erased from the list B. At the next step S128, 1 is set to the flag of the old selected center intersection.

In the example of FIG. 11, the road distance h on the adjacent intersection 2 has a least value from among those of the adjacent intersections 2, 3, 4, and 5 registered in the list B of FIG. 12B. Thus, the adjacent intersection 2 is determined to be the new center intersection and the No. of the intersection 2 is erased from the list B and 1 is set to the flag of the old center intersection listed in the list A. FIGS. 14A and 14B show the lists A and B as the contents of the memory in the S-RAM 24 up to now.

Next, the routine returns to the step S106 in which the above-described series of processing is carried out for the newly selected center intersection.

In the example of FIG. 11, the adjacent intersection of the center intersection 2 newly selected is only the old center intersection 1 and the calculation described in the step S108 is carried out. At this time, since the value of 6 indicating the road distance 3 of the center intersection 2 added with the road distance 3 From the center intersection 2 to the adjacent intersection 1 is larger than the road distance h (h=0) on the adjacent intersection 1, the step S108 indicates negative (NO) and the routine goes to the step S120. Thus, the series of processing at the step S110 and subsequent steps thereto are not carried out, namely, no change in the road distance on the adjacent intersection 1 is made. In this case, since the routine advances to the steps S122 through S128, the intersection 4 having the least road distance h from among the intersections 3, 4, and 5 registered in the list B of FIG. 13B is determined to be the new center intersection. Then, the intersection No. 4 is erased from the list B and 1 is set to the flag of the old center intersection 2 in the list A.

Next, the route search for the center intersection 4 which is newly selected as the center intersection is carried out and the above-described series of processing for the intersections 1, 5, and 6 which are adjacent to the center intersection 4 are executed. The change in the contents of records in the S-RAM 24 is shown in FIGS. 14A and 14B.

For one of the adjacent intersections 1 shown in FIG. 11, since a value of 8 as the result of addition of the road distance 4 on the center intersection 4 to the road distance 4 from the center intersection to the adjacent intersection 1 is larger than the value of 0 of the road distance on the adjacent intersection 1, the change in the road distance h is not carried out.

For the adjacent intersection 5, since the value of 5 as the result of addition of the road distance 4 on the center intersection to the road distance 1 from the center intersection 4 to the adjacent intersection 5 is smaller than the road distance 6 on the adjacent intersection 5, the road distance h on the adjacent intersection 5 is changed from 6 to 5. It is noted that since the adjacent intersection 5 is already present in the list B, no record of the adjacent intersection 5 onto the list B is carried out. In addition, the preceding intersection A of the adjacent intersection 5 is changed from the intersection 1 to the intersection 4.

For the other adjacent intersection 6, since the value of 9 as the result of addition of the road distance 4 on the center intersection 4 to the road distance 5 from the center intersection 4 to the adjacent intersection 6 is smaller than the road distance ∞ of the adjacent intersection 6, the road distance on the adjacent intersection 6 is changed from ∞ to 9. Furthermore, since the adjacent intersection 6 is not present in the list B, the adjacent intersection 6 is recorded on the list B and the intersection 4 is set as the preceding intersection A to the adjacent intersection 6 in the list A.

Next, from among the intersections 3, 5, and 6 recorded in the center intersection candidate list B, the intersection having the least value of road distance h is determined to be the new center intersection. At this time, since both intersections of 3 and 5 have commonly the same road distance of 3, in this case, either one of both intersections, e.g., the intersection 5 is selected as the new center intersection.

When the further route search is continued, the center intersections are changed as 1→2→4→3→5→6→7. FIGS. 15A and 15B show the contents of records in the S-RAM 24 when the route search with the intersection 7 set as the center intersection.

Suppose, now, that when the route search is ended at the intersection 7 shown in FIG. 11 and set as the center intersection, the predetermined period of time set by the timer 2G is elapsed.

After the ignition key switch 102 is turned on by the vehicular occupant, the vehicular occupant can set the destination to which the vehicle is desired to reach via the key 8. At this time, the CPU 1 executes the optimum route search routine from the set destination to the present position of the vehicle as shown in FIG. 8 through 10. The search on the optimum route to the respective intersections surrounding the present position of the vehicle previously carried out is such that the range of search in the road map is expanded in the non-directivity mode since the destination is not set. On the other hand, the search of the optimum route from the set destination to the present position shown in FIGS. 8 through 10 is such that the route search is started from the intersections surrounding the set destination and the route search is advanced toward the direction of the present position of the vehicle in the directivity mode. Thus, the search is ended in the short period of time with the range of search limited.

FIGS. 16A through 20 show the result of route search from the destination stored in the D-RAM 22.

It is noted that the D-RAM stores the result of route search from the set destination to the present position of the vehicle.

FIGS. 16A, 17A, 18A, and 19B show the optimum route lists A, FIGS. 16B, 17B, 18B, and 19B show the center intersection candidate list B, and FIGS. 16C, 17C, 18C, and 19C show the center intersection candidate list C surrounding the set destination.

Hereinafter, the optimum route search from the destination to the present position of the vehicle will be explained with reference to the example of the intersection network shown in FIG. 11 and the flowchart integrally shown fin FIGS. 8 through 10.

First, as shown in FIG. 8, a target intersection is specified at a step S200. This target intersection is, for example, in the same way as the case of the specification of the start intersection, such that the target intersection is selected from among the plurality of intersections surrounding the set destination, which is present outside off the circle having the predetermined radius with the destination as the center of the circle and which is nearest to the set destination. In the example shown in FIG. 11, the intersection 10 is supposed to be selected as the target intersection.

At the next step S202, the CPU 1 determines whether the flag in the list A for the selected target intersection indicates 1. That is to say, the CPU 1 determines whether any one of the intersections at which the route search from the present position of the vehicle during the turn off of the ignition key switch 102 is already ended is present. If such an intersection as described above is present (YES) at the step S202, the routine goes to the step S204. If such an intersection as described above is not present (NO) at the step S202, the routine goes to a step S206.

In the case where the specified target intersection is the intersection at which the route search is already ended, the CPU 1 sequentially traces the preceding intersections A from the target intersection in the list A of the optimum route stored in the S-RAM 24 so that the optimum route to the start intersection described above can immediately be derived.

In the example of FIG. 11, suppose that the target intersection is the intersection 7 at which the route search from the present position is already ended. As shown in FIG. 15A, the preceding intersection A to the target intersection 7 is the intersection 5, the preceding intersection A to the intersection 4, and the preceding intersection A to the intersection 4 is the start intersection 1. Hence, the optimum route from the start intersection 1 to the target intersection 7 is such a route as obtained via the sequential preceding intersections A from the target intersection 7: intersection 7→intersection 4→start intersection 1.

It is noted that if the route search over the whole range of the road map is ended by means of the route search routine from the present position, the preceding intersections A are traced in the predetermined order from the target intersection in the optimum route list A so that the optimum route from the start intersection to the target intersection can immediately be obtained.

Since, in the example of FIG. 11, the target intersection is the intersection 10 at which the route search from the present position during the turn off of the ignition key switch 102 is not yet ended, the step S202 is negative (NO) and the routine goes to a step S206.

At the step S206, the target intersection is set as the center intersection. As shown in FIG. 16A, the road distance g of the target intersection 10 in the List A of FIG. 16A stored in the D-RAM 22 is set as zero and the road distances g of the other intersections than the target intersection are set as $+\infty$. In this case, the road distance g is the road distance from the target intersection to any arbitrary intersection and corresponds to the road distance h from the start intersection to any one of the intersections surrounding the present position of the vehicle.

At the step S210, the CPU 1 selects any one of the intersections adjacent to the center intersection and the routine goes to a step S212.

At the step S212, the CPU 1 determines whether the value of the road distance g of the center intersection added to the value of the road distance from the center intersection to the selected adjacent intersection is compared with the road distance of the selected adjacent intersection. If the former is smaller than the latter at the step S212, the routine goes to a step S214. If not (NO) at the step S212, the routine goes to a step S234 of FIG. 10.

At the step S214, the value of the road distance g on the center intersection added to the selected adjacent intersection is set as the road distance g of the selected adjacent intersection. At the next step S216, the center intersection is set as the preceding intersection B to the presently selected adjacent intersection.

The series of processing from the step S206 to the step S216 will be described with reference to FIG. 11.

Since the intersections 8, 9, 11, and 12 are adjacent to the first set center intersection 10, the intersection 8 is first selected as the presently selected adjacent intersection from among those adjacent intersections 8, 9, 11, and 12. Then, the value of road distance g (=0) (refer to FIG. 16A) of the center intersection 10 added with the road distance 4 from the center intersection 10 to the presently selected adjacent intersection 8, i.e., 4 is compared with the road distance g (=$\infty$) (refer to FIG. 16A) of the presently selected adjacent intersection 8. Since the former is smaller than the latter, the road distance g on the selected adjacent intersection 8 is changed from $+\infty$ to added value of 4 as shown in FIG. 16A and the center intersection 10 is set as the preceding intersection B to the selected adjacent intersection 8.

At the step S218, the CPU 1 determines whether the flag on the list A of the presently selected adjacent intersection is set as 1. The flag on the selected adjacent intersection being set as 1 means that the route search from the surrounding intersections of the present position with respect to the presently selected adjacent intersection described above is ended and the optimum route from the start intersection to the presently selected adjacent intersection has been selected. That is to say, the presently selected intersection is the above-described contacting intersection and, at this time point, the route search from the set destination falls in the region 1 in which the route search from the surrounding intersections of the present position has been ended.

If the flag of the adjacent intersection presently selected is set as 1, the routine goes to a step S222 of FIG. 9. In the example of FIG. 11, since all flags of the intersections 8, 9, 11, and 12 adjacent to the center intersection 10 are zeroes and the routine goes to a step S250.

If the adjacent intersection during the route search in the case of the route search from the set destination is not the contacting intersection at which the route search for the present position has been ended, the CPU 1 determines whether the adjacent intersection presently selected at the step S250 of FIG. 9 is present in the list C of the center intersection candidate list C of the D-RAM 22.

The list C is a list of registering the intersections capable of serving as the center intersections in the optimum route search from the set destination.

If no adjacent intersection is present in the center candidate list at the step S250 (NO), the routine goes to a step S252. If the selected adjacent intersection is present in the center intersection candidate list C (YES) at the step S250, the routine skips the step S252. At the step S252, the presently selected adjacent intersection is additionally registered in the center intersection candidate list C and the straight line is calculated from the start intersection up to the presently selected adjacent intersection and is stored as the estimated road distance h'. Furthermore, the road distance g from the center intersection up to selected adjacent intersection is registered.

In the example of FIG. 11, since neither the adjacent intersections 8, 9, 11, and 12 adjacent to the center intersection 10 are, at the first time, present in the center intersection candidate list C. Therefore, as shown in FIG. 16C, these adjacent intersections 8, 9, 11, and 12 are recorded in the center intersection candidate list C and the straight line distances from the start intersection to the respective adjacent intersections 8, 9, 11, and 12 are calculated as the estimated distance h'. It is noted that since the estimated road distance h' is the straight line distance from the start intersection to any one of the intersections under the route search, it is shorter in distance of the road distance h from the start intersection to the intersection under the route search. The list C records the road distance from the center intersection 10 to the respective adjacent intersections.

Next, the routine goes to a step S234 in FIG. 10 in which, in the CPU 1, for all intersections adjacent to the center intersection, the discussion on the road distances is already ended.

If all adjacent intersections are already discussed, the routine goes to the step S236. At the step S236, any one of the intersections which have the least value of (g+h') is selected from among the center intersection candidate list C as the newly selected center intersection. At the next step S238, the intersection newly selected as the center intersection is erased from the list C.

In the example of FIG. 11, after the above-described series of processing are ended for the adjacent intersections 8, 9, 11, and 12 to the center intersection 10, one of the listed adjacent intersections denotes by 9 25 which has the least road distance (g+h') as shown in FIG. 16C is selected as the newly selected adjacent intersection and the intersection 9 is erased from the list C of FIG. 16C.

On the other hand, if the flag of the adjacent intersection now under the search is set as 1 at the step 2218 of FIG. 8, i.e., the adjacent intersection under the search in the route search from the set destination is the contacting intersection now ended in the route search surrounding the present position of the vehicle, the routine goes to a step S222 of FIG. 9. Since the presently selected adjacent intersection is the contacting intersection, the optimum search having the least road distance h from the start intersection is under the search, the CPU 1 determines whether the sum (g+h) between the road distance g of the selected adjacent intersection and the road distance h is smaller than the road distance of the start intersection g. If the former is smaller than the latter, the routine goes to a step S224. If not so, the routine goes to a step S234 of FIG. 10. At the step S224, the CPU 1 changes the road distance g of the start intersection to the sum (g+h) between the road distance g and the above described h. As described above, the road distance g of the start intersection represents the route of the road from the start intersection to the target intersection. At the step S226, the CPU 1 sets the adjacent intersection now under the search on the preceding intersection B of the start intersection. Although another intersection is present between the start intersection and the adjacent intersection now under the search, the adjacent intersection now under the search is the contacting intersection and the optimum route from the start intersection is now established. Therefore, the other intersections present in the midway through the route are omitted and the adjacent intersection under now search is set as the preceding intersection to the start intersection.

In the example of FIG. 11, for the adjacent intersections 7, 8, 10, and 12 of the new center intersection 9, if the steps of S210 and S212 are executed, the step S212 is negative except for the adjacent intersection 7. In the case of the adjacent intersection 7 of the center intersection 9, the routine goes to a step S214 in which the road distance g of the list A of the adjacent intersection 7 is changed from ∞ to the sum of 6 between g=2 on the center intersection 9 and the road distance 4 from the center intersection 9 to the adjacent intersection 7. In addition, the center intersection 9 is selected as the preceding intersection B of the adjacent intersection 7. Furthermore, since the adjacent intersection 7 for which the flag is set as 1, the adjacent intersection 7 serves as the contacting intersection and the step S218 is positive so that the routine goes to a step S222 of FIG. 9. In addition, the sum (g+h) between the road distance g and road distance h of the adjacent intersection 7 is compared with the road distance on the start intersection 1. Since the former is smaller than the latter, g=+∞ on the start intersection 1 as shown in FIG. 17A is changed to the sum of 16 between g=6 and h=10 on the adjacent intersection. The adjacent intersection 7 is set as the preceding intersection B to the start intersection 1.

At the step S228, the CPU 1 determines whether the start intersection is present in the list C of the center intersection candidates. If the start intersection is already present in the list C, the step S230 is skipped. Otherwise, the step S230 is executed. At the step S230, the road distances g and g+h' are recorded in the list C.

In the example of FIG. 11, as shown in FIG. 17C, the start intersection 1 and road distance g (=16) are recorded in the list C. At the same time, since the road distance h' on the start intersection is zero, g+h' (=16) is recorded.

Thereafter, steps S234 through S238 in FIG. 10 are executed and the above-described series of processing are executed.

In the example of FIG. 11, the intersection 8 having the least value of (g+h') from among the center intersection candidates of the list C shown in FIG. 17C is selected as the next center intersection. The old selected center intersection 8 is erased from the list C.

At the step S240, the CPU 1 determines whether the newly selected center intersection is the start intersection. If the new center intersection is the start intersection, the CPU determines that the route search from the set destination is ended thereat and the routine advances the step S242. Otherwise, the routine returns to the step S210 of FIG. 8 from which the above-described series of processing for the new center intersection is continued. In the example of FIG. 11, the above-described series of processing is carried out for the adjacent intersections 6, 9, and 10 to the new center intersection 8.

For the intersections 9 and 10 within the adjacent intersections 6, 9, and 10 to the center intersection 8, the step S212 of FIG. 8 is negative and the road distance g is not changed. However, since the road distance g=∞ of the adjacent intersection 6 is larger than the sum of 6 between the road distance g=4 of the center intersection 8 and the road distance h=2 from the center intersection 8 to the adjacent intersection 6, the road distance g of the adjacent intersection 6 is changed from +∞ to 6, as shown in FIG. 18A and the center intersection 8 is set as the preceding intersection B to the adjacent intersection 6. Furthermore, since the flag of the list A of the selected adjacent intersection 6 is set as 1, the series of processing from the steps S222 to step S230 are executed. First, since the sum of 15 between the road distance g=6 of the adjacent intersection 6 and the road distance h=9 calculated during the route search surrounding the present position of the vehicle is smaller than g=16 on the start intersection 1, the value of g=16 of the start intersection is changed to 15 as shown in FIG. 18A and the preceding intersection B to the start intersection a currently set is changed to the adjacent intersection 6 now in the search.

It is noted that the changes of road distance g and preceding intersection B mean that the optimum route from the target intersection to the start intersection is newly discovered. In the example of FIG. 11, the road distance g=16 on the first set start intersection 1 and the preceding intersection B=7 represent that the route from the target intersection 10 to the start intersection 1 via the intersection 7 is present and that its route road distance g is 16. In addition, the fact that the road distance g is changed to 15 and the preceding intersection B is changed to 6 means that the more optimum route having the road distance g smaller than the originally set route, namely, the route from the target intersection 10 to the start intersection 1 via the intersection 6 is newly discovered. FIGS. 18A through 18C show the contents of storage in the D-RAM 22 in the above-described case.

In the example of FIG. 11, the intersection 12 is selected as the new center intersection in the stage of the route search shown in FIGS. 18A through 18C. Since this new center intersection 12 is not the start intersection, the step S210 of FIG. 8 and subsequent steps are executed. The intersection 13 as the center intersection candidates is registered in the list C of FIG. 19. The road distance g of the adjacent intersection 13 in the list A and the preceding intersection B is set.

At the step S240 of FIG. 10, if the newly selected center intersection provides the start intersection, the CPU 1 determines that the optimum route from the target intersection to the start intersection is ended and the routine goes to the step S242. At the step S242, the preceding intersection B to the start intersection is set as the contacting intersection present in the position at which to the search region 1 from the present position is interfaced to the search region 2A of FIG. 4 (hatched portion within the region 2). In the example of FIG. 11, the intersection 6 which is set as the preceding intersection B to the start intersection 1 is set as the contacting intersection.

At the step S244, an intersection string $A_n$ is derived from the contacting intersection to the start intersection tracing the preceding intersections A from the contacting intersection recorded in the list A.

In the example of FIG. 11, since the preceding intersection A to the contacting intersection 6 is the intersection 4 and the preceding intersection A to the intersection 4 is the start intersection 1, the intersection string A is 6→4→1. Furthermore, at the step S246, the CPU 1 derives another intersection string B from the contacting intersection to the target intersection tracing the preceding intersection B from the contacting intersection recorded in the list A. In the example of FIG. 11, as shown in the list A of FIG. 19A, the preceding intersection B to the contacting intersection 6 is 8 and the preceding intersection B to the intersection 8 is the target intersection 10. Thus, the other string B of intersections is 6→8→10. At the step S248, with both strings of intersections combined, the CPU 1 derives the route from the start intersection to the target intersection. In other words, in the example of FIG. 11, the CPU 1 can derive the optimum route such as 1→4→6→8→10 with the intersection strings of both A and B described above combined. This route means that the optimum route has been searched from the present position of the vehicle to the destination in the example of FIG. 11.

In the way described above, the battery power to the route guidance system 100 is continued to be supplied only for the predetermined period of time upon the turn off of the ignition key switch 102. The least value of road distance from the present position to the surrounding respective intersections is searched by retrieving the road map data and is stored in the S-RAM. If the destination is set with the ignition key switch 102 turned on, the route search is started from the destination toward the present position of the vehicle. Then, from the result of route search surrounding the present position of the vehicle stored in the S-RAM and the road map data, the related intersections are retrieved in the order in which the respective sums between the road distance from the destination to any arbitrary intersection and the straight line distance from the corresponding intersections to the present position are smaller and the route search from the destination to the present position of the vehicle is executed. Then, if the searched intersection reaches to the start intersection, the route search is ended and the route having the least road distance from the destination to the present position is selected. Consequently, it is not necessary to carry out the route search up to the intersections surrounding the present position of the vehicle which have already received the optimum route search. Accordingly, the time it takes to carry out the route search for the optimum route can accordingly be shortened.

(Second embodiment)

Figure 20:
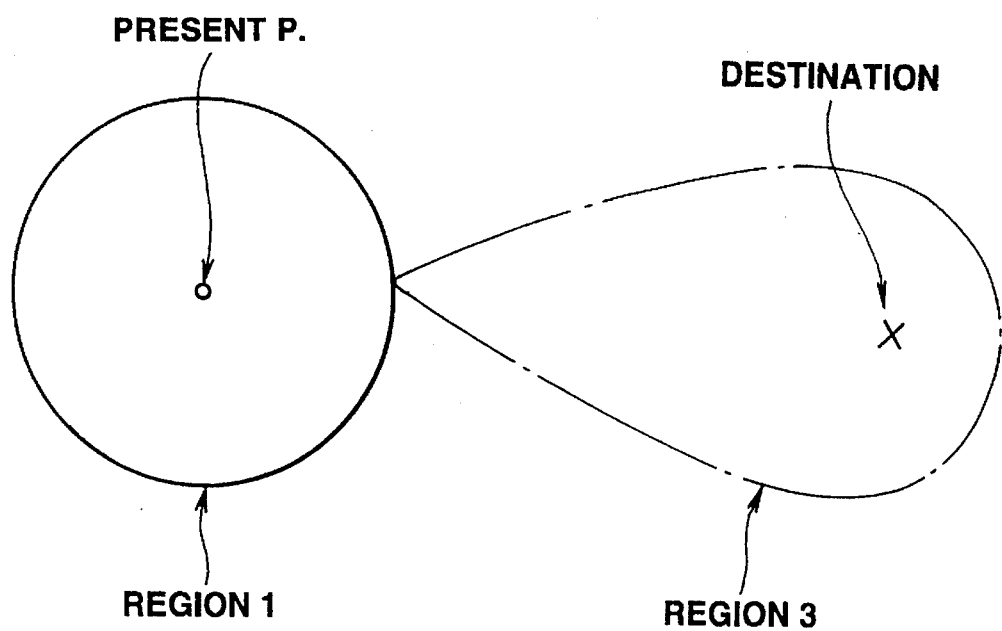
FIGS. 20 is an explanatory view for explaining the method for searching the optimum route in a second preferred embodiment of the route guidance apparatus according to the present invention.

FIG. 20 shows an explanatory view for explaining the method of the optimum route search in a second embodiment according to the present invention.

In the second embodiment, the method of route search from the destination to the present position of the vehicle is different from that in the case of the above-described first embodiment.

In the first embodiment, when the destination is set, the route search from the destination toward the present position of the vehicle is started, any one of the intersections having the least value of the sum of (g+h') between the road distance g from the target intersection to the center intersection and the estimated road distance h' from the center intersection to the start intersection is sequentially continued to be searched. If the center intersection reaches to the start intersection, the route search is ended. The route having the least value of road distance is selected from among the routes from the target intersection to the start intersection.

On the other hand, in the second embodiment, the route search is started from the destination toward the present position of the vehicle and any one of the intersections which indicates the least value of the sum (g+h') between the road distance g from the target intersection to the center intersection is sequentially searched. This process is the same as in the case of the first embodiment. However, in the case of the second embodiment, the route search is ended if the center intersection reaches to the contacting intersection, namely, the center intersection gives the intersection at which the optimum route search from the start intersection has been searched during the route search surrounding the present position of the vehicle.

As compared with FIG. 4 showing the search method in the first embodiment, a search region 3 from the destination in the case of the second embodiment is narrower than the search region 2A in the first embodiment so that the number of intersections to be searched become accordingly reduced and the time it takes to carry out the route search can be shortened. On the contrary, since all of the routes from the target intersection to the start intersection are not searched, there is a possibility off the more optimum route being present except the route finally selected.

The hardware structure of the second embodiment is the same as that in the case of the first embodiment and its power supply system is the same as that in the first embodiment respectively as shown in FIGS. 1 through 3.

In addition, the main series of the control program and search program for determining the optimum route from the position at which the vehicle stands to the surrounding intersections are the same as those in the first embodiment shown in FIGS. 5A through 7. Thus, the detailed explanations are omitted herein.

It is noted that the operation of the second embodiment will be explained below with reference to the example of intersection network of FIG. 11.

Figure 21:
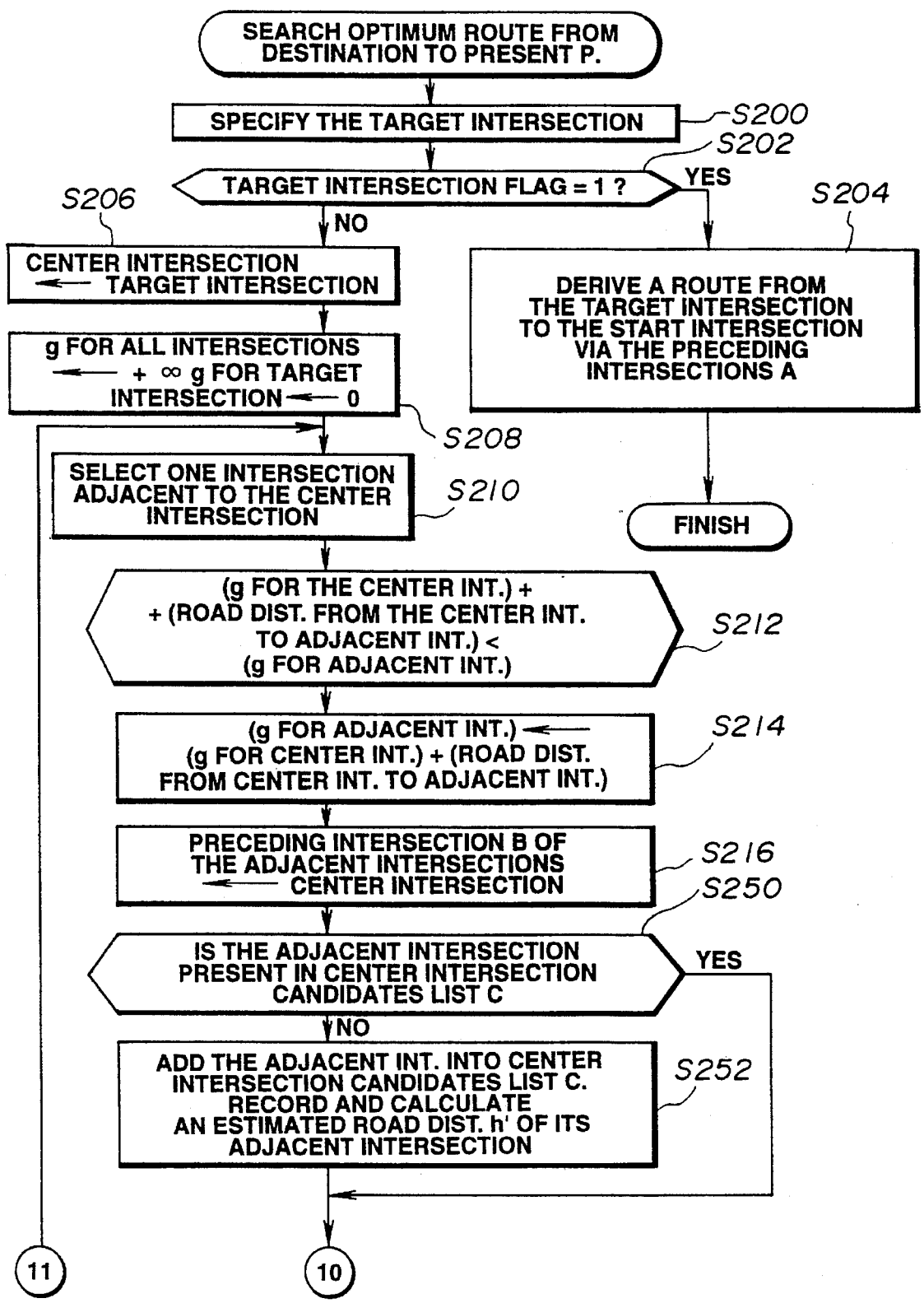
FIG. 21 is an operational flowchart for explaining a program subroutine For searching the optimum route in the case of the second embodiment from the destination to the present position of the vehicle.
Figure 22:
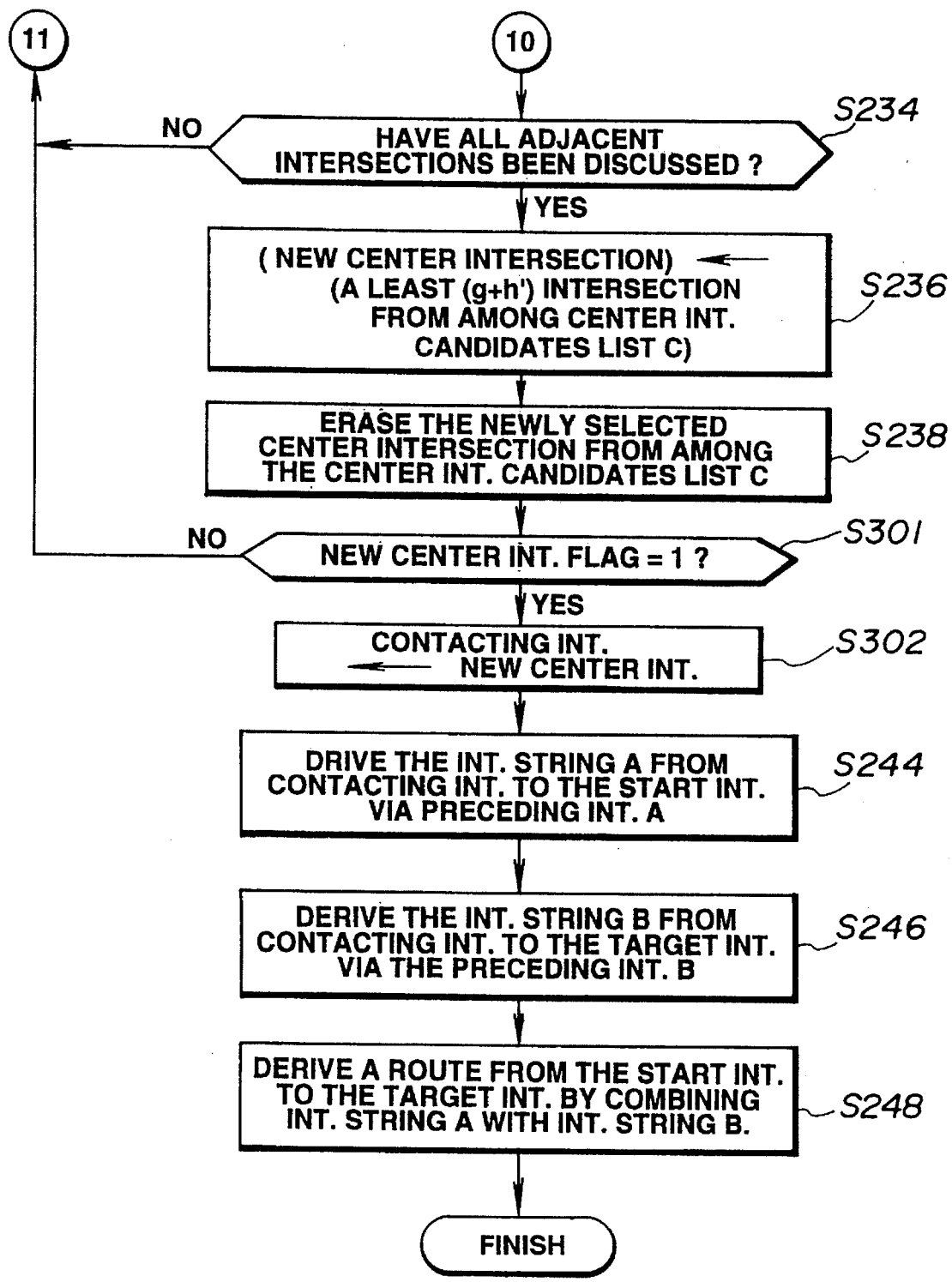
FIG. 22 is an operational Flowchart for explaining a program subroutine for searching the optimum route in the second embodiment from the destination to the present position of the vehicle subsequent to FIG. 21.

FIGS. 21 and 22 integrally show the optimum route search program subroutine from the set destination toward the present position of the vehicle in the case of the second embodiment.

It is noted that the explanations for the same number steps as those shown in FIGS. 8 through 10 integrally representing the search program subroutine in the case of the first embodiment are omitted herein and different steps will be explained. In addition, FIGS. 23A through 26C show results of route search from the set destination stored in the D-RAM 22.

In the same way as the first embodiment, the steps S200 through S216 and steps S250 through S238 are executed. After the above-described series of processing are carried out for the intersections adjacent to the center intersection, the intersection which has the least value of (g+h') is selected as the new center intersection. At the step of S301 of FIG. 22, the CPU 1 determines whether the flag of the newly selected center intersection is set to 1, namely, whether the selected center intersection is the contacting intersection which is already searched during the route search surrounding the present position of the vehicle when the ignition key switch 102 is turned off.

If it is the contacting intersection at which the route search is ended, the routine goes to the step S302. If not so (NO) at the step S301, the routine returns to the step S210 of FIG. 21. At the step S302, the newly selected center intersection is set as the contacting intersection. Thereafter, in the same way as in the case of the first embodiment, the preceding intersection strings A and B related to the contacting intersection are traced from the list A stored in the D-RAM 22 so as to derive the optimum route from the start intersection to the target intersection.

The route search in the case of the second embodiment will be described with reference to FIG. 11.

FIGS. 23A through 26C show the results of route searches from the set destination stored in the D-RAM 22 in the case of the second embodiment.

Suppose, now, that the program subroutine integrally shown in FIGS. 6 and 7 has been executed after the ignition key switch 102 is turned off, the optimum route to the intersection 7 of FIG. 11 surrounding the present position of the vehicle has been searched, and the route search from the set destination toward the present position is started with the destination set after the ignition key switch 102 is turned on. In the same way as the first embodiment, the intersection 10 is set as the target intersection surrounding the destination in the same way as in the first embodiment. The above-described processing are carried out for the adjacent intersections 8, 9, 11, and 12 and the results of route search shown in FIGS. 23A, 23B, and 23C are stored in the D-RAM 22. In this state, the intersection 9 having the least value of road distance (g+h')=1 is selected as the next center intersection from among the center intersection candidates of the list C.

The above-described series of processing of route search for the adjacent intersections 7, 8, 10, and 12 to the center intersection 9 newly selected, the result of route search shown in FIGS. 24A, 24B, and 24C is obtained and the intersection 8 is selected as the next new center intersection. If the above-described series of processing for the adjacent intersections 6, 9, and 10 to the center intersection 8 are executed, the result of route search shown in FIGS. 25A, 25B, and 25C is obtained and the intersection 7 is selected as the next new center intersection.

Since the flag of the intersection 7 which is selected as the new center intersection is already set to 1, this intersection 7 is the contacting intersection at which the optimum route search from the present position of the vehicle is already carried out during the route search from the present position of the vehicle and the turn off of the ignition key switch 102. Hence, the step S301 of FIG. 22 is acknowledged, the route search from the set destination toward the present position of the vehicle is ended at this time. Then, when the preceding intersection strings A and B to the contacting intersection are traced, the optimum route of 1→4→5→7→9→10 can finally be derived. The road distance in this route is the sum of 16 between the road distance h=10 on the contacting intersection 7 and that g=6 on the road distance. In the route search in the first embodiment carried out under the same condition, the route of 1→4→6→8→10 on the road distance value of 15 is obtained. Therefore, it may be insufficient for the route search from the set destination in the second embodiment and consequently that route cannot be obtained in the second embodiment although the other optimum route is present. However, the route search region from the set destination in the second embodiment is narrower than that in the first embodiment and the number of intersections to be searched is less than those in the first embodiment. Consequently, the time it takes for the route guidance system 100 to search the optimum route becomes shortened.

As described above, although, in the first and second embodiments, the route having the least value off road distance gives the optimum route of the vehicle travel from the present position to the set destination, one of the routes through which it takes a shortest time for the vehicle to reach to the destination may be deemed as the optimum route.

In this case, although the travel time required to reach to the destination needs to be calculated according to the distances between respective intersections and to the traveling speed off the vehicle, the required travel time may be calculated using statutory speed limit values of roads between the respective intersections in place of the scheduled traveling speed. In addition, in this alternative case, an estimated required travel time from any one of the intersections under the search of route from the destination is calculated from the straight line distance from the corresponding one of the intersections described above to the start intersection and a possible maximum travel speed. It is noted that the possible maximum travel speed is defined as the maximum speed which can be considered from among possible routes from any one of the intersections under the route search to the start intersection. For example, if any one of the routes which is a freeway maximum speed limit being prescribed as 100 Km/h is present, the possible maximum speed is set to 100 Km/h.

In addition, although, in both of the first, and second embodiments, the result of the optimum route search to the respective intersections surrounding the present position of the vehicle is stored in the S-RAM 24, data required at minimum from among the results of route searches, for example, the intersection having the flag being set 1, its road distance h, and preceding intersection A may only be stored in the S-RAM 24. Thus, the memory capacity of the S-RAM 24 can be reduced so as to bring out the reduction of cost.

Furthermore, in the respective (first and second) embodiments described above, although the calculations of the present position off the vehicle and of the optimum route search to the respective intersections surrounding the present position of the vehicle are carried out when the ignition key switch 102 is turned off, the vehicle speed sensor 7 installed in the vehicle may detect the stopped state of the vehicle, the calculations of the present position of the vehicle and of the optimum route search to the respective intersections may be carried out whenever the vehicle stops, and the optimum route search from the set destination to the present position of the vehicle may be carried out if the destination is set. In this alternative case, even if the destination is set or changed in the midway through the vehicle travel to the destination, the optimum route search from the destination to the present position of the vehicle may quickly be calculated so that the guidance of the vehicle can be started.

(Third Embodiment)

FIGS. 27 through 46 show a third preferred embodiment of the route guidance apparatus according to the present invention.

As already described in the second embodiment, the hardware structure of the route guidance system 100 in the third embodiment is the same as that in the case of the first embodiment.

Therefore, the features of the third embodiment will only be described herein.

As already described in the case of the first and second preferred embodiments, as a route search range of the optimum route to the respective intersections surrounding the present position of the vehicle becomes wider, the search time duration required to set the optimum route from the set destination to the present position after the destination is set can accordingly be shortened. Thus, the optimum route can quickly be displayed on the CRT 18 after the destination is set. However, as the range off search of the route surrounding the present position of the vehicle becomes wider, the amount of data on the results of route searches are accordingly increased so that a memory having a large capacity of memory becomes necessary. The optimum route data as the result of route search needs to be stored even after the ignition key switch 102 is turned off. Therefore, these data need to be stored in the non-volatile S-RAM 24. However, in general, the S-RAM 24 is expensive and always needs to receive the power supply from the auxiliary battery cell 27. Thus, it is necessary to save the memory area thereof and reduce the number of times the contents of the S-RAM 24 are used as least as possible.

In the third embodiment, the memory size (capacity) of the S-RAM 24 is reduced as least as possible and the result of route search surrounding the present position of the vehicle with a wide range of search is stored therein, solving the problem of reducing the cost of S-RAM 24 and power consumption.

Figure 27:
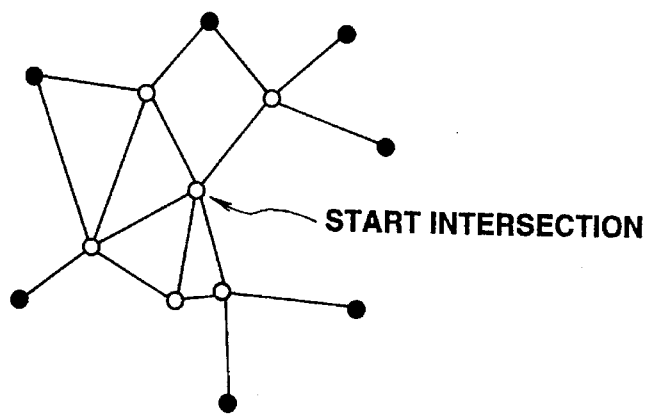
FIG. 27 is an explanatory view for explaining the searching method for the route surrounding a start intersection in a third preferred embodiment of the route guidance apparatus according to the present invention.

Referring to FIG. 27, in the optimum route search to the respective intersections surrounding the present position of the vehicle, the center intersection becomes expanded with the start intersection as a route search start point.

FIG. 27 shows the state in which the route search has been carried out to a range such that the road distance h of the center intersection from the start intersection 25 exceeds a preset value of H1 and black circle marks shown in FIG. 27 denote outmost (outermost) intersections in the range of h=H1.

Figure 28:
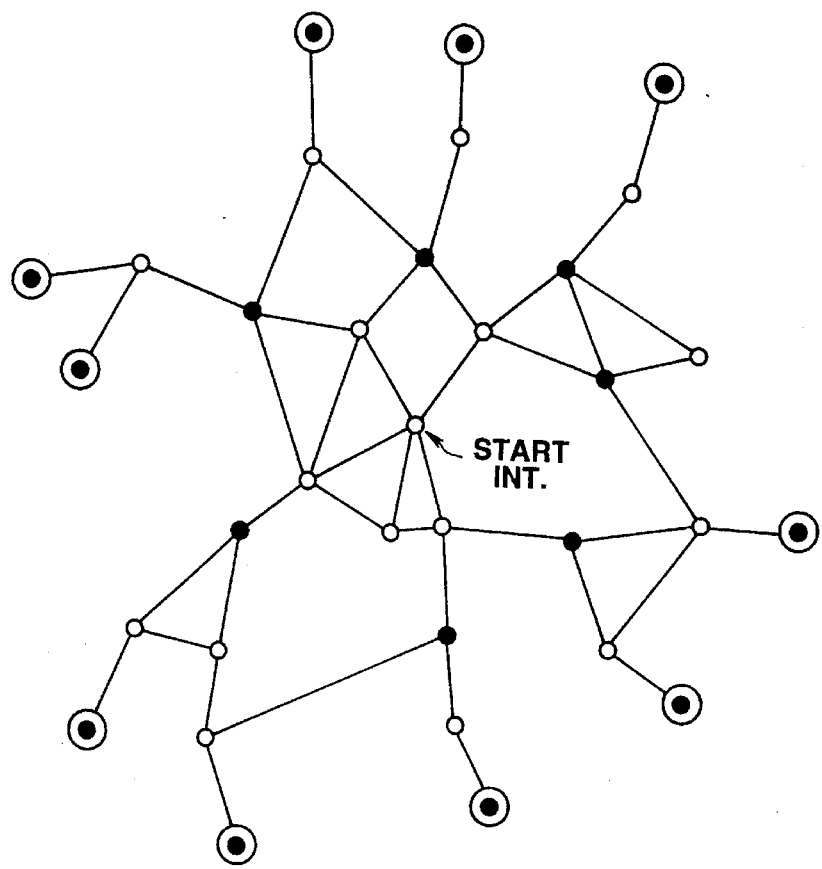
FIG. 28 is an explanatory view for explaining the route searching method surrounding the start intersection in the case of the third embodiment.

FIG. 28 shows the state in which the further route search has been carried out toward the range such that that the road distance h of the center intersection from the start intersection exceeds another preset value of H2.

In FIG. 28, the black circle marks denote the outmost (outermost) intersections in the range of h=H1 described above and double circle black marks denote outmost (outermost) intersections in the present range of h (road distance of the center intersection from the start intersection)=H2.

Figure 29:
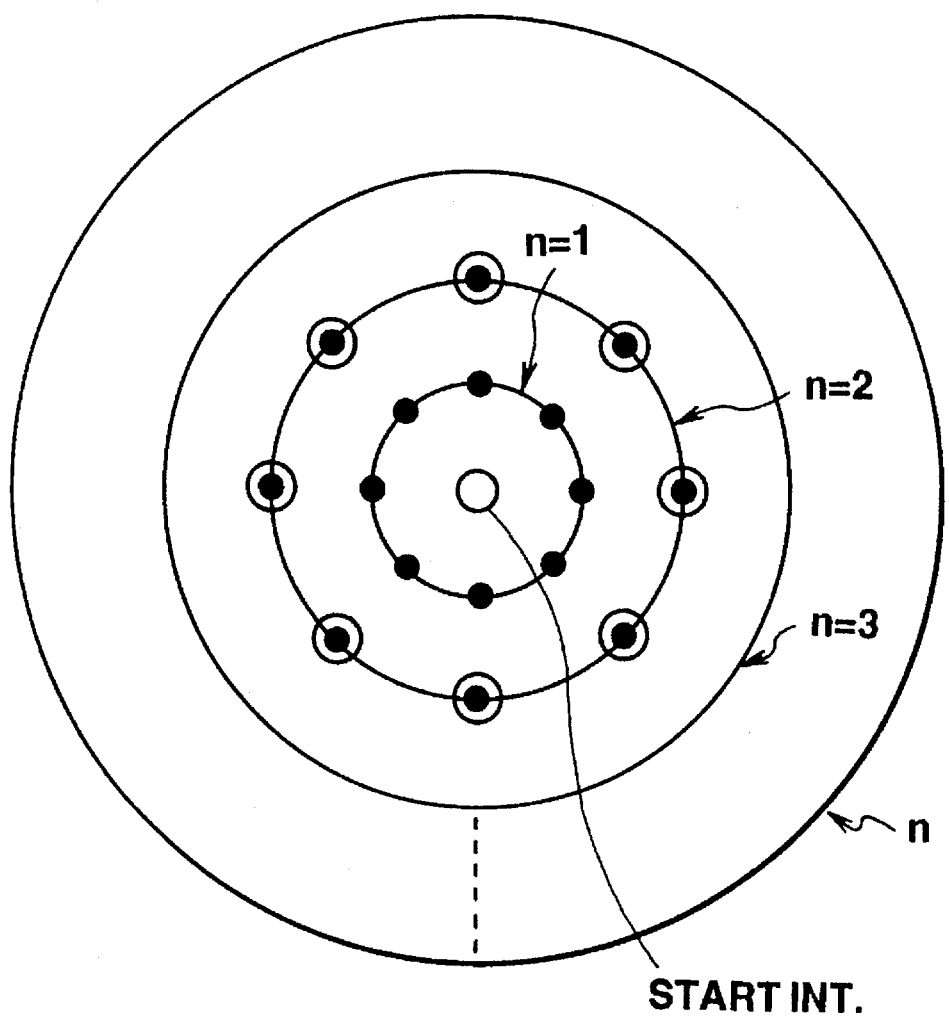
FIG. 29 is an explanatory view for explaining the route searching method surrounding the start intersection in the case of the third embodiment.

FIG. 29 shows a concentrically shaped model view of the outmost (outermost) intersections described above as the result of route search by repeating such a route search process in the third embodiment.

In the actual case, the outmost (outermost) intersections may not be aligned on the concentric circles as shown in FIG. 29.

It is noted herein that h denotes the road distance of the center intersection, the range of h=H1 is called a first layer, the range of h=H2 is called a second layer, the range of h=h3 is called a third layer, - - -, and the range of h=Hn (n denotes an arbitrary integer) is called an n-th layer. It is also noted that FIG. 29 omits the n-th layer exceeding the third layer. The preset value of tin (n=1, 2, 3, - - -, n) is a preset value determining a width of the search region of each layer and is proportional to a radius of each concentric circle shown in FIG. 29 so that the preset value of Hn is called a boundary radius.

When the ignition key switch 102 is turned off, the CPU 1 starts the optimum route search from the start intersection to the respective intersections surrounding the present position of the vehicle. At this time, the route search data on the respective surrounding intersections are stored in the D-RAM 22. However, the data which satisfies the following conditions from among the data of the route search are stored in the S-RAM 24. The D-RAM 22 has a large memory capacity. In general, the D-RAM 22 is inexpensive and a burden imposed on the total cost of manufacturing the route guidance system 100 is light even if the large amounts of memory areas are used for the D-RAM 22. However, since the D-RAM 22 is volatile, i.e., since the contents of memory in the D-RAM 22 are vanished (destroyed) when its power supply to the D-RAM 22 is interrupted, it is necessary to always supply the power to the D-RAM 22 so as to hold the contents of memory of the D-RAM 22 and its power consumption is accordingly large.

At a time when the road distance h of the center intersection reaches to the preset value of H1, its center intersection is the outmost (outermost) intersection of the first layer. The outmost (outermost) intersection information, the road distance h of the outmost (outermost) intersection of the first layer from the start intersection, and the start intersection are stored in the S-RAM 24. Thereafter, at a time when the road distance h of the center intersection reaches to the preset value of H2, its center intersection is set as the outmost (outermost) intersection of the second layer. At this time, the outmost (outermost) intersection information of the second layer, the outmost (outermost) intersection of the first layer present on the optimum route from the outmost (outermost) intersection of the second layer to the start intersection, and the road distance h of the outmost (outermost) intersection of the second layer via the optimum route to the start intersection are stored in the S-RAM 24.

In other words, whenever the road distance h of the center intersection reaches to the preset value of Hn (n=1, 2, 3, - - -, n), its center intersection is set as the outmost (outermost) intersection of the n-th layer and its outmost (outermost) intersection information, the outmost (outermost) intersection of the (n−1)-th layer present on the optimum route from its outmost (outermost) intersection to the start intersection (hereinafter, this intermediate outmost (outermost) intersection of the (n−1)-th layer is called a parent intersection), and the road distance h from the outmost (outermost) intersection of the n-th layer via the optimum route to the start intersection are stored in the S-RAM 24. It is noted that the parent intersection of the first layer provides the start intersection.

Then, the storage of the above-described pieces of information into the S-RAM 24 is continued until the memory capacity of the S-RAM 24 becomes full. At a time at which the memory capacity becomes full in the S-RAM 24, the route search surrounding the present position of the vehicle is ended. It is noted that the predetermined period of time set by the above-described timer 26 in the case of the first embodiment is a time duration sufficient to make a full use of the memory capacity of the S-RAM 24.

As previously described in the first and second embodiments, the search of the optimum route from the target intersection to the present position of the vehicle is started when the destination is set after the ignition key switch 102 is turned on.

During the route search from the set destination, the searched adjacent intersection reaches to the outmost (outermost) intersection of the maximum number layer (n-th layer) stored in the S-RAM 24. In this case, since the road distance h of the optimum route from the adjacent intersection toward the start intersection is searched, the route search is carried out with the road distance having the least value of (g+h) using the road distance h in place of the above-described estimated road distance h' sequentially as the center intersection. Then, the search is ended when the center intersection reaches to the outmost (outermost) intersection of the maximum number layer (n-th layer).

Figure 30:
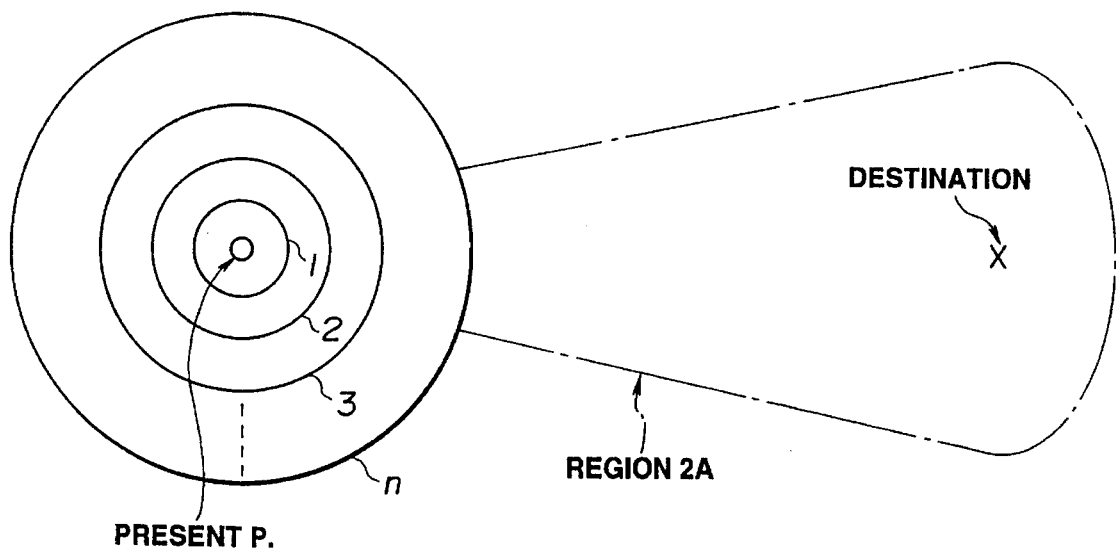
FIG. 30 is an explanatory view for explaining the route searching method surrounding the start intersection in the case of an alternative of the third embodiment.

FIG. 30 shows the relationship between the searched region from the present position of the vehicle and the searched region from the set destination when the route search for the center intersections has reached to the outmost (outermost) intersection of the n-th layer as described above.

Figure 31:
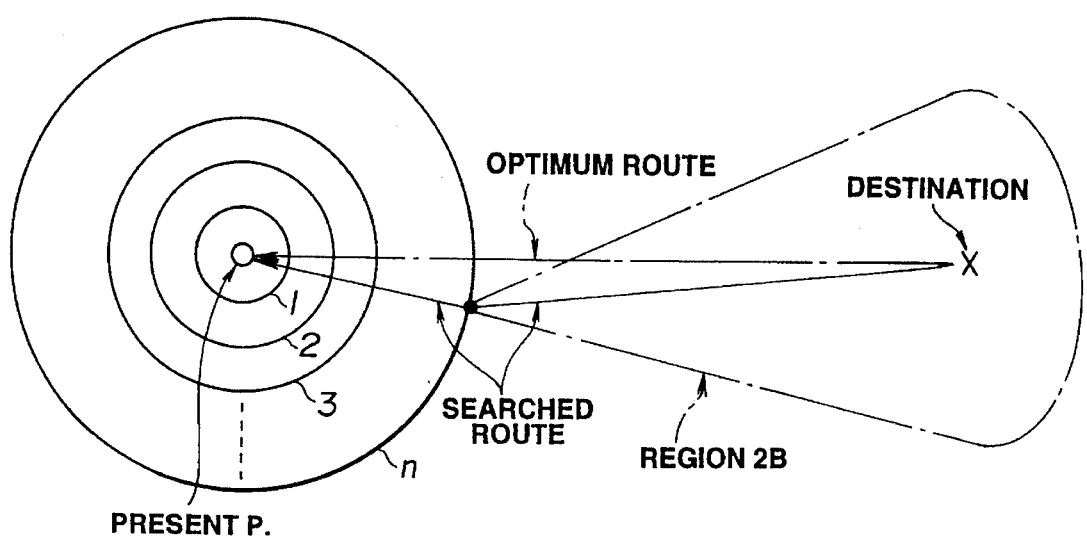
FIG. 31 is an explanatory view for explaining the method for searching the route from the destination in the case of the third embodiment.

When the route search is ended at a point of time at which the selected adjacent intersection has reached to the outmost (outermost) intersection of the n-th layer, the searched regions are such as those shown in FIG. 31.

As shown in FIG. 31, since all of the routes from the target intersection to the start intersection are not searched, there is a possibility that some of the optimum routes from the destination to the present position of the vehicle are present except the selected optimum route.

However, when the searched region denoted by 2A of FIG. 30 is compared with that denoted by 2B of FIG. 31, the searched region 2B shown in FIG. 31 is apparently narrower than that 2A shown in FIG. 30. Thus, since the number of intersections to be searched are accordingly reduced and the time it takes to search the optimum route becomes shortened. Consequently, the search of the route may be ended when the selected adjacent intersection has reached to the outmost (outermost) intersection of the n-th layer.

Figure 32:
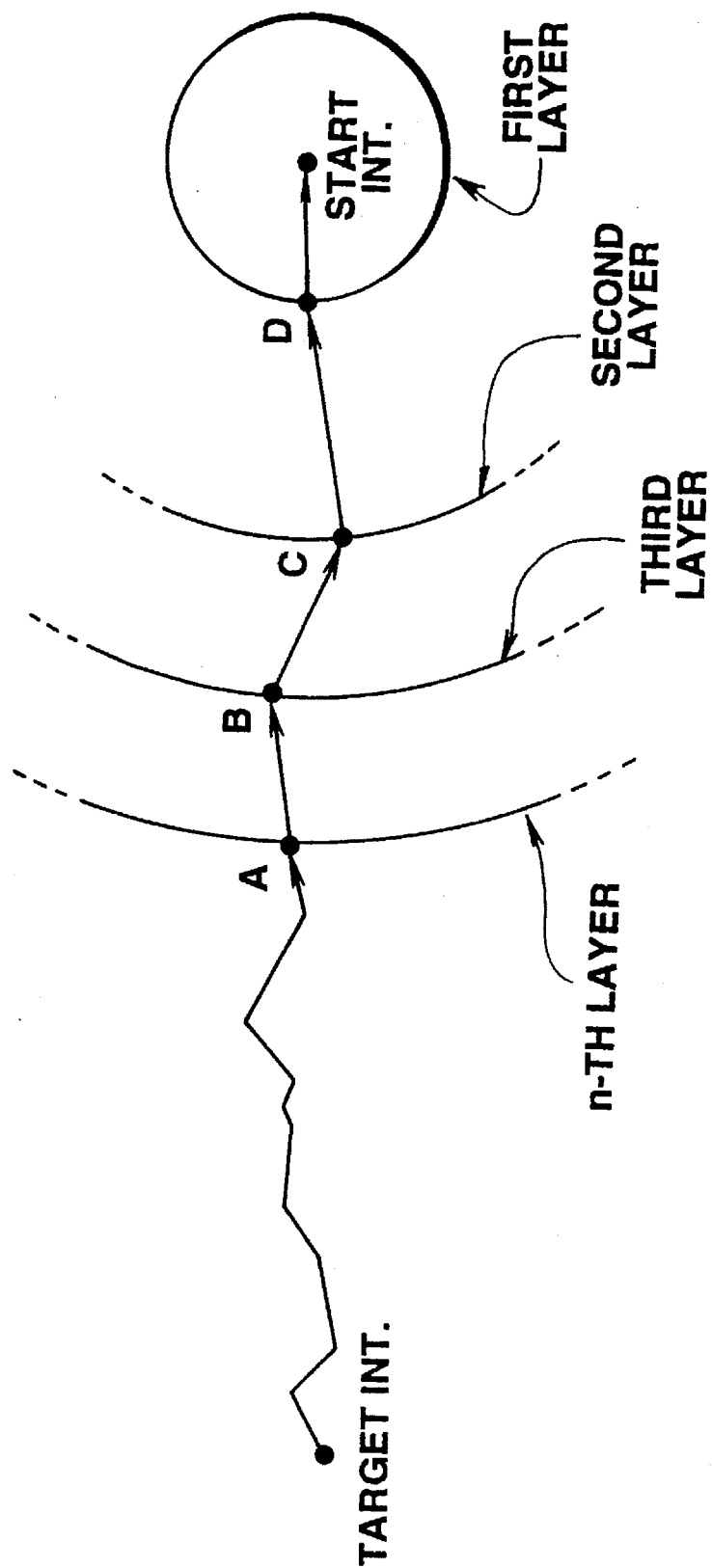
FIG. 32 is an explanatory view for explaining the searching for the optimum route from a target intersection to the start intersection in the case of the third embodiment.

As shown in FIG. 32, since, in the route search from the target intersection, the center intersections are sequentially selected in the order such that the sum (g+h') between the road distance g from the target intersection to the center intersection and the estimated road distance h' from the center intersection to the start intersection becomes smaller, the optimum route is such that the route from the target intersection via the outmost (outermost) intersection of the maximum number layer (n-th layer) to the start intersection provides the least value in a case where the center intersection has reached to the outmost (outermost) intersection denoted by A of FIG. 32 of the n-th layer. As appreciated from FIG. 32, the parent so intersection of the outmost (outermost) intersection A is the outmost (outermost) intersection B of the (n–1)-th layer (in the case of FIG. 32, the third layer) and the parent intersection of the outmost (outermost) intersection B is the outmost (outermost) intersection denoted by C of FIG. 32 of the (n–2)-th layer (in the case of FIG. 32, the second layer). The parent intersection of the outmost (outermost) intersection C of FIG. 32 of the second layer is the outmost (outermost) intersection D of the first layer shown in FIG. 32. Consequently, the parent intersection of the outmost (outermost) intersection of D of FIG. 32 is the start intersection, as described above. In other words, when the respective parent intersections are sequentially traced from the outmost (outermost) intersection A of FIG. 32, the optimum route from the outmost (outermost) intersection A of the n-th layer to the start intersection can be obtained.

It is noted that the optimum route from the outmost (outermost) intersection A shown in FIG. 32 to the start intersection via the outmost (outermost) intersections of the respective layers has omitted the intersections within the respective layers. Hence, after the route from the outmost (outermost) intersection A of FIG. 32 of the n-th layer to the start intersection is selected, each optimum route having the least road distance from the outmost (outermost) intersection to the parent intersection is again calculated for each layer and the calculated optimum route is connected to derive the optimum route from the outmost (outermost) intersection A of the maximum number layer (n-th layer).

It is noted that, at this time, the route calculation for the first layer is first calculated, its route is immediately displayed on the CRT 18 when the calculation of the optimum route for the first layer is ended so as to start the guidance off the vehicle occupant toward the destination through the CRT 18. Thereafter, the optimum route calculations for the second layer and subsequent layers are carried out and the remaining route 0thus calculated is successively displayed on the CRT 18. In addition, the route search results surrounding the destination are stored in the D-RAM 22.

It is also noted that the series of main program routines shown in FIGS. 5A and 5B in the first embodiment are applicable to those in the case of the third embodiment.

Figure 33:
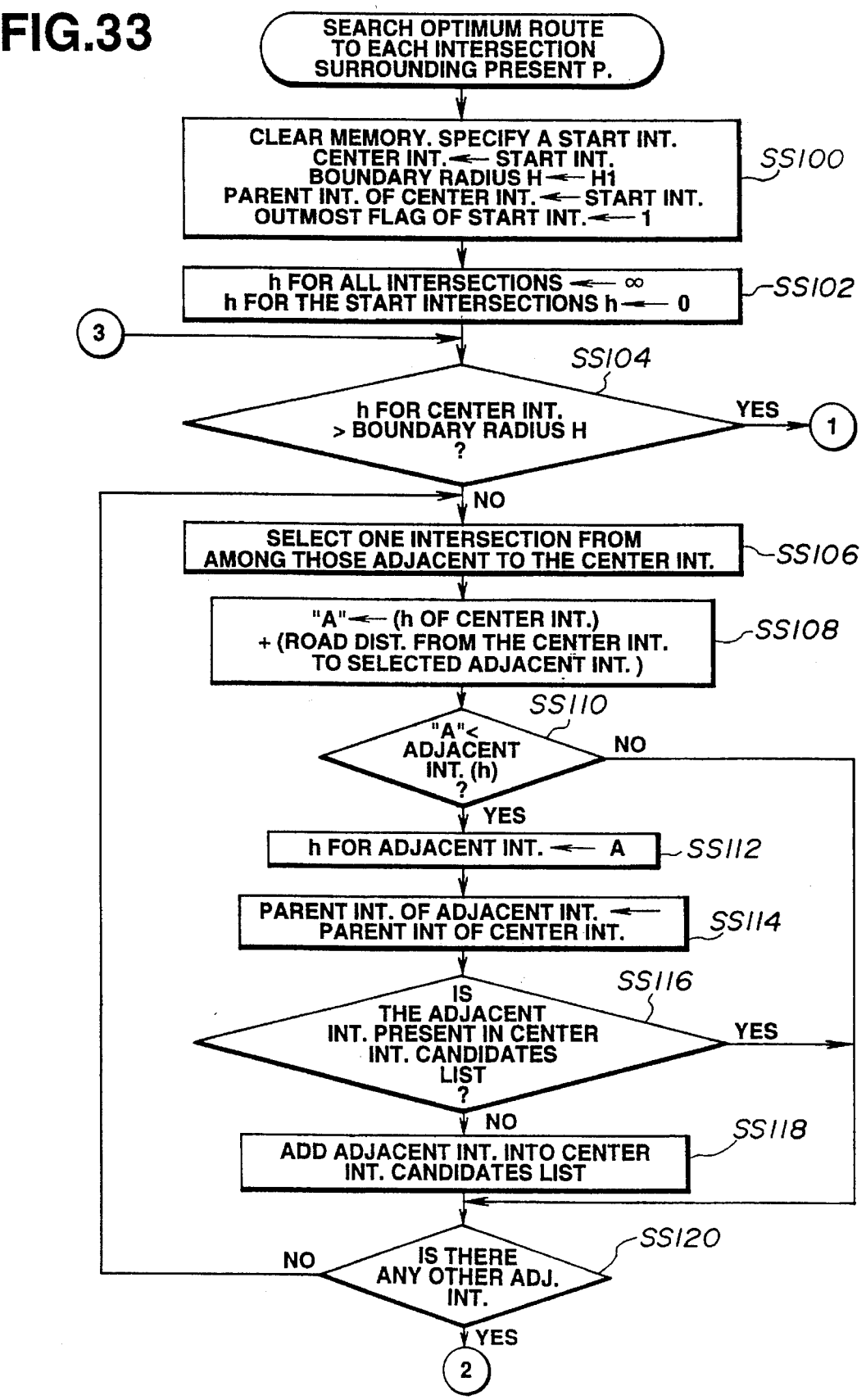
FIG. 33 is an operational flowchart indicating an optimum route searching program subroutine to each intersection surrounding the present position of the vehicle in the case of the third embodiment.
Figure 34:
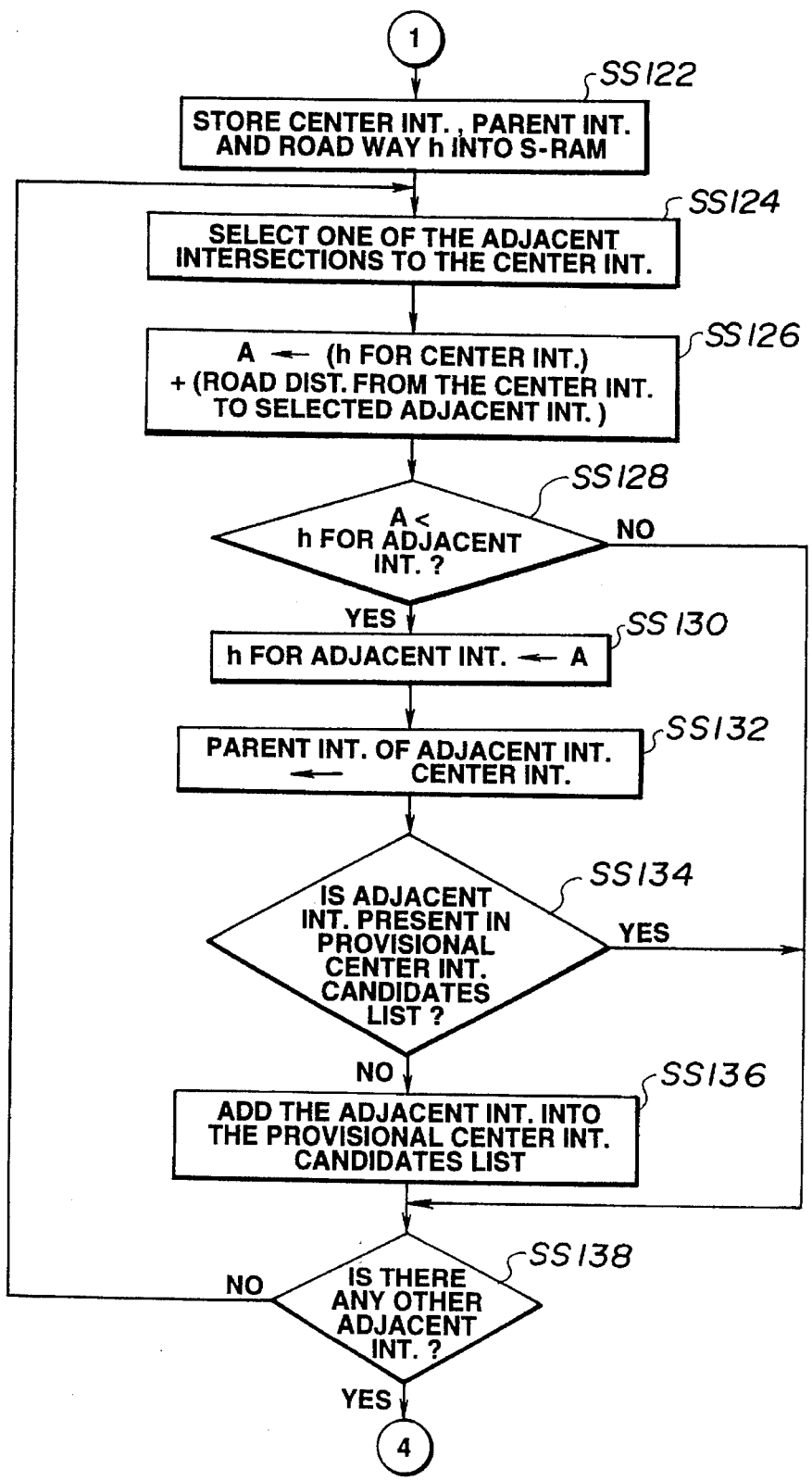
FIG. 34 is an operational flowchart indicating an optimum route searching program subroutine to each intersection surrounding the present position subsequent to FIG. 33.
Figure 35:
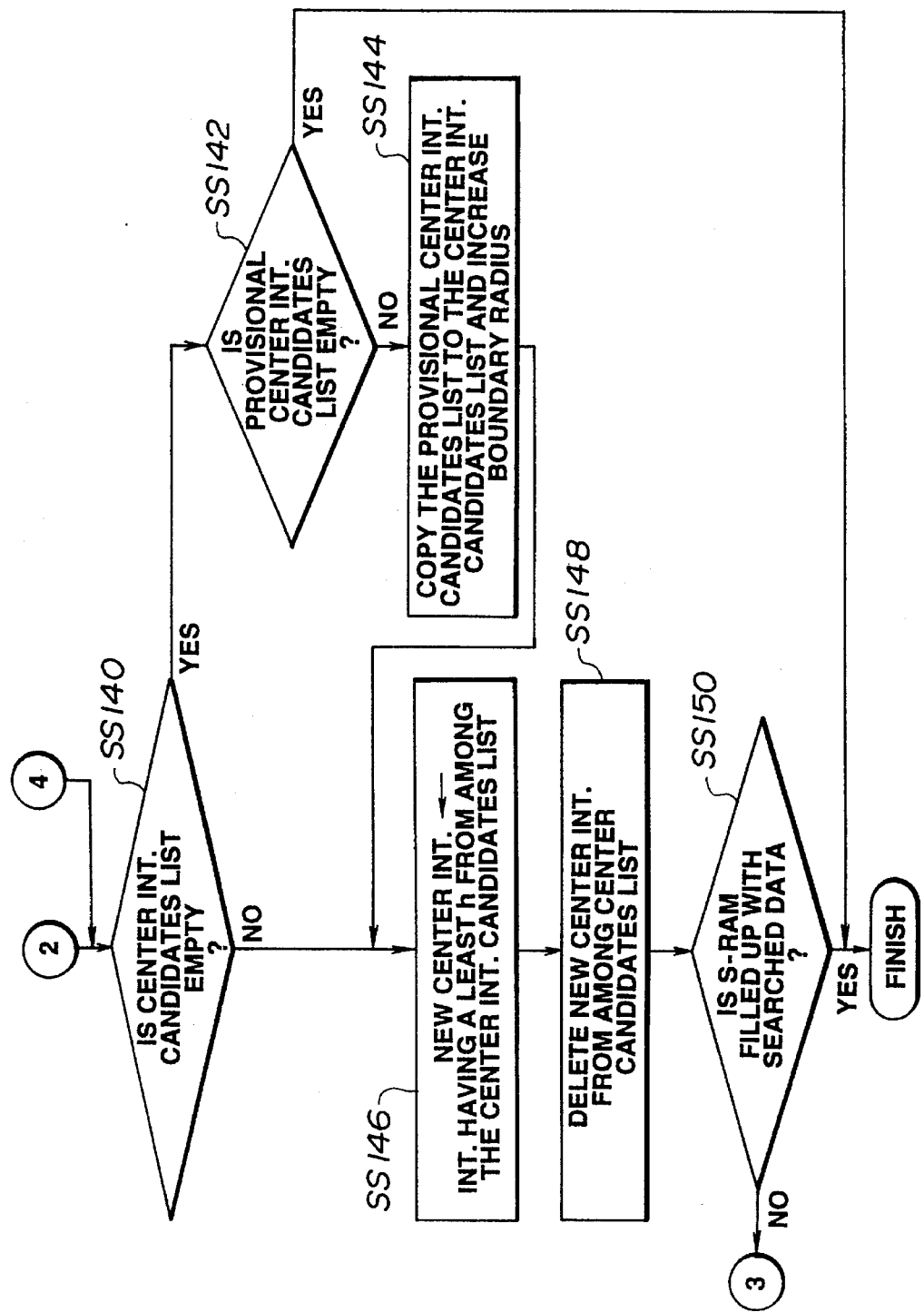
FIG. 35 is an operational flowchart indicating an optimum route searching program subroutine to each intersection surrounding the present position subsequent to FIG. 34.

FIGS. 33 through 35 integrally show the operational program routine of the optimum route search to the respective intersections surrounding the present position of the vehicle.

As shown in FIG. 33, the following series of processing (1) to (7) are executed at steps SS100 and SS102.

(1) Erasing (clearing) the stored contents of the memories D-RAM 22 and S-RAM 24.

(2) Specifying the start intersection. This specifying of the start intersection is described in the Japanese Patent Application First Publication No. Showa 6286499. That is to say, one of the intersections which is present outside of the circle having the predetermined radius with the present position of the vehicle as the center of the circle and which is nearest to the present position is selected as the start intersection.

(3) Setting the start intersection 1 of FIG. 11 as the first selected center intersection.

(4) Setting the boundary radius H determining the width of the search range of the first layer to H1.

(5) Setting the start intersection 1 as the parent intersection of the center intersection.

(6) Setting an outmost (outermost) intersection flag of the start intersection to 1. The outmost (outermost) intersection flag is a flag indicating that the intersection searched is the outmost (outermost) intersection when it is set to 1. In the case of the first layer, the parent intersection is the start intersection 1 and the outmost (outermost) flag of the start intersection is set to 1.

(7) Setting the road distance h on the start intersection to 0 (zero) and setting the other road distances h of the other intersections to ∞.

At the step SS104, the CPU 1 determines whether the value of the road distance h of the center intersection is greater than that of the boundary radius H (first, H1 and thereafter H2, H3, - - - , Hn). If the former is greater than the latter at the step SS104, the routine goes to a step SS122 of FIG. 34. If the former is not greater than the latter at the step SS104, the routine goes to a step SS106. That is to say, since the road distance h of the center intersection is greater than the boundary radius H and the center intersection is the outmost (outermost) intersection, the CPU 1 executes the series of processing at the step SS122 of FIG. 34 and the subsequent steps. On the other hand, since the road distance h of the center intersection is less than the boundary radius H and the center intersection does not yet reach to the outmost (outermost) intersection of the corresponding layer, the CPU 1 executes the series of processing subsequent to the step SS106.

At the step SS106, the CPU 1 selects any one of the intersections adjacent to the center intersection and the routine goes to a step SS108 in which a road distance from the center intersection to the selected adjacent intersection is added to the road distance h of the center intersection to derive an accumulated road distance A up to the selected adjacent intersection. At the next step SS110, the CPU 1 determines whether the accumulated road distance A up to the selected adjacent intersection is less than the road distance h stored in the D-RAM 22. If the former is smaller (less) than the latter at the step SS110, the routine goes to a step SS112. If the former is not smaller than the latter at the step SS110, the routine goes to a step SS120.

At the step SS112, the CPU 1 operates the road distance h of the selected adjacent intersection stored in the D-RAM 22 to be changed to the accumulated road distance A. At the next step SS114, the parent intersection of the selected adjacent intersection is set as the parent intersection of the center intersection. That is to say, since the present center intersection is not the outmost (outermost) intersection, the parent intersection of the (n−1)-th layer is set as this center intersection if this center intersection is placed within the n-th layer. Hence, the parent intersection which is the same as this center intersection is set for the selected adjacent intersection.

Then, at a step SS116, the CPU 1 determines whether the presently selected adjacent intersection is present in the list of the center intersection candidates.

If the presently selected adjacent intersection is present or already registered in the center intersection candidate list at the step SS116, the routine goes to a step SS120. If not registered (NO) at the step SS116, the routine goes to a step SS118 in which the presently selected adjacent intersection is additionally registered in the center intersection candidate list. It is noted that the center intersection candidate list is a list in which the intersections which are possible to become the center intersections. At the step SS120, the CPU 1 determines whether all off the intersections adjacent to the presently set center intersection have already been searched. If (YES) all of the adjacent intersections have already been searched at the step SS120, the routine goes to a step SS140 of FIG. 35. If (NO) all of them have not yet been searched, the routine returns to the step SS106 so as to repeat the same series of processing for the remaining adjacent intersection(s).

Next, at the step SS140 of FIG. 35, the CPU determines whether the center intersection candidate list stored in the D-RAM 22 has become empty. If it is empty, the routine goes to a step SS142. If not empty, the routine goes to a step SS146. As described above, the adjacent intersections to the center intersection are additionally registered as the center intersection candidates in the list so that the number of the center intersection candidates are increased until the road distance h of the center intersection has reached to the boundary radius H. However, when the road distance h described above has reached to the boundary radius H, the adjacent intersection is added into a provisional center intersection candidate list so that the number of intersections registered in the center intersection candidate list are gradually decreased.

If not empty at the step SS140, the routine goes to a step SS146 in which one of the intersections registered in the center intersection candidate list which has a least value of the road distance h is set as the new center intersection and the routine goes to a step SS148. At the step SS148, the CPU 1 erases the intersection set as the new center intersection from the center intersection candidate list. Thereafter, the routine goes to a step SS150 in which the CPU 1 determines whether the S-RAM 24 has become full of the data on the result of route search. If it has become full (YES) at the step 2S150, the routine described above is finished. Otherwise, the routine returns to the step SS104 of FIG. 33.

When the above-described loop of route search is carried out, the road distance h of the center intersection becomes gradually increased and, finally, becomes larger than the boundary radius At the step SS104 of FIG. 33, when the road distance h of the set center intersection is larger than the boundary radius If and the set intersection at the step SS104 is determined to be the outmost (outermost) intersection, its center intersection, its parent intersection, and road distance h are stored in the S-RAM 24 at a step SS122 of FIG. 34. At the next step SS124, one of the intersections adjacent to the center intersection is selected and the routine goes to a step SS128 in which the road distance h from the center intersection up to the selected adjacent intersection is added to the road distance h of the center intersection so as to derive the accumulated road distance A up to the adjacent intersection. At the step SS128, the CPU 1 determines whether the accumulated road distance A is smaller than the road distance h of the adjacent intersection stored in the D-RAM 22. If the former is smaller than the latter at the step SS128, the routine goes to a step SS130. If not smaller than the latter at the step SS128, the routine, in turn, goes to a step SS128.

When the accumulated road distance A up to the adjacent intersection is smaller than the road distance h stored in the D-RAM 22, the CPU 1 operates the road distance h of the adjacent intersection stored in the D-RAM 22 to be changed to the accumulated road distance A.

At a step SS132, the center intersection is set to the parent intersection of the presently selected adjacent intersection. That is to say, the present center intersection is the outmost (outermost) intersection so that the presently selected adjacent intersection falls in the range of (n+1)-th layer if the center intersection is placed in the n-th layer. Hence, the outmost (outermost) intersection of the n-th layer, i.e., the present center intersection is set as the parent intersection of the present adjacent intersection.

At a step SS134 of FIG. 34, the CPU 1 determines whether the presently selected adjacent intersection is present in the provisional center intersection candidate list. If it is already registered in the provisional center intersection candidate list, the routine goes to a step SS138. If not registered at the step SS134, the routine goes to a step SS136. It is noted that in the case where the center intersection is the outmost (outermost) intersection, its adjacent intersection is not registered in the center intersection candidate list but registered in the provisional center intersection candidate list. At the step SS136, the adjacent intersection is additionally registered in the provisional center intersection candidate list.

Next, the routine goes to a step SS138, the CPU 1 determines whether all of the intersections adjacent to the presently set center intersection have been searched. If the above-described series of processing are ended for all of the intersections adjacent to the center intersection, the routine goes to the step SS140. Otherwise, the routine returns to the step SS124 of FIG. 34 to repeat the above-described series of processing for the remaining adjacent intersection(s).

When the road distance h of the center intersection becomes larger than the boundary radius H and the center intersection becomes the outmost (outermost) intersection, the number of the intersections registered in the center intersection candidate list become progressively reduced and, finally, the center intersection candidate list becomes empty. At this time, since the step SS140 of FIG. 35 is positive and the routine goes to the step SS142 in which the CPU 1 determines whether the provisional center intersection candidate list has become empty. This means that the CPU 1 confirms whether the route search on a predetermined range of the road map read from the CD-ROM 16 is ended. If the provisional center intersection candidate list becomes empty, the search of the predetermined range on the road map is determined to be ended and the routine is finished. If not empty, the routine goes to a step SS144 in which the intersections registered in the provisional center intersection candidate list are moved into the center intersection candidate list and the boundary radii H are increased to carry out the subsequent route search in the next hierarchy ((n+1) layer) (H1→H2→H3→ - - - → Hn).

If the above-described series of processing are repeated, the outmost (outermost) intersection of each layer is searched and its information is stored in the S-RAM 24.

Figure 39:
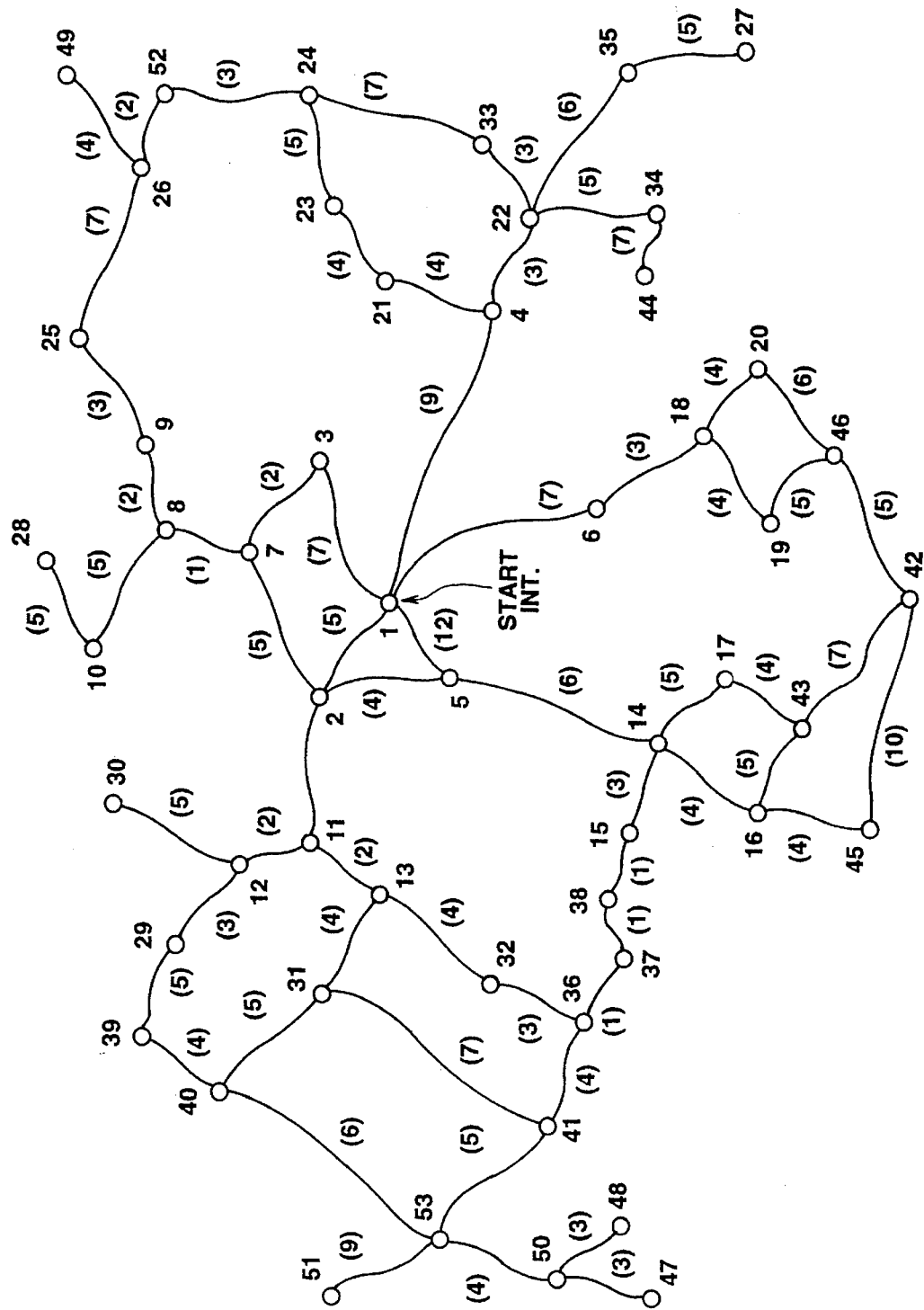
FIG. 39 is an explanatory view of the intersection network for explaining the method for searching the optimum route in the case of the third embodiment.

FIG. 39 shows another intersection network for explaining the method for searching the optimum route in the case of the third embodiment.

In FIG. 39, small circles denote the intersections and numerals attached adjacent to the small circles denote the numbers of the intersections. In addition, lines connected between the intersections denote roads and numerals attached above denote road distances from the respective intersections to the adjacent intersections.

FIGS. 40 through 45 show the stored contents of the D-RAM 22 representing the results of route searches. The D-RAM 22 stores the road distance h for each intersection, the parent intersection, the center intersection candidate list, and provisional center intersection candidate list. It is noted that the outmost (outermost) intersection flags described above to be set for the respective intersections are omitted in FIGS. 40 through 45.

Herein, the process of route search of the optimum route to the respective intersections surrounding the present position of the vehicle in the case of the third embodiment will be described with reference to the example of the intersection network shown in FIG. 39.

In the example of FIG. 39, the intersection 1 is specified as the start intersection.

The D-RAM 22 after the above initialization stores the data shown in FIG. 40.

In details, zero is set to the road distance h of the start intersection 1 and +∞ is set to the other road distances h for the other intersections. As the parent intersection of the start intersection, 1 is set to the start intersection 1 and zeroes are set to the parent intersections to the other intersections.

Next, the above-described series of processing of the route search are executed for the adjacent intersections 2 through 6 to the start intersection 1 and the stored contents of the D-RAM 22 are changed to those in FIG. 41. When the respective road distances h of the intersections 2 through 6 are changed, the start intersection 1 is set as their parent intersection. In addition, the intersections 2 through 6 have been registered which are intersections adjacent to the start intersection 1 into the center intersection candidate list.

From among the intersections 2 through 6 registered in the center intersection candidate list, the intersection 2 having the least value of the road distance h is set as the next center intersection so that the route search for the intersections 1, 5, 7, and 11 adjacent to the center intersection 2 is carried out. Consequently, the stored contents of the D-RAM 22 are changed to those shown in FIG. 42. In other words, the road distances h for the intersections 5, 7, and 11 are changed and the parent intersection 1 of the center intersection 2 is set as the parent intersection of these adjacent intersections 5, 7, and 11. At this time, the intersection 2 which is set as the center intersection is erased from the center intersection candidate list and the intersections 7 and 11 are additionally registered into the center intersection candidate list. It is noted that since the intersection 5 has already registered into the center intersection candidate list, the intersection 5 is not needed to be registered.

Suppose that 9 is set to the boundary radius H. When the optimum route search is continued from the start intersection to the surrounding respective intersections, the road distance h of the center intersection becomes larger than 9 when the intersection 18 having the road distance h=10 is selected as the center intersection. Hence, the adjacent intersections 19 and 20 are not registered in the center intersection candidate list but are registered in the provisional center intersection candidate list. The center intersection 18 is set as the parent intersection of these intersections. The center intersection 18 has its road distance h exceeding the boundary radius H=9 and serves as the outmost (outermost) intersection. Thus, the center intersection number 18, its road distance h=10, and its parent intersection 1 are stored in the S-RAM 24.

When the further search has been continued, the center intersection candidate list becomes empty as shown in FIG. 44. At this time point, the intersections 8, 12, 13, 14, 18, 21, and 22 serve as the outmost (outermost) intersections of the first layer and are stored in the S-RAM 24.

Thereafter, as shown in FIG. 45, the intersections registered in the provisional center intersection candidate list are moved to the center intersection candidate list and the above-described series of processing are repeated. Thus, the information on the outmost (outermost) intersections of the respective layers are stored in the S-RAM 24.

Next, the optimum route search from the destination to the present position of the vehicle in the third embodiment will be described with reference to the operational flowchart integrally shown in FIGS. 36 through 38.

Figure 36:
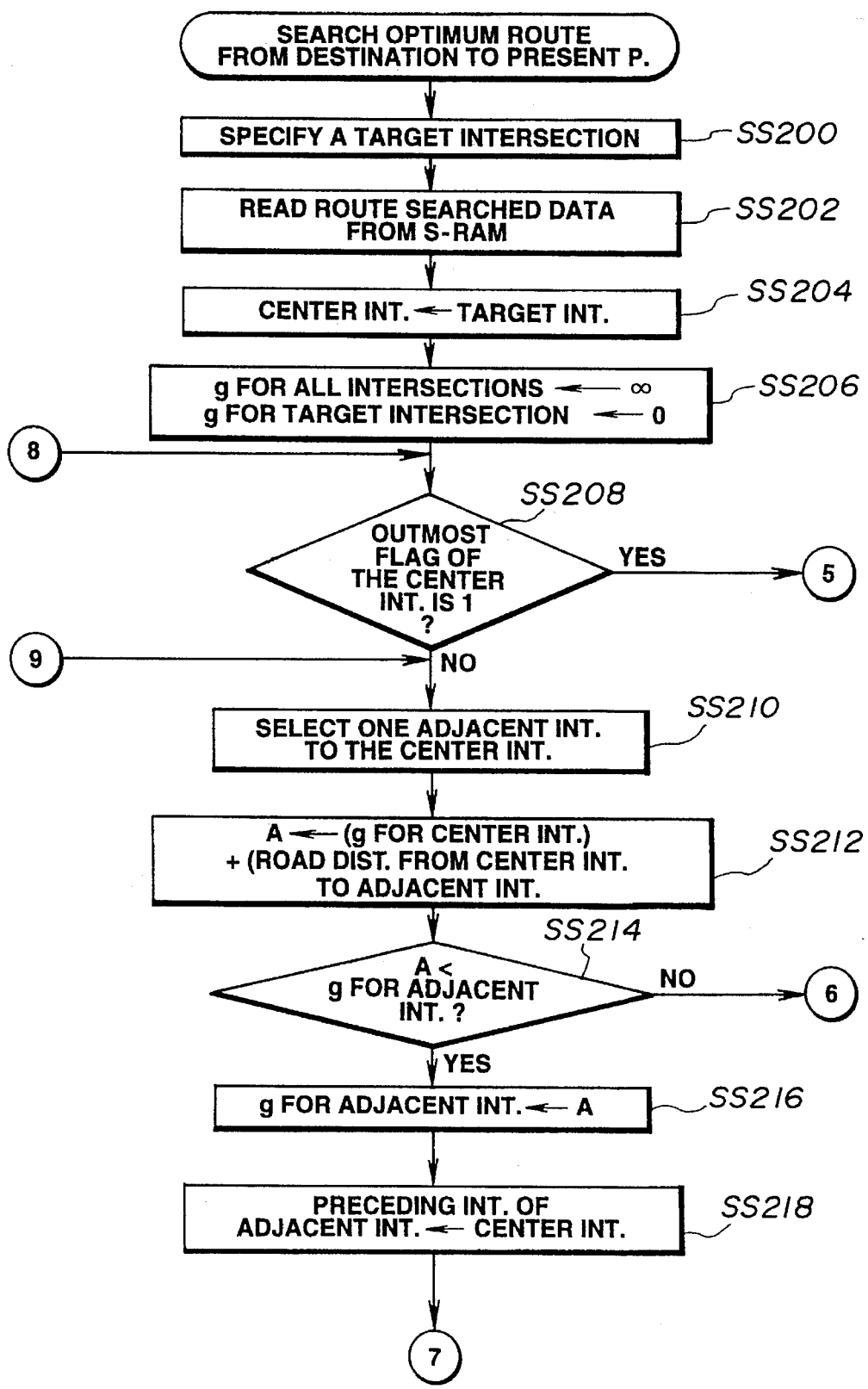
FIG. 36 is an operational flowchart indicating the route from the destination to the present position of the vehicle subsequent to FIG. 35.

First, at a step SS200 of FIG. 36, the CPU 1 so specifies the target intersection. The target intersection is selected from among the intersections surrounding the destination which is present outside of a circle having a predetermined radius with the destination as the center of the circle and which is nearest to the destination, in the same way as described in the case of the start intersection.

Next, the routine goes to a step SS202 in which the information related to the outmost (outermost) intersections of the respective layers is read from the S-RAM 24.

At a step SS204, the target intersection is set as the center intersection.

At a step SS206, zero is set to the road distance g of the target intersection as the center intersection and +∞ are set to all road distances of the other intersections except the center (target) intersection. The result of route search from the destination to the present position of the vehicle is stored in the D-RAM 22.

FIG. 46 shows the stored contents of the D-RAM 22 at the time when the initialization is executed.

In FIG. 46, the preceding intersection is an intersection present in front of each intersection on the optimum route from the target intersection to the present position of the vehicle. It is noted that the outmost (outermost) intersection flags are flags on the intersections which have been stored in the S-RAM 24 as the outmost (outermost) intersections of the respective layers in the route search surrounding the present position of the vehicle and the outmost (outermost) flags on the outmost (outermost) intersections according to the read outmost (outermost) intersection information from the S-RAM 24 are set to 1.

Referring back to FIG. 36, at a step SS208, the CPU 1 determines whether the outmost (outermost) flag of the center intersection is set to 1. If the center intersection is the out,nest (outermost) intersection at the step SS208 (YES), the routine goes to a step SS234 of FIG. 38. Otherwise, the routine goes to a step SS210.

At the step SS210, the CPU 1 selects any one of the intersections adjacent to the center intersection and the routine goes to a step SS122.

At the step SS122, the road distance g from the center intersection to the selected adjacent intersection is added to the road distance g of the center intersection to derive the accumulated road distance value of A up to the adjacent intersection selected at the step SS210.

At a step SS124, the CPU 1 determines whether the accumulated value of A is smaller than the road distance g of the selected adjacent intersection stored in the D-RAM 22. If is is smaller, the routine goes to a step SS216. If not smaller (NO) at the step SS214, the routine goes to a step SS228 of FIG. 37.

That is to say, when the calculated value of A of the road distance up to the adjacent intersection is smaller than the road distance g stored in the D-RAM 22, the CPU 1, at the step SS216, operates to change the road distance g stored in the D-RAM 22 as that of the adjacent intersection selected at the step SS210 to the calculated value of A and, at the next step SS218, the center intersection is set as the preceding intersection of the selected adjacent intersection.

Figure 37:
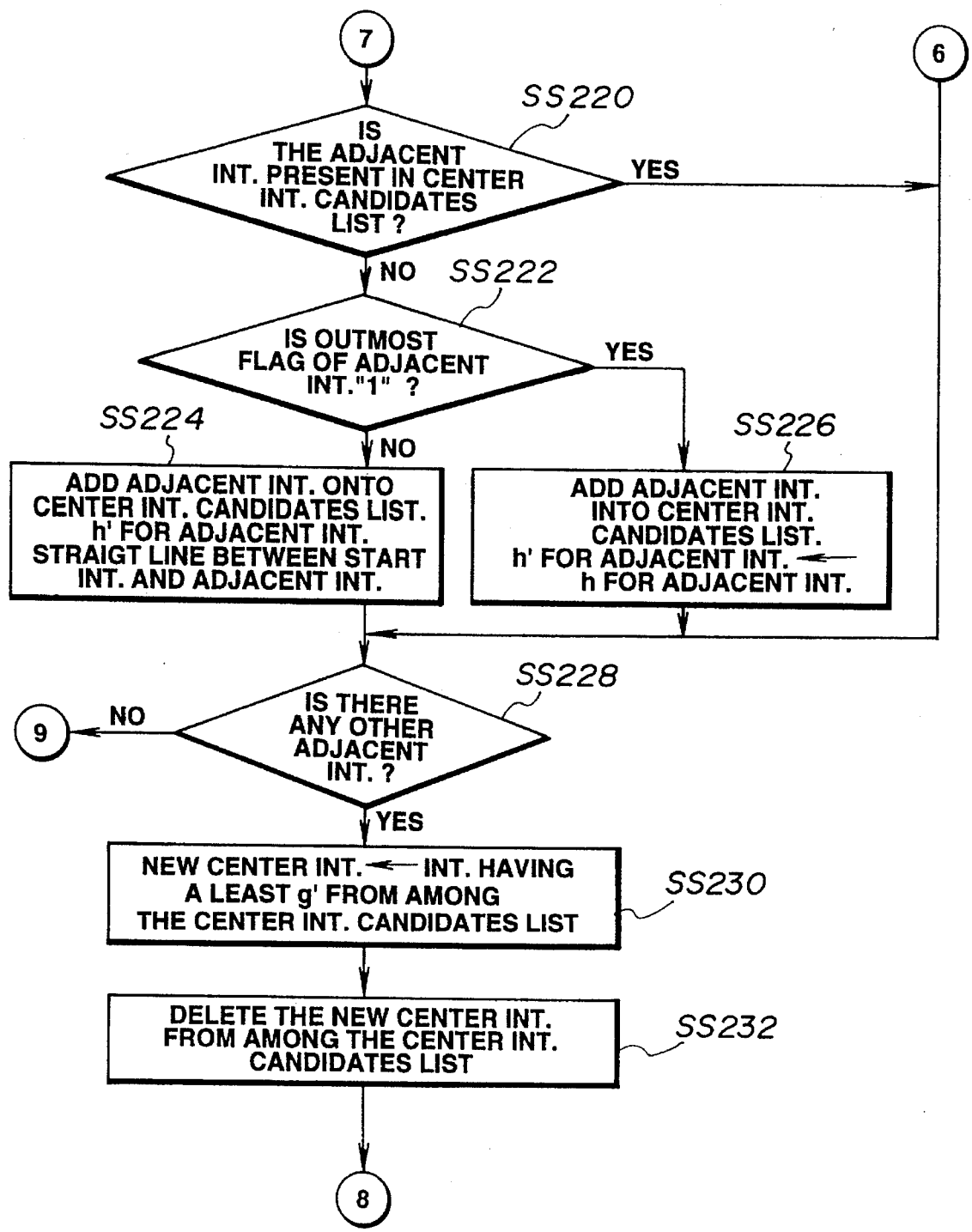
FIG. 37 is an operational flowchart indicating an optimum route searching program subroutine to each intersection surrounding the present position subsequent to FIG. 36.

At the step SS220 of FIG. 37, the CPU 1 determines whether the presently selected adjacent intersection is present in the center intersection candidate list.

If the presently selected adjacent intersection is registered in the center intersection candidate list, the routine goes to a step SS222 of FIG. 37. If not registered at the step SS220, the routine goes to a step SS222.

At the step SS222, the CPU 1 determines whether 1 is set to the outmost (outermost) flag of the presently selected adjacent intersection.

If 1 is set to the outmost (outermost) flag described above, the routine goes to a step SS226. If 1 is not set (NO) at the step SS222, the routine goes to a step SS224.

If the adjacent intersection is not the outmost (outermost) intersection, the adjacent intersection presently selected is additionally registered in the center intersection candidate list and the straight line distance from the selected adjacent intersection to the start intersection is calculated on the basis of the road map data and set as the estimated road distance h' at a step SS224.

The estimated road distance h' is an estimated value of the road distance from any arbitrary intersection to the start intersection. In the third embodiment, the straight line distance from any arbitrary intersection to the start intersection is assumed as the estimated distance h'.

On the other hand, in the case where the adjacent intersection is the outmost (outermost) intersection, the adjacent intersection is additionally registered into the center intersection candidate list. Since the road distance h from the start intersection to the adjacent intersection via the route has been calculated, the road distance h of the adjacent intersection is set as the estimated road distance h' on the selected adjacent intersection.

At the step SS228, the CPU 1 determines whether all of the series of processing are ended for all of the adjacent intersections. If ended (YES) at the step SS228, the routine goes to a step SS230. If not ended (NO), the routine returns to the step SS210 of FIG. 36.

At the step SS230, the CPU 1 selects one of the intersections registered in the center intersection candidate list and which have the least value of (g+h'), i.e., the least estimated road distance from the target intersection to the start intersection as a new intersection.

In this way, if the search is carried out with the intersections having the least values of the estimated road distances from the target intersection to the start intersection sequentially retrieved, the route search having the directivity from the target intersection to the start intersection can be executed. Consequently, a more speedy optimum route search can be carried out with the search region reasonably limited.

At the subsequent step SS232, the intersection which is selected as the newly selected center intersection is erased from the center intersection candidate list and the routine returns to the step SS208. Then, the above-described series of processing are repeated.

Figure 38:
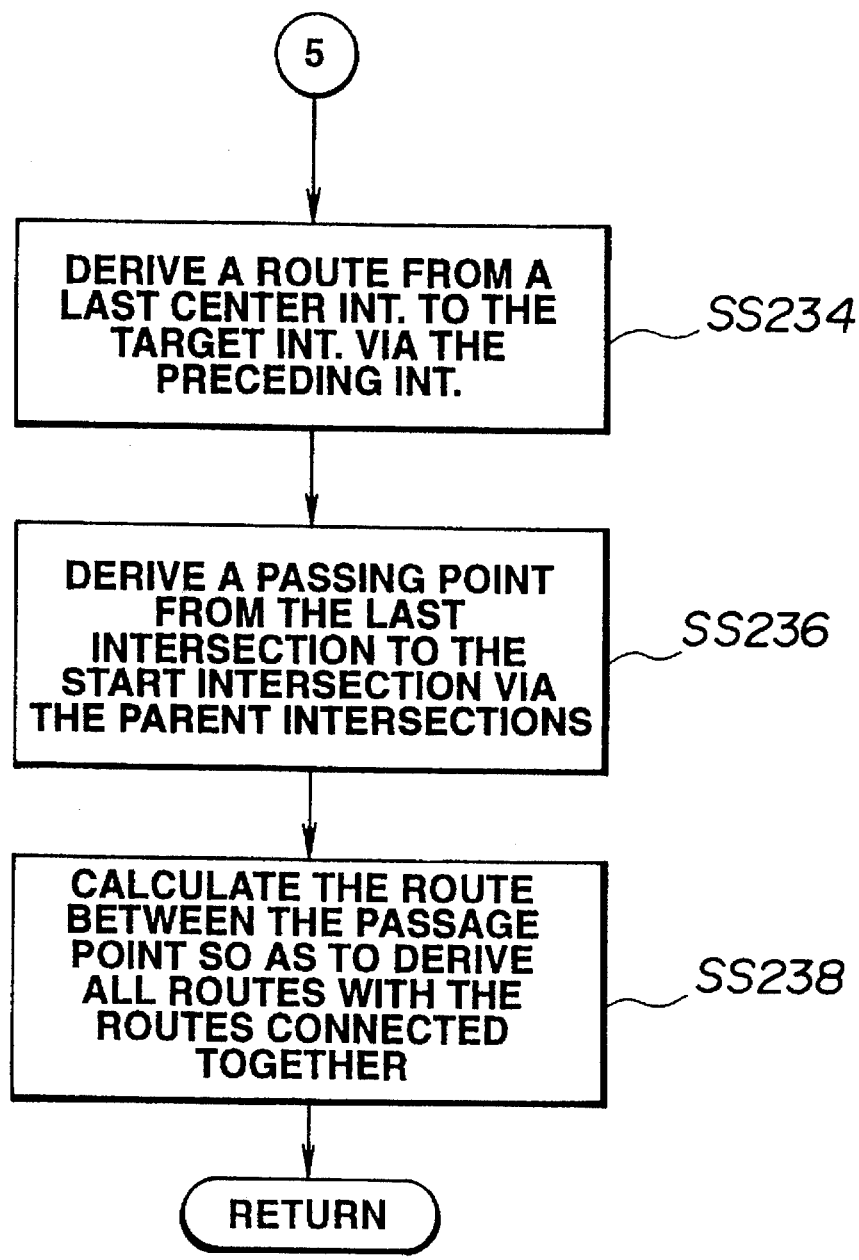
FIG. 38 is an operational flowchart indicating an optimum route searching program subroutine to each intersection surrounding the present position subsequent to FIG. 37.

On the other hand, when the CPU 1 determine that the center intersection is the outmost (outermost) intersection at the step SS208, the routine goes to the step SS234 of FIG. 38.

Since, in the case where the center intersection is the outmost (outermost) intersection, the route having the least road distance g from the target intersection to the start intersection is already determined and the route having the least road distance h from the presently selected center intersection to the start intersection is also already determined, the search of the optimum route having the least road distance ( g+h') from the target intersection to the start intersection could already be carried out.

At a step SS236 of FIG. 38, the CPU 1 refers to the stored data in the D-RAM 22 so as to provide the optimum route having the least road distance from the last selected center intersection up to the target intersection via the preceding intersections.

At a step SS238, the routes from the last selected center intersection to the start intersection via the parent intersections are calculated in details so as to derive the optimum route from the target intersection to the start intersection.

It is noted that when calculating the detailed routes from the center intersection to the start intersection via the parent intersections at the step SS238, the CPU 1 executes the route calculation on the first layer having a priority and, when the route calculation on the first layer is ended, the optimum route in the range of the first layer is displayed on the CRT 18 (alternatively, a liquid crystal display may be used in place of the CRT 18) so as to quickly start the guidance of the vehicle occupant to the destination.

In addition, if the set boundary radius H1 of the first layer determining the width of the searched region of the first layer is made smaller those (H2, H3, . . . , Hn) of any other layers and the searched region of the first layer is made narrower, the route calculation on the first layer can accordingly be shortened and a quicker start of the guidance of the vehicle occupant can be carried out. In addition, since the searched regions on the other layers than the first layer are wider, the searched data on the wider regions can be stored in the S-RAM 24.

Furthermore, all of the searched data on the first layer may be stored in the S-RAM 24 and only the searched data on the outmost (outermost) intersection for the other layers including the second layer and the upper layers may be stored in the S-RAM 24. In this case, the recalculation of the optimum route in the first layer after the destination is set is not necessary so that a quicker start of the guidance of the vehicle occupant can be carried out through the CRT 18.

(Fourth embodiment)

FIGS. 47 through 51 show a fourth embodiment of the rout guidance system 100 according to the present invention.

The hardware structure in the fourth embodiment is the same as each of those in the previous embodiments.

Figure 47:
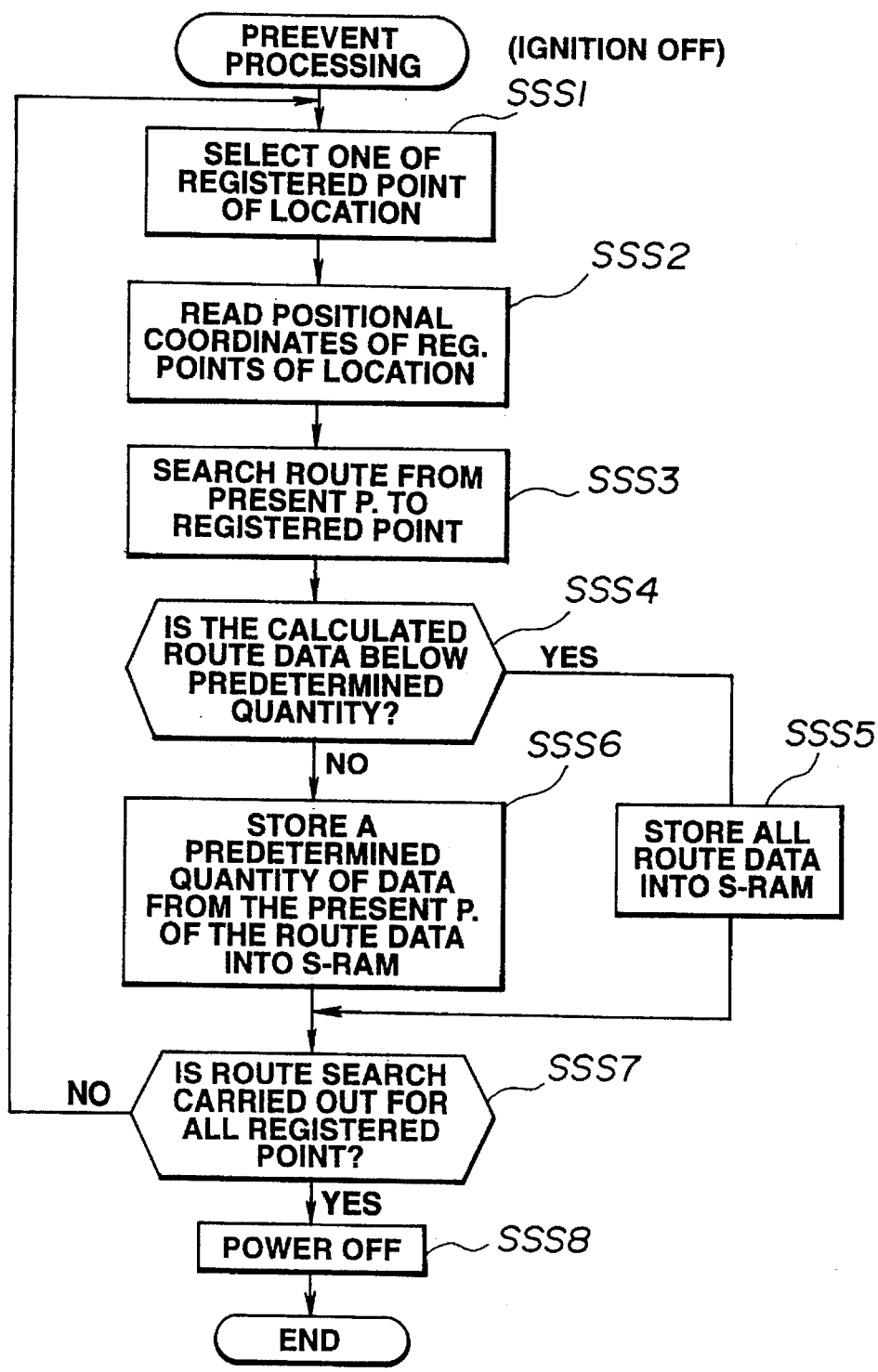
FIG. 47 is an operational flowchart for explaining a preevent processing program main routine of the microcomputer in a case of a fourth preferred embodiment according to the present invention.

FIG. 47 shows a preevent processing program routine off the route guidance system 100 upon the turn off of the ignition key switch 102. The CPU 1 executes the preevent processing program shown in FIG. 47 when the ignition key switch 102 is placed at the OFF position and the ignition key switch 102 is turned off to start the route search toward a registered point of location.

That is to say, when the CPU 1 selects one of the previously registered points of locations in the S-RAM 24 at a step SSS1.

At a step SSS2, the CPU 1 reads coordinate values of the registered point of location selected at the step SSS2.

At a step SSS3, the CPU 1 searches for one of the routes from the present position of the vehicle to the selected registered point of location and stores the route data on the intersection number of the respective intersections, coordinate values thereof, and road distances from the present position of the vehicle once into the D-RAM 22.

This route search in the fourth embodiment will be described later.

At the next step SSS4, the CPU 1 determines whether the searched data exceed a predetermined quantity. If the searched data amounts are less than the predetermined quantity (off course, the predetermined quantity is an arbitrary number above 1), the routine goes to a step SSS5. Otherwise, the routine goes to a step SSS6. It is noted that the predetermined quantity may correspond to the memory capacity allocated to one registered point of location within the memory capacity of the S-RAM 24. In the fourth embodiment, the number of the registered points of locations are six at the maximum which can be registered in the S-RAM 24. However, in the case where the number of registered points of locations actually registered are less than six, the predetermined quantity may be incremented according to the number of the registered points of locations.

If the searched data are less than the predetermined quantity, all of the route data searched at the step SSS5 are stored in the S-RAM 24. On the other hand, the route searched data are greater in number than the predetermined quantity, the route data corresponding to the part of the predetermined quantity near to the present position of the route data are stored in the S-RAM 24. At the step SSS7, the CPU 1 determines whether the route search for all of the registered points of locations stored in the S-RAM 24 has been carried out. When the route searches for all of the registered points of locations are ended, the routine goes to a step SSS8 in which the relay 26 is turned off to halt the power supply to the route guidance system 100. On the other hand, in the case where any of the points of locations at which the route search is not yet ended, the routine returns to the step SSS1 from which the abovedescribed series of processing are executed for the corresponding point of location at which the route search is not yet ended.

Figure 48:
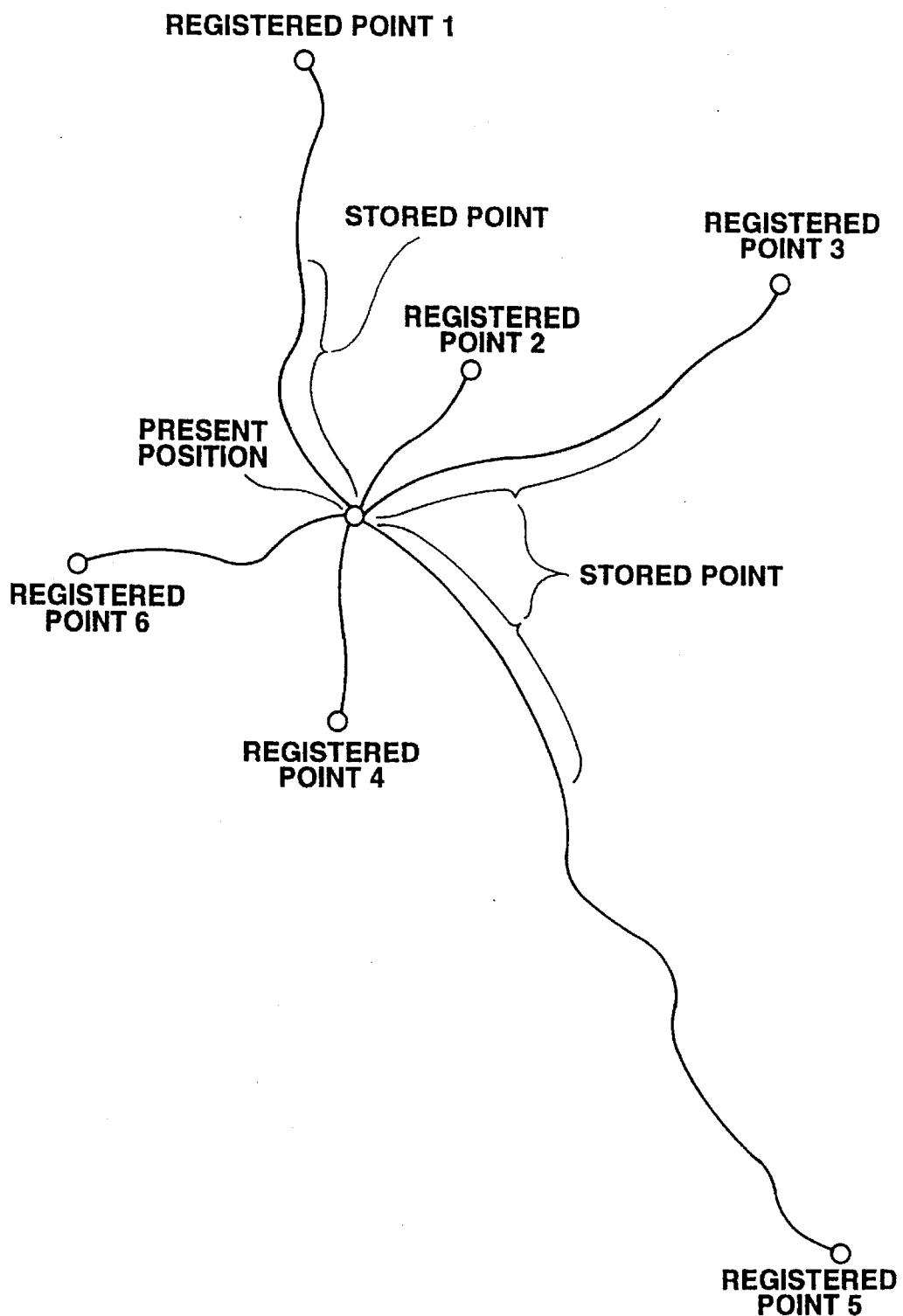
FIG. 48 is an explanatory view of an example of a route search to a registered point of location in the case of the fourth embodiment.

FIG. 48 shows an example of the route search to the registered points of locations in the fourth embodiment.

Suppose, now, that six registered points of locations are set and the routes denoted by bold lines in FIG. 48 to the respective points of locations are being searched. The respective registered points of locations 2, 4, and 6 near to the present position of the vehicle are all less than the predetermined quantity, all routes are stored in the S-RAM 24. On the other hand, since the registered points of locations 1, 3, and 5 are far way from the present position and their route data are greater than the predetermined quantity, the parts of the routes corresponding to the predetermined quantity and near the present position (stored points) are stored in the S-RAM 24, as shown in FIG. 48.

The method For searching the route to the registered points of locations in the fourth embodiment will be described below.

In the fourth embodiment, while the battery power is continued to be supplied via the relay 26 with the ignition key switch turned off, the present position of the vehicle is calculated using the GPS as described in the first embodiment and the CPU 1 executes the search of the route having the road distance which is minimum to the registered point of location from among the plurality of routes from the present position to the previously registered point of location.

The optimum route searching method surrounding the present position of the vehicle is the same as disclosed in the Japanese Patent Application First Publication No. Showa 62-86499, as explained in the case of the first embodiment.

Although this method has already described in the First embodiment, the brief explanation thereof will be made below.

First, the road distance $h$ ($h_0$) on the center intersection is set to 0 and the road distances $h$ ($h_1$ to $h_6$) on the other intersections are set to constants corresponding to $\infty$. With the start intersection set as the center intersection, the route search is started.

The road distance $h0$ from the start intersection stored as the road distance on the center intersection is added to the road distance from the center intersection to one of the intersection adjacent to the center intersection to derive the road distance $H1$ from the start intersection to its selected adjacent intersection. The road distance $h1$ so is compared with the road distance $h2$ from the start intersection which is already stored in the road distance on its adjacent intersection. If the presently derived road distance $H1$ is smaller than $h2$, the road distance $h2$ is changed to that denoted by $h1$ and the center intersection is set as the preceding intersection A to the adjacent intersection. When the above-described series of processing are executed for all adjacent intersections to the center intersection, one of the intersections except the already selected center intersections whose road distance $h$ from the start intersection is set as the next new center intersection. The above-described series of processing are carried out for each of the adjacent intersections to the new center intersection.

In this way, the center intersections are successively set in such the order as their road distances from the start intersection become smaller so as to execute the route search and the route search is ended when one of the selected center intersections has reached to the registered intersection. The registered intersection means that any one of the intersections from among those near to the registered point of location which satisfies a predetermined condition is specified as the registered intersection. When, with the registered intersection at which the route search is ended as a start point, the preceding intersections A to the registered intersection are sequentially traced, the traced preceding intersection A reaches to the start intersection. This route provides the optimum route having the least road distance from the start intersection to the registered intersection. It is noted that the method for searching the route from the present position to the destination including the registered points of locations may not be limited to the above-described method.

Figure 49:
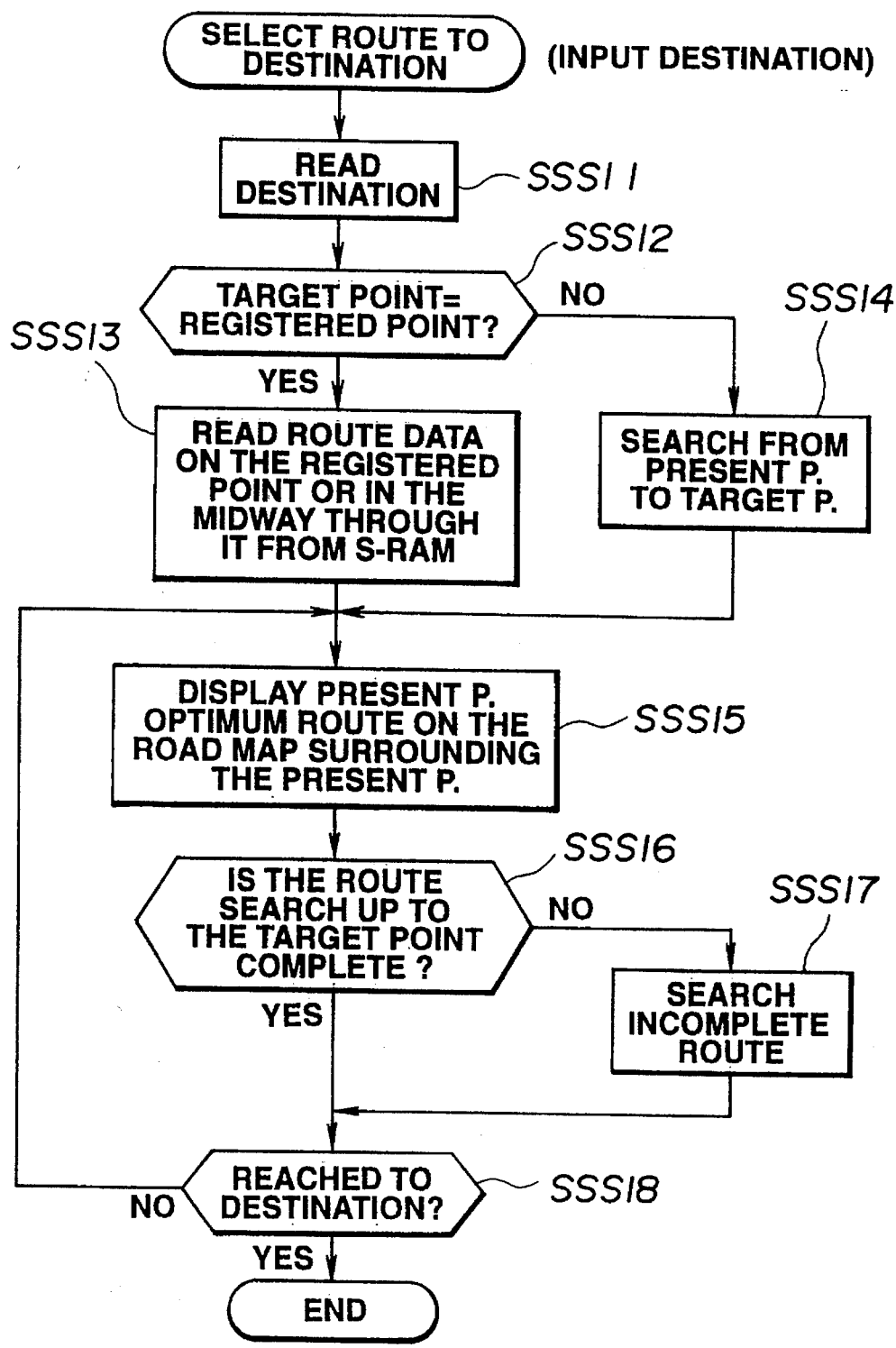
FIG. 49 is an operational flowchart of a route selection program routine to the destination executed by the microcomputer in the case of the fourth embodiment.

FIG. 49 shows the control program flowchart representing a route selection program toward the destination.

As described above, after the ignition key switch 102 is turned off and the optimum route search from the present position to the previously registered point of location is carried out, the route data on the result of the route search are stored in the S-RAM 24.

Thereafter, when the vehicle occupant returns to get on the vehicle and turns the ignition key to set it in the ON position, the key switch 102 is closed so that the power of the battery 101 to the vehicular route guidance system 100 is supplied. The CPU 1 starts the execution of the control program shown in FIG. 49 when the destination is input through the key 8. At a step SSS11, the destination input through the key 8 is read and, at the next step SSS12, the CPU 1 determines whether the destination is one of the previously registered points of locations.

If any one of the previously registered points of locations is selected through the key 8, the routine goes to a step SSS13, the CPU 1 reads the route data of the selected registered point of location from the S-RAM 24. At this time, in the case where he selected registered point of location is one of the registered points of locations which is far away from the present position, all route data from the present position to the selected registered point of location are not stored. Therefore, the route data in number corresponding to the predetermined quantity from the present position are read. On the other hand, if the destination is set which does not correspond to any one of the registered points of locations through the key 8, the routine goes to a step SSS14. For example, according to the route search method described above, the route from the present position to the set destination is searched.

When the route data up to the destination including the registered points of locations are obtained, the CPU 1 displays the road map surrounding the present position on the CRT 18 and displays the present position of the vehicle and the optimum route to the destination thereon. In addition, as the road map is scrolled along with the movement of the vehicle, the present position of the vehicle is updated.

At the subsequent step SSS16, the CPU 1 determines whether the route search up to the selected point of location or up to the destination has been completed. If it is ended at the step SSS16, the routine goes to a step SSS18. If not ended, the routine goes to a step SSS17.

If the selected point of location is placed far away from the start intersection and all of the route data are not stored in the S-RAM 24 or in the case where the set destination is distant away from the start intersection, it takes a lot of time to end the search for all routes. Therefore, in the case where the route search is started at the time at which the route in the midway through the destination has been calculated, the remaining route to the destination is searched at the step SSS17.

At the subsequent step SSS18, the CPU 1 determines whether the vehicle has arrived at the destination. If the vehicle has reached to the destination, the above-described series of processing are ended. Otherwise, the routine goes to a step SSS15 from which the above-described series of processing are repeated.

In this way, with the occupant's house, working office, and so on previously registered, the search data are stored in the S-RAM 24 after the route search to one of such registered points of locations as described above from the present position of the vehicle is carried out upon the turn off of the ignition key switch. After the vehicle occupant turns the ignition key switch off again and any one of the registered points of locations is selected as the destination, the CPU 1 reads the route from the present position of the vehicle and immediately displays it on the CRT. Thus, as soon as the registered point of location is selected, the immediate guidance of the vehicle occupant is started.

In addition, since the power supply to the vehicular route guidance system 100 is interrupted after the route search to the registered point of location upon the turn off of the ignition key switch and thereafter the power supply thereto from the auxiliary power supply 27 is, in turn, started so that a wasteful power consumption can be saved.

Furthermore, since the S-RAM 24 stores the predetermined quantity of route data near to the present position of the vehicle in a case where the route data as the result of route search are too much, the expensive S-RAM 24 can be saved to reduce the cost without sacrifice of advantages in the fourth embodiment such that the immediate route guidance Call be carried out upon the selection of the registered point of location.

In the fourth embodiment, although all routes to the registered points of locations are searched at the preevent processing after the ignition key switch is turned off, some intervened points of locations may be defined in the midway through the registered point of location and the route search up to the intervened points of locations may be carried out. The intervened point of location can be called an intermediate point.

Figure 50:
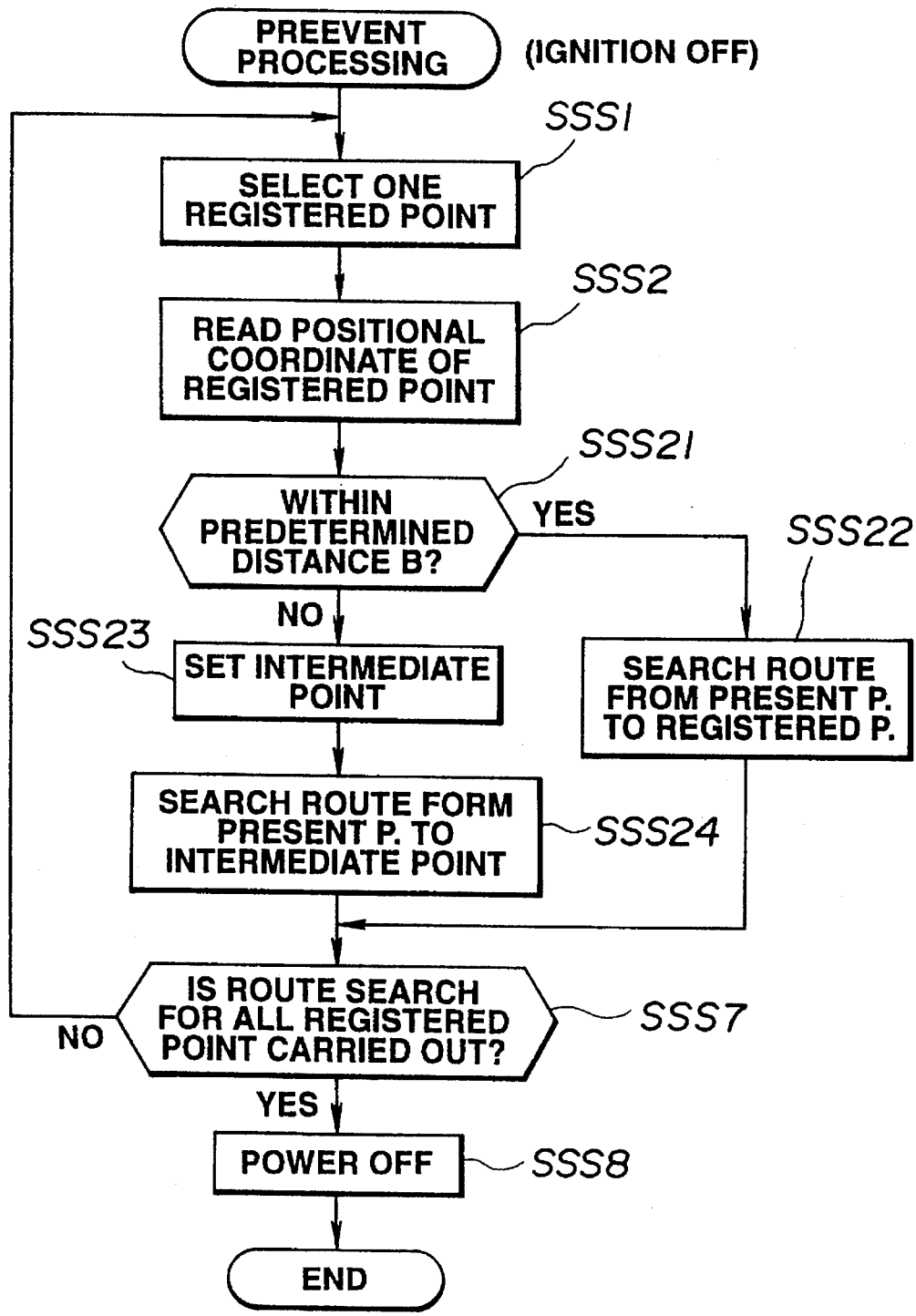
FIG. 50 is another operational flowchart for explaining a modification of a preevent processing program routine in place of FIG. 48.

FIG. 50 shows the program flowchart representing the preevent processing program in which the route search is continued up to the intervened point of location.

The same step numbers shown in FIG. 50 corresponds to like step numbers shown in FIG. 47 and the explanations of the same steps are omitted here.

At a step SSS21 after the positional coordinates of the selected registered point of location are read, the CPU 1 determines whether the selected registered point of location is within a predetermined range of distance B from the present position of the vehicle. If the selected registered point of location is within the predetermined range of distance B at the step SSS21 (YES), the routine goes to a step SSS22. Otherwise, the routine goes to a step SSS23.

Figure 51:
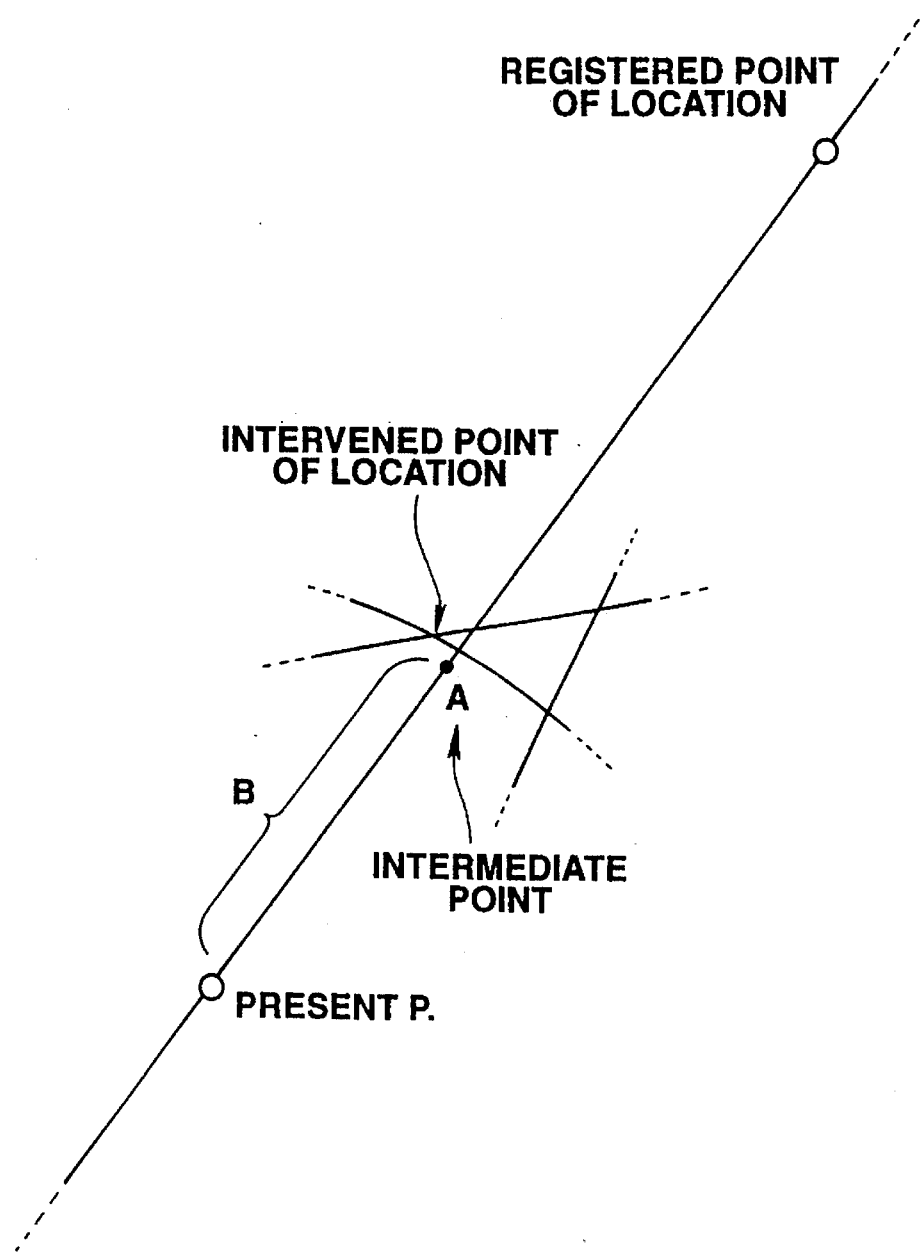
FIG. 51 is an explanatory view of a setting example of an intermediate point of location in the case of a modification of the fourth embodiment shown in FIG. 50.

When the selected registered point of location is within the predetermined range of distance B, the CPU 1 searches for all routes from the present position of the vehicle to the registered point of location and the route data as the result of the route search are stored in the S-RAM 24 at the step SSS22. On the other hand, if the selected registered point of location does not fall within the predetermined range of distance B, the CPU 1 draws the straight line from the present position to the registered point of location as shown in FIG. 51 and derives a point of location denoted by A of FIG. 51 which is placed the predetermined distance B from the present position of the vehicle on the straight line. Then, the CPU derives one of the intersections which is nearest to the intermediate point A. This is the intervened point of location.

At the next step SSS24, the CPU 1 searches the route from the present position of the vehicle up to the intervened point of location nearest to the point A and stores the route data into the S-RAM 24. In this case, the remaining route from the intervened point of location to the registered point of location is searched after the start of the route guidance to the vehicle occupant.

When the route search up to the registered point of location is carried out in the modification shown in FIG. 50, the route search corresponding to the part of the routes which cannot be stored in the S-RAM 24 any more and which exceeds the predetermined quantity from the present position of the vehicle can be omitted. Therefore, the time it takes to execute the route search can be shortened and the wasteful power consumption of the battery 101 can be avoided.

In addition, since the intersection which is the predetermined range of distance B distant from the present position and is nearest to the intermediate point A on the straight line from the present position to the registered point of location is set as the intervened point of location and the route search from the present position to the intervened point of location is carried out, the directional route search can be carried out and the time it takes to carry out the route search can be shortened.

As described hereinabove, since, in the route guidance apparatus and method according to the present invention, the optimum route search from the vehicle present position to the surrounding intersections has already been carried out during the turn off of the ignition key switch, the optimum route from the present position to the set destination to which the vehicle finally reaches can quickly be obtained and be displayed on the display unit image is screen together with the road map image. Consequently, the vehicle occupant can conveniently be guided to reach to the final destination through the display unit image screen.

It will fully be appreciated by those skilled in the art that the foregoing description has been made in terms of the preferred embodiment and various changes and modifications may be made without departing from the scope of the present invention which is to be defined by the appended claims.

What is claimed is:

1. An apparatus for guiding a vehicle occupant toward a destination at which the vehicle occupant desires to arrive through a display unit, comprising:

a) road map storing means for storing a road map therein;

b) setting means through which the vehicle occupant sets the destination;

c) first detecting means for detecting a present position of the vehicle and outputting a signal indicative of the present position of the vehicle;

d) display control means for reading the road map from said road map storing means, displaying the road map on the display unit, and simultaneously displaying the detected present position of the vehicle and an optimum route of travel of the vehicle to the set destination from the present position of the vehicle;

e) second detecting means for detecting whether a vehicular ignition key switch is placed at an OFF position or at an ON position to determine whether or not the vehicle is stopped;

f) first route searching means for previously searching the optimum routes of the vehicle to respective intersections from the detected present position of the vehicle when said second detecting means detects that the vehicular ignition key switch is placed at the OFF position with the vehicle stopped before the display control means is effective, said respective intersections falling in a region other than the destination set by the occupant through the setting means and surrounding the detected present position of the vehicle; and g) second route searching means operating for immediately displaying one of the optimum routes from the present position of the vehicle to the set destination if the set destination set through the setting means corresponds to one of the respective intersections falling in the region and whose optimum route is searched by the first route searching means when the ignition key switch is placed at the ON position and the vehicle occupant sets the destination through the setting means and otherwise operating for retrieving the result of search by the first route search means and the read road map data so as to derive the optimum route from the set destination toward the present position of the vehicle via one of the optimum routes searched by the first route searching means when the ignition key switch is placed at the ON position when the destination is set, and for immediately displaying the derived optimum route from the set destination through the setting means toward the present position of the vehicle via the searched optimum route by said first route searching means through one of the respective intersections in the region on the display unit through the display control means.

2. An apparatus for guiding a vehicle occupant toward a destination at which the vehicle occupant is desired to arrive via a display unit as claimed in claim 1, wherein said first route searching means searches any one of the routes which has a least value of a road distance from the present position to each intersection falling in the region surrounding the present position of the vehicle.

3. An apparatus for guiding a vehicle occupant toward a destination at which the vehicle occupant is desired to arrive via a display unit as claimed in claim 1, which further includes:

h) power supply means for continuing a power supply to the vehicle guidance apparatus for a predetermined period of time after the vehicle ignition key switch is placed at the OFF position so as to operate the first route searching means;

i) an auxiliary power supply which is independent of a vehicular battery; and j) search result storing means for holding its memory content by receiving the power supply from the auxiliary power supply when the supply of power from the power supply means is halted, and wherein said first route search means carries out the optimum routes while the power supply means continues to supply the power to the vehicle guidance apparatus for the predetermined period of time and for storing the result of route search thereby into the search result storing means.

4. An apparatus for guiding a vehicle occupant toward a destination at which the vehicle occupant is desired to arrive via a display unit as claimed in claim 3, wherein said second route searching means searches any one of the routes from the set destination toward the present position of the vehicle, retrieving the intersections falling another region surrounding the set destination in such an order that sums of a road distance from the set destination to any one of the intersections falling in the other region surrounding the set destination and an estimated road distance from its any one intersection to the present position of the vehicle becomes smaller so as to derive the optimum route from the set destination toward the present position of the vehicle.

5. An apparatus for guiding a vehicle occupant toward a destination at which the vehicle occupant is desired to arrive via a display unit as claimed in claim 4, wherein said second route searching means ends the corresponding route search when the intersection to be searched thereby has reached to a start intersection, said start intersection being defined as an intersection present outside of a circle having a predetermined radius with the present position as a center of the circle and which is nearest to the present position of the vehicle.

6. An apparatus for guiding a vehicle occupant toward a destination at which the vehicle occupant is desired to arrive via a display unit as claimed in claim 4, wherein said second route searching means ends the corresponding route search when the intersection to be searched thereby has reached to one of the intersections at which the route search by the first route searching means has been ended.

7. An apparatus for guiding a vehicle occupant toward a destination at which the vehicle occupant is desired to arrive via a display unit as claimed in claim 3, which further includes: k) data selecting means for selecting data which satisfies a previously set condition from among the route search searched by said first route searching means, and wherein said route search result storing means stores the route search data selected by said data selecting means and wherein said second route searching means retrieves the selected route search data stored in said route search result storing means and the road map data stored in said road map storing means so as to search the optimum route from the set destination toward the present position of the vehicle.

8. An apparatus for guiding a vehicle occupant toward a destination at which the vehicle occupant is desired to arrive via a display unit as claimed in claim 7, wherein said first route searching means searches one of the routes from the present position to the respective intersections falling in the region surrounding the present position of the vehicle which has a least value of a road distance from the present position of the vehicle to the intersection to be searched and wherein said data selecting means selects the route search data related to the intersections, each of the intersections, to which the road distance from the present position of the vehicle have reached to a previously set value of a boundary radius.

9. An apparatus for guiding a vehicle occupant toward a destination at which the vehicle occupant is desired to arrive via a display unit as claimed in claim 7, wherein said first route searching means searches one of the routes from the present position to the respective intersections falling in the region surrounding the present position of the vehicle and wherein said data selecting means selects the route search data related to the respective intersections falling in the region surrounding the present position of the vehicle, each of said respective intersections being the intersection having a road distance from the present position of the vehicle thereto, said road distance being reached to a first previously set value of a first boundary radius and being reached to a second previously set value of a second boundary radius, said second previously set value of the second boundary radius being larger than the first previously set value of the first boundary radius.

10. An apparatus for guiding a vehicle occupant toward a destination at which the vehicle occupant is desired to arrive via a display unit as claimed in claim 9, wherein said route search result storing means stores the route searched data related to all intersections until the road distance from the present position of the vehicle to each of the intersections to be searched thereby and stores the route search data related to the intersections selected by the data selecting means to which the road distances from the present position of the vehicle have at least reached to the second previously set value of the second boundary radius when the road distance from the present position of the vehicle to the intersection to be searched has exceeded the first previously set value of the first boundary.

11. An apparatus for guiding a vehicle occupant toward a destination at which the vehicle occupant is desired to arrive via a display unit as claimed in claim 3, which further comprises: k) registering means for previously registering arbitrary points of locations: and l) selecting means for selecting one of the registered points of locations as the destination of the vehicle, and wherein said first and second route searching means are integrated as the route searching means for searching the optimum routes from the detected present position of the vehicle to the registered points of locations registered by said registering means after the ignition key switch has been placed at the OFF position said route storing means stores the optimum routes as the result of the route search by said route searching means, and said display control means reads one of the optimum routes from the detected present position of the vehicle to the selected registered point of location as the set destination and immediately displays the read optimum route on the display unit when said selecting means selects one of the registered points of locations as the destination of the vehicle and the ignition key switch is again placed at the ON position after the ignition key switch is placed at the OFF position.

12. An apparatus for guiding a vehicle occupant toward a destination at which the vehicle occupant is desired to arrive via a display unit as claimed in claim 11, wherein said route storing means comprises a non-volatile memory.

13. An apparatus for guiding a vehicle occupant toward a destination at which the vehicle occupant is desired to arrive via a display unit as claimed in claim 12, wherein said non-volatile memory comprises a S-RAM.

14. An apparatus for guiding a vehicle occupant toward a destination at which the vehicle occupant is desired to arrive via a display unit as claimed in claim 11, which further comprises: m) memory control means for controlling the storage of the contents of the route storing means such that, when an information quantity of the result of route search by said route searching means is greater than a predetermined quantity, parts of routes corresponding to the predetermining quantity near to the present position of the vehicle are stored in the route storing means.

15. An apparatus for guiding a vehicle occupant toward a destination at which the vehicle occupant is desired to arrive via a display unit as claimed in claim 14, wherein said route searching means searches the optimum route from the detected present position of the vehicle to a predetermined distance.

16. An apparatus for guiding a vehicle occupant toward a destination at which the vehicle occupant is desired to arrive via a display unit as claimed in claim 15, wherein said route searching means sets one of intersections adjacent to a point of location which is present on a straight line from the detected present position of the vehicle to the registered point of location and which is present at the predetermined distance from the detected present position of the vehicle as an intervened point of location and searches the optimum route from the detected present position of the vehicle to the intervened point of location.

17. An apparatus for guiding a vehicle occupant toward a destination at which the vehicle occupant is desired to arrive via a display unit as claimed in claim 16, wherein, when the optimum route stored in the route storing means is a part from the present position to the registered point of location, said route searching means searches the optimum route of the remaining part of the optimum route to the registered point of location after the display control means display the part of the optimum route on the road map displayed on the display unit.

18. An apparatus for guiding a vehicle occupant toward a destination at which the vehicle occupant is desired to arrive via a display unit as claimed in claim 1, wherein said first route searching means searches for any one of the routes to be traveled from the present position of the vehicle to the respective intersections falling in the region surrounding the present position of the vehicle, the searched route having a least value of a required time it takes for the vehicle to reach the searched intersection from the present position of the vehicle.

19. An apparatus for guiding a vehicle occupant toward a destination at which the vehicle occupant is desired to arrive via a display unit as claimed in claim 18, wherein said second route searching means searches for any one of the routes as the optimum route from the set destination toward the present position of the vehicle in such an order of intersections that a sum between the required time it takes for the vehicle to reach to the searched intersection from the destination and an estimated required time it would take for the vehicle to reach to the present position from the searched intersection becomes small so as to derive the optimum route from the destination to the present position of the vehicle after the destination is set.

20. A method for guiding a vehicle occupant toward a destination at which the vehicle occupant desires to arrive via a display unit, comprising the steps of:

a) storing a road map at least including a present position of the vehicle on the road map;

b) setting the destination;

c) detecting the present position of the vehicle and outputting a signal indicative of the present position of the vehicle;

d) reading the road map, displaying the read road map on the display unit, and simultaneously displaying the detected present position of the vehicle and an optimum route of travel of the vehicle to reach to the set destination from the present position of the vehicle;

e) detecting whether a vehicular ignition key switch is placed at an ON position to determine whether or not the vehicle is stopped;

f) previously searching the optimum routes of travel of the vehicle to respective intersections from the detected present position of the vehicle when the vehicular ignition key switch is placed at an OFF position with the vehicle stopped, said respective intersections falling in a region other than the destination set by the occupant and surrounding the detected present position of the vehicle; and g) immediately displaying one of the optimum routes from the present position of the vehicle to the set destination if the set destination corresponds to one of the respective intersections falling in the region when the ignition key switch is placed at the ON position and the vehicle occupant sets the destination and otherwise retrieving the result of search at said step f) and the read road map data so as to derive the optimum route from the set destination toward the present position of the vehicle via one of the optimum routes when the ignition key switch is placed at the ON position when the destination is set, and for immediately displaying the derived optimum route from the set destination toward the present position of the vehicle via the searched optimum route through one of the respective intersections in the region on the display unit.

21. An apparatus for guiding a vehicle occupant toward a destination as received in claim 1, further comprising a timer for continuing, for a predetermined time duration, supply of power from a vehicular battery to the first route searching means after detection by the second detecting means that the vehicular ignition key switch is at the OFF position, thereby to activate the first route searching means for the predetermined time duration to search the optimum routes of the vehicle to the respective intersections after detection that the vehicular ignition key switch is at the OFF position and before the vehicular ignition key switch is placed in the ON condition and the second route searching means is activated.

22. A method for guiding a vehicle occupant toward a destination at which the vehicle occupant desires to arrive through a display unit, comprising the steps of:

a) storing a road map;

b) detecting a present position of the vehicle and outputting a signal indicative of the present position of the vehicle;

c) reading the road map stored at step a) from road map storing means, displaying the road map on the display unit, and displaying the detected present position of the vehicle and, simultaneously, an optimum route of travel of the vehicle to a set destination from the present position of the vehicle if the destination is set;

d) detecting whether a vehicular ignition key switch is placed at an OFF position or at an ON position to determine whether the vehicle is stopped or not;

e) previously searching the optimum routes of the vehicle to respective intersections from the detected present position of the vehicle when the vehicular ignition key switch is placed at the OFF position with the vehicle stopped before said step c), said respective intersections falling in a region other than the destination set by the occupant at the step c) and surrounding the present position of the vehicle; and f) immediately displaying one of the optimum routes from the present position of the vehicle to the set destination if the set destination set at the step c) corresponds to one of the respective intersections falling in the region and whose optimum route is searched at the step e) when the ignition key switch is placed at the ON position and the vehicle occupant sets the destination and otherwise for retrieving the result of the search at the step e) and the read road map data so as to derive the optimum route from the set destination toward the present position of the vehicle via one of the optimum routes searched at the step e) when the ignition key switch is placed at the ON position and when the destination is set, and for immediately displaying the derived optimum route from the set destination toward the present position of the vehicle via the searched optimum route searched at the step e) through one of the respective intersections in the region on the display unit.

23. A system for a vehicular travel route guidance to a destination to which a vehicle occupant desires to reach from a present position of the vehicle, comprising:

a) road map storing means for storing a road map data therein;

b) first detecting means for detecting the present position of the vehicle using a vehicle forward direction sensor and GPS satellites wave receiver;

c) second detecting means for detecting whether a key switch of an ignition key is closed or open;

d) setting means through which the vehicle occupant sets the destination when the key switch is closed;

e) display means for reading and displaying the road map data from the road map storing means on a display unit image screen and for superimposing the detected present position of the vehicle and an optimum route from the detected present position of the vehicle to the set destination on the displayed road map after the destination is set with the key switch closed;

f) first route searching means for previously searching for one of the routes along which the vehicle is to travel at optimum, said optimum route being present in a road segment from the detected present position of the vehicle to each of a plurality of intersections falling in a first region surrounding the detected present position of the vehicle, when the key switch is open so that the vehicle stops;

g) second route searching means for searching for one of the routes along which the vehicle is to travel at optimum on the basis of the result of route search by said first route searching means and read road map data, said optimum route being present in a road segment from the set destination to each of a plurality of intersections falling in a second region surrounding the set destination, when the key switch is closed and the destination is set; and h) display control means, responsive to the set of the destination with the key switch closed, for combining the optimum route searched by the first route searching means and that searched by the second route searching means so as to derive and display the optimum route from the present position to the set destination on the road map of the display unit image screen, a timer by means of which a power supply from a vehicular battery to the vehicular travel route guidance system is continued for a predetermined time duration so as to activate the first route searching means when the timer is started in response to the open of the key switch, wherein said first searching means searches for the optimum route from the detected present position of the vehicle to each of the intersections falling in the first region, the optimum route therein having a road distance h from the detected present position to any one of the intersections falling in the first region which gives a minimum value from among the searched plurality of the routes from the detected present position of the vehicle to the one intersection, wherein said first route searching means searches for the optimum route from the present position to each of the plurality of intersections falling in the first region in such a way that the first route searching means comprises a road map data base including an intersection network and a memory which stores the result of route search by the first route searching means, the result of route search memory means storing the road distance h from a start intersection to each of the intersections falling in the first region and a preceding intersection A placed in front of each intersection falling in the first region and each intersection therein being present on the optimum route from the start intersection to each intersection therein for each intersection falling therein, said start intersection being defined as an intersection which is present outside of a circle with the present position as a center of the circle and which is nearest to the present position of the vehicle, said first route searching means starts the route search by setting the road distance h of a center intersection to zero (h=0) and by setting the road distances h of the other intersection except the center intersection to an infinity (h=+∞), the center intersection being defined as the intersection to be searched to calculate the route and intersections adjacent to the center intersection being defined as the adjacent intersections, adds the road distance h0 of the center intersection from the start intersection stored in the road distance portion of the route result storing means and the road distance from the center intersection to the selected adjacent intersection to derive the road distance h1 from the start intersection to the selected adjacent intersection, compares the derived road distance h1 with the road distance h2 from the start intersection to the selected adjacent intersection stored as the road distance of the selected adjacent intersection in the route result storing means, changes the road distance h2 of the selected adjacent intersection to the road distance h1 when the derived road distance h1 is smaller than the road distance h2, sets the preceding intersection to the selected adjacent intersection as the new center intersection, sets the next new center intersection which has the least value of road distance h from the start intersection from among all of the intersections except the center intersections already selected as the center intersections when the above-described series of processing are ended for all adjacent intersections to the center intersection, and repeats the above-described series of processing for all intersections adjacent to the next new center intersection, so that the first route searching means sets sequentially the new center intersection in the order that the road distances from the start intersection give smaller values.

24. A system for a vehicular travel route guidance to a destination to which the vehicle occupant desires to reach from a present position of the vehicle as claimed in claim 23, wherein said first route searching means sequentially traces the preceding intersections A of the selected adjacent intersections to reach to the start intersection, the traced routes from the start intersection to the selected adjacent intersections providing the optimum route from the start intersection to the selected adjacent intersection when the route search by the first route searching means at the finally selected adjacent intersection is ended.

25. A system for a vehicular travel route guidance to a destination to which the vehicle occupant desires to reach from a present position of the vehicle as claimed in claim 24, wherein said second route searching means comprises another result of route storing means for storing road distances g of road segments from a target intersection to the respective intersections falling in the second region, preceding intersections B placed in front of the respective intersections on the optimum route from the target intersection to the respective intersections falling the second region, and estimated road distances h' from the respective intersections falling in the second region to the start intersection, said target intersection being defined as an intersection which is present outside of a circle having a predetermined radius and with the set destination as a center of the circle and which is nearest to the set destination, the estimated road distance h' being defined as a straight line distance from the start intersection to each intersection falling in the second region, and wherein said second route searching means first sets the road distance g of the target intersection to zero (0) and the road distances g of the other intersections except the target intersection to an infinity (+∞), and starts the route search form the set destination, with the target intersection set as the center intersection, adds the road distance g0 from the target intersection to the center intersection to the road distance from the center intersection to the selected adjacent intersection, one of the intersections adjacent to the center intersection being selected as the adjacent intersection, to derive the road distance g1 from the target intersection to the selected adjacent intersection compares the road distance g1 with the road distance g2 stored as the road distance of the selected adjacent intersection in the route search result storing means, changes the road distance g2 of the adjacent intersection to the road distance g1 when the road distance g1 is smaller than the road distance g2, sets the center intersection as the preceding intersection B of the selected adjacent intersection, calculates and stores the estimated road distance h' from the selected adjacent intersection to the start intersection, sets one of the intersections falling in the second region which has a least value of a sum (g+h') between the road distance g from the target intersection thereto and the estimated road distance h' from the one intersection to the start intersection as the next new center intersection when the above-described series of the processing for all of the adjacent intersections to the center intersection are ended, executes the above-described series of processing for the next new center intersection, so that the second route searching means searches for the optimum routes from the set destination to the respective intersections falling in the second region, sequentially sets the new center intersections in the order such that the sum (g+h') becomes smaller, derives a sum (g+h) between the road distance g of the selected adjacent intersection from the target intersection and the road distance h of the selected adjacent intersection from the start intersection when the selected adjacent intersection has reached to the intersection at which the optimum route search from the start intersection is ended by the first route searching means, compares the sum (g+h) with the road distance g3 from the start intersection to the start intersection, changes the road distance g3 of the start intersection to (g+h) when the road distance (g+h) is smaller than the road distance g3, and sets the finally selected adjacent intersection as the preceding intersection B to the start intersection, the preceding intersection B is defined as a contacting intersection between the first region and second region, and ends the optimum route search when the start intersection gives the center intersection the optimum route connecting between the start intersection and the target intersection having the least value of the road distance from the target intersection to the start intersection via the preceding intersections B.

26. A system for a vehicular travel route guidance to a destination to which the vehicle occupant desires to reach from a present position of the vehicle as claimed in claim 25, wherein said second route searching means ends the optimum route search when the selected center intersection has reached to the contacting intersection.

27. A system for a vehicular travel route guidance to a destination to which the vehicle occupant desires to reach from a present position of the vehicle as claimed in claim 26, wherein said first route searching means searches the optimum route from the start intersection to the respective intersections falling in the first region, said first region being within a first layer having a boundary radius of H1 previously set and first route searching means searches the optimum route until the selected center intersection has reached within an n-th layer (n denotes arbitrary integer), the preceding intersection to the selected adjacent intersection being defined as a parent intersection.

28. A system for a vehicular travel route guidance to a destination to which the vehicle occupant desires to reach from a present position of the vehicle as claimed in claim 27, wherein said first route searching means searches the optimum routes from the start intersection to the selected adjacent intersection until the selected adjacent intersection has reached to the center intersection falling in the n-th layer and the predetermined time set by the time has passed.

29. A system For a vehicular travel route guidance to a destination to which the vehicle occupant desires to reach from a present position of the vehicle as claimed in claim 28, wherein said second route searching means ends the optimum route search from the set destination to the respective intersections surrounding the target intersection when the searched intersection has reached to the selected center intersection in the n-th layer at which the route search carried out by the first route searching means is ended.

30. A system for a vehicular travel route guidance to a destination to which the vehicle occupant desires to reach from a present position of the vehicle as claimed in claim 29, wherein if the set destination corresponds to one of registered points of locations stored in points of locations registering means, the optimum route from the present position of the vehicle which has been registered in the points of locations registering means to the set destination is immediately displayed on the display unit image screen.

\* \* \* \* \*